US009505570B2

(12) United States Patent
Holland-Letz et al.

(10) Patent No.: US 9,505,570 B2
(45) Date of Patent: Nov. 29, 2016

(54) DEVICE FOR HANDLING SINGLE SHEETS, FOR INTRODUCING AND DISTRIBUTING RECTANGULAR SINGLE SHEETS, ESPECIALLY BANK NOTES, RESPECTIVELY INTO AND OUT OF A CONTAINER

(71) Applicant: Wincor Nixdorf International GmbH, Paderborn (DE)

(72) Inventors: Guenter Holland-Letz, Paderborn (DE); Ayhan Aslan, Paderborn (DE); Ludger Hoischen, Borchen (DE); Martin Loeser, Paderborn (DE); Dirk Brexel, Geseke (DE)

(73) Assignee: Wincor Nixdorf International GmbH (DE)

( * ) Notice: Subject to any disclaimer, the term of this patent is extended or adjusted under 35 U.S.C. 154(b) by 203 days.

(21) Appl. No.: 13/926,317

(22) Filed: Jun. 25, 2013

(65) Prior Publication Data

US 2013/0285309 A1 Oct. 31, 2013

Related U.S. Application Data

(63) Continuation of application No. 12/936,420, filed as application No. PCT/EP2009/054446 on Apr. 15, 2009, now Pat. No. 8,485,432.

(30) Foreign Application Priority Data

Apr. 15, 2008 (DE) ........................ 10 2008 018 935

(51) Int. Cl.
*G06Q 40/00* (2012.01)
*G07D 11/00* (2006.01)
(Continued)

(52) U.S. Cl.
CPC ............ *B65H 3/0653* (2013.01); *B65H 1/022* (2013.01); *B65H 1/025* (2013.01); *B65H 1/027* (2013.01);
(Continued)

(58) Field of Classification Search
CPC ........ B65H 1/00; B65H 1/025; B65H 1/027; B65H 83/025; B65H 3/10; B65H 31/06; B65H 2301/42254; B65H 2405/10; B65H 2405/20; B65H 2405/31; G07D 11/0012; G07D 11/0021; G07D 11/0081; G07D 11/0006; G65H 2201/1912
USPC ................ 235/379; 271/3.1, 3.08, 3.14, 4.01
See application file for complete search history.

(56) References Cited

U.S. PATENT DOCUMENTS 4,235,433 A 11/1980 Hirata
4,517,451 A 5/1985 Kokubo et al.
(Continued)

FOREIGN PATENT DOCUMENTS

DE 3237821 C2 5/1983
DE 3325182 A1 2/1984
(Continued)

OTHER PUBLICATIONS

Notification of Second Office Action from Chinese Patent Office, dated Mar. 12, 2013 and English translation.

*Primary Examiner* — Laura Gudorf
(74) *Attorney, Agent, or Firm* — Harness, Dickey & Pierce, P.L.C.

(57) ABSTRACT

A single sheet handling device (14*a* to 14*d*, 30, 200, 252, 270, 350) for the input and the output of rectangular single sheets (38) respectively into and out of a container (12*a* to 12*d*). These rectangular single sheets can in particular be banknotes (38). The single sheet handling device (14*a* to 14*d*, 30, 200, 252, 270, 350) has a feeding device with feeding elements for the sheet-by-sheet feeding of single sheets (38) and for storing these single sheets (38) in a stack (36) of single sheets in the container (12*a* to 12*d*). Further, the single sheet handling device has a separating device with separating elements for the sheet-by-sheet removal of single sheets (38) of the stack (36) from the container (12*a* to 12*d*). The feeding elements and the separating elements are arranged separately from the container (12*a* to 12*d*).

18 Claims, 30 Drawing Sheets

(51) Int. Cl.

| | |
|---|---|
| ***G07F 19/00*** | (2006.01) |
| ***B65H 3/06*** | (2006.01) |
| ***B65H 1/02*** | (2006.01) |
| ***B65H 3/10*** | (2006.01) |
| ***B65H 31/06*** | (2006.01) |
| ***B65H 31/22*** | (2006.01) |
| ***B65H 83/02*** | (2006.01) |
| ***B65H 3/04*** | (2006.01) |
| ***B65H 5/06*** | (2006.01) |

(52) U.S. Cl.

CPC *B65H 3/04* (2013.01); *B65H 3/06* (2013.01); *B65H 3/0638* (2013.01); *B65H 3/0669* (2013.01); *B65H 3/0676* (2013.01); *B65H 3/10* (2013.01); *B65H 5/06* (2013.01); *B65H 31/06* (2013.01); *B65H 31/22* (2013.01); *B65H 83/025* (2013.01); *G07D 11/0012* (2013.01); *G07D 11/0021* (2013.01); *B65H 2301/42142* (2013.01); *B65H 2402/45* (2013.01); *B65H 2404/1114* (2013.01); *B65H 2404/1115* (2013.01); *B65H 2404/2311* (2013.01); *B65H 2404/652* (2013.01); *B65H 2404/655* (2013.01); *B65H 2404/693* (2013.01); *B65H 2405/31* (2013.01); *B65H 2407/33* (2013.01); *B65H 2701/1912* (2013.01)

(56) References Cited

U.S. PATENT DOCUMENTS

| | | | | |
|---|---|---|---|---|
| 4,542,287 | A | 9/1985 | Watanabe et al. | |
| 4,591,142 | A | 5/1986 | Divoux et al. | |
| 4,616,817 | A | 10/1986 | Yamauchi et al. | |
| 4,753,431 | A | 6/1988 | Fujimoto et al. | |
| 5,000,322 | A | 3/1991 | Goi | |
| 5,058,880 | A | 10/1991 | McGraw et al. | |
| 5,098,080 | A | 3/1992 | Arnone et al. | |
| 5,100,022 | A * | 3/1992 | Fukudome | B65H 1/02 221/198 |
| 5,156,393 | A | 10/1992 | Erkisson | |
| 5,271,613 | A | 12/1993 | Hain | |
| 5,553,320 | A | 9/1996 | Matsuura et al. | |
| 6,015,147 | A * | 1/2000 | Kimura et al. | 271/163 |
| 6,331,000 | B1 | 12/2001 | Beskitt et al. | |
| 6,554,273 | B1 * | 4/2003 | Holland-Letz et al. | 271/176 |
| 6,682,068 | B1 | 1/2004 | Haney et al. | |
| 6,889,897 | B2 | 5/2005 | Nomiyama et al. | |
| 2001/0052667 | A1 * | 12/2001 | Mochizuki et al. | 271/3.14 |
| 2003/0127509 | A1 | 7/2003 | Nomiyama et al. | |
| 2004/0164167 | A1 | 8/2004 | Washington et al. | |
| 2005/0010525 | A1 | 1/2005 | Ross et al. | |
| 2006/0012101 | A1 * | 1/2006 | Katou | B65H 1/025 271/3.12 |
| 2007/0023255 | A1 * | 2/2007 | Nunn | G07D 11/0009 194/206 |
| 2007/0235522 | A1 | 10/2007 | Mateen et al. | |

FOREIGN PATENT DOCUMENTS

| | | | |
|---|---|---|---|
| DE | 19904540 | A1 | 8/2000 |
| EP | 0148310 | A2 | 7/1985 |
| EP | 0364790 | A2 | 4/1990 |
| EP | 0672600 | A1 | 9/1995 |
| EP | 0714078 | B1 | 5/1996 |
| EP | 1 326 215 | A2 | 7/2003 |
| FR | 2 538 797 | A1 | 7/1984 |
| GB | 2301092 | A | 11/1996 |
| JP | 59 0120756 | U | 8/1984 |
| JP | 61 094936 | A | 5/1986 |
| JP | 61 127522 | A | 6/1986 |
| JP | 61 168086 | U | 10/1986 |
| JP | 62 153233 | U | 9/1987 |
| JP | 63 165229 | A | 7/1988 |
| JP | 63 208466 | A | 8/1988 |
| JP | 02 221055 | | 9/1990 |
| JP | H0554223 | A | 3/1993 |
| JP | 6001514 | B | 1/1994 |
| JP | 06 263303 | A | 9/1994 |
| JP | H07172601 | A | 7/1995 |
| JP | H082716 | A | 1/1996 |
| JP | H0834533 | A | 2/1996 |
| JP | 2003030716 | A | 1/2003 |
| JP | 2003155158 | A | 5/2003 |
| JP | 2003162750 | A | 6/2003 |
| JP | 2003276870 | A | 10/2003 |
| JP | 2005049919 | A | 2/2005 |
| JP | 2005 132628 | A | 5/2005 |
| JP | 2007131410 | A | 5/2007 |
| WO | WO-00/24662 | A1 | 5/2000 |

* cited by examiner

DEVICE FOR HANDLING SINGLE SHEETS, FOR INTRODUCING AND DISTRIBUTING RECTANGULAR SINGLE SHEETS, ESPECIALLY BANK NOTES, RESPECTIVELY INTO AND OUT OF A CONTAINER

CROSS-REFERENCE TO RELATED APPLICATIONS

This is a continuation application of U.S. application Ser. No. 12/936,420 filed Oct. 5, 2010, which is a National Stage of International Application PCT/EP2009/054446, filed Apr. 15, 2009. This application claims the benefit and priority of German application 10 2008 018 935.9 filed Apr. 15, 2008. The entire disclosures of the above applications are incorporated herein by reference.

BACKGROUND

This section provides background information related to the present disclosure which is not necessarily prior art.

TECHNICAL FIELD

The invention relates to a single sheet handling device for the input and the output of rectangular single sheets respectively into and out of a container. Such rectangular single sheets are in particular banknotes which are automatically supplied to the container for storage or automatically removed from the container for output.

DISCUSSION

From the documents U.S. Pat. No. 4,616,817, U.S. Pat. No. 6,682,068 and WO 00/24662, arrangements are known in which deposited banknotes are supplied to individual storage compartments which cannot be separated from the arrangements. From the document DE 33 25 182 C2, a further arrangement for storing single sheets in fixed storage compartments which cannot be separated from the arrangement is known, in which stacking wheels are used for feeding the single sheets into the storage compartments. Further, a large number of arrangements for storing single sheets in a stack is known, in which the stacking direction extends vertically and the feeding elements are arranged above the stack. Arrangements of this type are known, for example, from the documents EP 0 714 078 B1, DE 32 37 821 C2 and GB 2 301 092 A. On the other hand, a large number of arrangements for removing single sheets from a stack of sheets are known. In particular, the document EP 0 364 790 discloses a circulating pull-off element having a profiled surface. Further, so-called cash recycling devices are known in which deposited banknotes are supplied to a storage compartment and, upon withdrawals at a later point in time, they are again removed from this compartment. Such a cash recycling device having storage compartments which cannot be separated from the device is known, for example, from the document EP 0 148 310.

From the document DE 199 04 540 A1 a banknote storage container for cash dispensers is known. Further, from the document U.S. Pat. No. 6,889,897 B2, a banknote storage container is known in which a large number of feeding elements as well as, alternatively, a large number of separating elements are arranged in the banknote storage container itself which is designed as a cassette. This, however, has the disadvantage that these elements also have to be provided in replacement cassettes and that space has to be provided for the feeding and separating elements in the cassette itself, which space can no longer be used for banknote storage. Further, a disadvantage of arranging feeding and separating elements within the cassette is that these elements increase the weight of the cassette and therefore the transport expense for the transport of the cassette is increased. However, in order to enable the feeding of banknotes into a banknote container and the removal of banknotes from the same container, the feeding and separating elements have to be positioned accurately with respect to the stack surface or, respectively, the front side of the banknote stack contained in the container so that a reliable banknote transport into and out of the container is made possible.

SUMMARY OF THE INVENTION

It is an object of the invention to specify a single sheet handling device for the input and the output of rectangular single sheets, in particular of banknotes, respectively into and out of a container, in which a simply structured container which can be separated from the feeding and separating elements of the single sheet handling device can be used.

By means of a single sheet handling device for the input and the output of rectangular single sheets, single sheets can easily be supplied to a container and single sheets can easily be removed from this same container. By arranging the feeding elements and the separating elements separately from the container, a simple structure of the container is possible and the weight of the container can be considerably reduced compared to an arrangement of feeding elements and separating elements within the container. A single sheet handling device of this type is in particular suitable for use in an automatic teller machine, wherein, as needed, an operational replacement of full and/or empty containers takes place so that for each container arranged in the automatic teller machine at least one further replacement container for the replacement of this container arranged in the automatic teller machine is held available. Thus, it is desirable that the containers can be manufactured at relatively little expense. By arranging the feeding elements and the separating elements separately from the container, this is easily possible.

It is advantageous if the feeding elements position a single sheet to be supplied to the container in front of the stack surface formed by a front side of the stack. As a result thereof, this supplied single sheet is subsequently the foremost single sheet of the stack. Thus, the face or the back of the supplied single sheet subsequently forms the front side of the stack.

In an embodiment of the invention, at least a part of the feeding elements and at least a part of the separating elements are formed and arranged such that, at least in a feeding or, respectively, separating mode of the single sheet handling device, they contact at least one single sheet located in a single sheet receiving area of the container through at least one opening in a front-side boundary wall of the single sheet receiving area. As a result thereof, an easy access of the feeding elements and the separating elements to the foremost single sheet of the stack or, respectively, to a single sheet to be supplied is easily possible.

Further, in an embodiment of the invention it is provided that the single sheet handling device has at least one active drive for changing the position of a front-side boundary wall of the container which is formed as a shutter, the drive initiating or causing the movement of the shutter into a feeding and/or separating position in which a feeding and/or removal opening for feeding or, respectively, removing the single sheets is uncovered. As a result thereof, the single sheets can be easily transported through the uncovered feeding and/or removal opening into the container and out of the container.

This embodiment of the invention can in particular be developed such that the active drive moves the shutter into an inactive position before or during the operational separation of the container from the feeding and separating elements, preferably before or during a removal operation for the operational removal of the container from an automated teller machine, the shutter being arranged in the inactive position such that the feeding and/or removal opening is closed and preferably locked. When moving the shutter into the inactive position, preferably at least a part of the single sheets of the stack is pushed into the single sheet receiving area of the container. As a result thereof, all single sheets of the stack are reliably arranged in the single sheet receiving area when the container is separated from the feeding and separating elements. When the shutter is arranged in the inactive position, an unauthorized removal of the banknotes is made more difficult.

Further, it is advantageous in this embodiment when the drive moves the shutter from the feeding and/or separating position into the inactive position and from the inactive position into the feeding and/or separating position at least when a change of the operating mode from the feeding mode into the separating mode takes place or when a change of the operating mode from the separating mode into the feeding mode takes place. As a result thereof, at least the front single sheets of the stack are pushed into the single sheet receiving area and brought into a defined initial position for the change of the operating mode or, respectively, are brought into a defined initial position for the following operating mode to be set.

Further, it is advantageous in this embodiment if the single sheet handling device has engagement elements for actuating the shutter upon contact of the container with the elements of the single sheet handling device which are arranged separately from the container, the drive actively driving the shutter during movement into the feeding and/or separating position via the engagement elements against a spring force for moving and/or holding the shutter in the inactive position. As a result thereof, it is possible to arrange the drive separately from the container and to reliably actuate the shutter via the engagement elements.

In a development of the invention at least one separating element has at least one separating wheel, preferably a suction roller with suction elements arranged on its outer circumferential surface for contacting a single sheet. It is advantageous in this connection when suction cups are provided on the outer circumferential surface of the suction roller, by which suction cups a single sheet adheres to the suction roller. Alternatively or additionally, the separating wheel can be a pull-off wheel having a profiled outer circumferential surface, the profile preferably consisting of transverse ribs. With such separating elements, an easy and reliable separation of the single sheets of the stack contained in the container is possible.

Further, it is advantageous if the separating device has at least two separating rolls arranged on the same driven shaft, which separating rolls have a uniform circumferential surface. The separating rolls are arranged on the shaft, preferably in a spring-mounted manner, so that the separating rolls, at least in a separating mode, uniformly contact the first banknote arranged at the front side of the stack on its face or back in order to avoid a twisting of the banknote during separation and removal. The separating rolls preferably have a profiled surface, at least the surface of the separating rolls being of a material having a high coefficient of friction. Further, it is advantageous that the separating rolls have a profile, preferably transverse grooves or suction cups on the circumferential surface.

In the invention, it is advantageous to arrange the single sheets one after the other as a stack in the container, standing on their horizontal edges. As a result thereof, a high packing density can be achieved. Further, the container can have a relatively low structural height, as a result whereof several containers can be stacked on top of one another in common automated teller machines or in common automatic cash safes. Further, the containers can be transported horizontally, as a result whereof a good stackability of the containers is guaranteed.

The container is preferably a closed replaceable cassette. By means of such a closed cassette, unauthorized removals of single sheets by people coming into contact with the cassette can be made more difficult or can be prevented since for removing single sheets from the cassette a manipulation of the cassette is required which usually leaves visible marks, as a result whereof the manipulation of the cassette can be immediately recognized and proven. Further, such a cassette offers the possibility of easily supplying banknotes to an automated teller machine and of easily removing banknotes from the automated teller machine. By means of the closed cassette, a further additional packaging for the transport, for example, by a money transport company is not necessary.

Further, it is advantageous if the container has several movable lamellae connected to one another, which in a closing position prevent at least unauthorized access to the shutter, a drive element or an engagement element automatically bringing the lamellae into the closing position before or during removal of the container from the feeding and separating elements. Such a separation takes place in particular during removal of a container from an automated teller machine or from an automatic cash safe, for example during replacement of the container. By arranging the lamellae in the closing position, direct access to the shutter is not possible. Manipulations of the shutter are thus made more difficult since, at first, the lamellae would have to be removed. The interconnected lamellae are also referred to as roller shutters or blinds.

Preferably, at least the active drive elements for driving the separating elements and the active drive elements for driving the feeding elements form no part of the container and thus are separate from the container. As a result thereof, these drive elements, too, do not have to be provided for each single container but only once for a container space provided by the single sheet handling device. If at least one replacement container is provided, then the expense for the manufacture of the containers can be considerably reduced. Further, the containers are subject to higher wear so that, upon replacement of a worn container, then these drive units as well as feeding elements and/or separating elements possibly provided in the container each time have to be replaced together with the container, as a result whereof considerable additional work and expense is required as compared to the solution as suggested.

Further, in an embodiment of the invention at least one actively driven boundary element is provided, which is movable in stacking direction and in opposite stacking direction and variably restricts the stacking space in the single sheet receiving area by its position. By means of the active drive of the boundary element, which can, for example, be realized by an electric motor arranged in the container, the stacking space can be easily increased or reduced according to requirements. Further, the stack contained in the container can be compressed if necessary. Moreover, with the aid of the actively driven boundary element it is possible to move the stack towards a feeding and/or separating area so that the foremost single sheet of the stack reliably comes into contact with the feeding and/or separating elements. By such a boundary element, the single sheets can be held in a position in which they are arranged as a stack standing on their horizontal edges. The boundary element can, for example, be designed as a displacement carriage.

In an embodiment of the invention, a double sheet stripping element is provided on a transport path for the further transport of the single sheets pulled off with the aid of the separating element, which stripping element separates a second single sheet that has been removed from the stack together with a first single sheet from the first sheet and holds it in the feeding and removal area or transports it back into a feeding area and/or back into the container. As a result thereof, double pull-offs, i.e. the removal of two banknotes, can be reliably prevented even if two banknotes adhere to one another.

It is advantageous if the double sheet stripping element comprises at least one stripping wheel arranged on a shaft and/or at least one stripping roller arranged on the shaft. The stripping wheel or the stripping roller is connected to the shaft in a rotationally fixed manner, the shaft being fixed in the separating mode or being driven opposite to the transport direction of a single sheet to be transported away. In the feeding mode, the direction of rotation of the stripping wheel or the stripping roller corresponds to the direction of transport of a single sheet to be supplied. Alternatively, the shaft can be a fixed shaft, the stripping wheel or the stripping roller having a freewheeling mechanism in one direction of rotation only so that a rotation of the stripping wheel or of the stripping roller is possible without a rotation of the shaft during feeding of a single sheet into the feeding area or, respectively, into the container. As a result thereof, the double sheet stripping element does not impede the transport of the single sheet to be supplied to the feeding area.

Further, the stripping wheel or the stripping roller can be driven with the aid of a drive unit via the shaft on which it is arranged, the direction of rotation of the stripping wheel or, respectively, the stripping roller for stripping off the second single sheet being opposite to the movement of the single sheet to be removed.

In an advantageous first embodiment of the invention, the feeding device can have as a feeding element at least one vane wheel having at least one vane and further comprise at least one drive unit for driving the at least one vane wheel. When feeding a single sheet to be supplied into the container, the drive unit rotates the vane wheel such that the vane presses against the front side of a stack of single sheets contained in the single sheet receiving area of the container and pushes at least a part of these single sheets at least temporarily into the single sheet receiving area and creates a free feeding area for positioning the single sheet to be supplied in front of the front side of the stack. As a result thereof, the single sheet to be supplied can easily be transported into the free feeding area without its transport movement being impeded by excessive friction against the foremost single sheet or, respectively, against the front side of the stack.

In this first embodiment of the invention, it is advantageous if a control unit controls the drive unit such that the vane of the vane wheel has a distance to the front edge of the supplied single sheet during feeding and that the supplied single sheet does not contact the vane during feeding. As a result thereof, the movement of the single sheet is not impeded by a contact with the vane. The single sheet is thus not deformed during feeding, in particular not compressed in longitudinal direction, and can easily be positioned in front of the front side of the present stack.

It is advantageous to provide at least two vane wheels which have the same axis of rotation and are preferably connected with a single shaft in a rotationally fixed manner, which shaft can be driven with the aid of a drive unit of the feeding device, the vanes of the vane wheels preferably having a lateral distance to each other and being identically oriented, i.e. they project from the rotatable shaft under the same angle. The drive unit rotates the shaft and thus the vane wheels during feeding of a further single sheet such that both vanes press at a lateral distance to each other, i.e. in parallel, against the front side of a stack of single sheets contained in the single sheet receiving area of the container so that at least a part of these single sheets is at least temporarily pushed into the single sheet receiving area of the container at the contact points with the two vanes. As a result thereof, a uniform gap, i.e. a feeding area, for positioning the further single sheet in front of the front side of the stack can be created. It is particularly advantageous to provide three, four, five or six vane wheels which are arranged on a common shaft in a rotationally fixed manner, wherein, dependent on the size of the single sheets of the stack, all or only a part of the vanes pointing in the direction of the stack press against the front side of the stack of single sheets contained in the single sheet receiving area of the container during feeding of a further single sheet and push at least a part of these single sheets at least temporarily into the single sheet receiving area of the container. The vanes of the vane wheels have a lateral offset with respect to one another so that the upper side of the stack, i.e. the front side of the stack, is contacted by the vanes at several points of contact which are substantially parallel to the front edge or, respectively, parallel to the rear edge of the single sheet. Preferably, the vane wheels are arranged so as to be distributed over the entire width of an allowable sheet width for a single sheet to be supplied. It is advantageous to provide in particular six vane wheels, wherein between the four inner vane wheels the same first distance is provided and wherein the outer vane wheels have a second distance to the second and, respectively, fifth vane wheel, which distance is smaller than the first distance.

Further, it is advantageous in the first embodiment of the invention to additionally provide a sensor arrangement, preferably a light barrier arrangement, for detecting a sheet edge of a single sheet to be supplied to the container with the aid of the feeding device. The drive unit of the feeding device starts the drive of the at least one vane wheel a preset time after the detection of the sheet edge of the single sheet by the sensor arrangement, the sensor arrangement preferably detecting the front edge of the single sheet. Before starting the drive of the at least one vane wheel, this vane wheel is preferably in a basic feeding position in which the vane is substantially horizontally oriented and presses or, respectively, pushes the front side of the stack into the single sheet receiving area of the container as far as this is possible by the vanes. As a result thereof, a sufficiently large feeding area, i.e. a sufficiently large entering area, for a single sheet transported into the feeding area via transport means is created so that the sheet can be positioned in an unimpeded manner in front of the front side of the stack and subsequently forms the stack surface, i.e. the front side of the stack.

Further, in the first embodiment of the invention it is particularly advantageous if the enveloping circle of the vane of the vane wheel is chosen such and when the vane wheel is arranged such that the apex of the enveloping circle is arranged at approximately the same height as the front edge of the largest-possible single sheet which can be supplied to the container when arranged in the single sheet receiving area of the container. As a result thereof, a structural height of the container as little as possible while providing a reliable function can be achieved since, at least for the vane wheel, no space above the note stack is required.

Further, it is advantageous in the first embodiment of the invention to provide at least one inclined deflector by which the front edge of a supplied single sheet is guided towards the front side of the stack and is held against the stack, the inclined deflector having a lateral offset with respect to the vane wheel and the inclined deflector preferably being spring-mounted. By the inclined deflector it is thus guaranteed that also in the case of a relatively wide feeding area a single sheet transported into this feeding area rests against the front side of the stack at least with its front edge. As a result of the spring-mounting of the inclined deflector, the inclined deflector is pressed via the spring force in the direction of the front side of the stack so that a single sheet contacts with its front edge the inclined deflectors at least in the last section of the transport path when entering the feeding area, wherein the inclined deflector can, if necessary, be deflected against the spring force. The end of the inclined deflector facing the front side of the stack presses against the face of the single sheet facing the inclined deflector and presses the same against the stack contained in the container or restricts the maximum distance between the supplied single sheet and the front side of the stack already contained in the container. Further, the inclined deflector is deflected against the spring force when, in the separating mode, the stack is displaced further towards the separating elements, i.e. out of the single sheet receiving area.

Further, in the first embodiment of the invention it is advantageous when the front area of the vane of the vane wheel has a curvature opposite to the direction of rotation of the vane wheel during feeding of the single sheet. As a result thereof, the front side of the stack contained in the container is contacted by the outer curvature, as a result whereof only a relatively little force is required for guiding the vane past the front side of the stack and for pushing at least a part of the stack into the single sheet receiving area of the container. Further, the friction between the vane surface and the single sheet arranged at the front side of the stack is reduced by the curvature, and edges which scrape against the surface of the single sheet and might engage with damages on the single sheet are avoided. By means of the curvature of the vane, thus a smooth and trouble-free operation is possible. The vane, including the curved front area, is not flexible but rigid so that the vane and the curved front area of the vane are not or only slightly elastically deformed upon a contact with the front side of the stack. Thus, the vane is preferably resistant to bending.

Further, it is advantageous if the at least one vane wheel has a hub from which the at least one vane projects, the vane projecting substantially tangentially from the hub. By means of the hub, the vane wheel can easily be arranged on an axle or a shaft. By the tangential connection of the vane to the hub, the longitudinal axis of the vane extends in a skewed manner relative to the axis of rotation, the curvature in the front area of the vane being oriented such that an axis intersecting the axis of rotation and running parallel to the vane longitudinal axis intersects the curved front area of the vane. As a result thereof, also when two such vanes are arranged tangentially on the hub, offset by 180°, in the case of a vertical orientation of the vane axes, only a relatively narrow area is required for the arrangement of these curved vanes, as a result whereof given such a vertical arrangement of the vane axes the stack can be moved up to the separating elements. By such a design of the vane wheel, only a relatively small structural space is required for the vane wheel. In the case of a horizontal orientation of the vane longitudinal axis of the at least one vane, in which the vane contacts the front side of the stack, the vane wheel is located in a basic feeding position. In the case of a vertical orientation of the vanes, i.e. a vertical orientation of the vane axes, the vane wheel is in a basic removal position since for the removal of single sheets from the container the vanes are not required. The single sheets contact a pull-off wheel or another separating element for the removal of at least one single sheet from the stack. As vane axis, the longitudinal axis of the non-curved area of the vane is taken.

In the first embodiment of the invention, it is further advantageous to provide at least two further vane wheels which are arranged on a common drivable shaft and the vanes of which, upon a rotation of the shaft, move at least the rear edge of a single sheet supplied to the container towards the stack when the supplied single sheet is positioned in front of the front side of the stack already contained in the container. As a result thereof, in particular the lower part of the single sheet, given an upright arrangement of the single sheets on their longitudinal side, can be moved towards the stack, as a result whereof the single sheet is then positioned at the front side of the stack and subsequently forms the front side of the stack. At least an area of the vanes of the vane wheels is flexible and is elastically deformed when the vane is guided past the lower area of the single sheet, wherein, by the elastic deformation and in addition by the rotation, a force is exerted on the lower area of the single sheet towards the existing stack. Preferably, the vanes are made of an elastic material. Further, it is advantageous if three vanes are provided which project, preferably tangentially, from a hub of the vane wheel at 0°, 90° and 180°. As a result thereof, by a suitable rotation of the shaft the vanes can be oriented such that no vane projects into the transport path so that a single sheet can reach the feeding area without contacting one of the vanes of the further vane wheels.

In a development of the invention according to a second embodiment, the feeding device has at least one circulating transport belt, the transport belt having at least one transport flap for receiving an area of a single sheet to be supplied to the container. By means of such a transport belt the single sheet contained in the transport flap can be guided so as to be in front of the stack contained in the container, then no or only a relatively small feeding space being required between a front-side shutter of the container and the front side of the stack contained in the single sheet receiving area of the container.

Preferably at least two, and more preferably, three transport belts are arranged next to one another, the at least one transport flap of each transport belt being arranged at the same circulation position so that a supplied single sheet is simultaneously supplied into one transport flap each of each transport belt arranged at a lateral distance with respect to each other and is further transported in the transport flap until it is positioned in front of the front side of the stack contained in the container. Preferably, the transport flap is joined to the transport belt at an edge running transversely to the circulation direction of the transport belt. Further, it is advantageous if the transport flap extends from the edge in the longitudinal direction of the transport belt. The other edges of the transport flap are not joined to the transport belt so that the transport flap, in an advantageous development of the second embodiment, tangentially projects from the curvature when the edge is arranged at a curvature of the transport belt. Preferably, the transport flap has substantially the same width as the transport belt. As a result thereof, the entire belt width can be used as a receiving area of the transport flap.

Further, it is advantageous when in the second embodiment of the invention the endless transport belt is deflected around at least one driven shaft and is driven in a transport direction with the aid of this shaft, the edge at which the transport flap is joined to the transport belt being provided at the front edge of the transport flap in transport direction of the transport belt.

It is particularly advantageous in the second embodiment if the transport belt has two transport flaps which, given a circular arrangement of the transport belt, are arranged offset by 180° at the outer circumference of the transport belt. However, the transport belt is preferably guided over two shafts so that the transport belt has no circular circumference when installed. Further, it is advantageous in the second embodiment when at least the transport belt or the transport belt and the at least one transport flap have a perforation in circumferential direction of the endless transport belt for engagement with a sprocket wheel. By means of such a sprocket wheel and such a perforation, a slip between the drive shaft and the transport belt can be avoided. This is particularly important when at least two transport belts with a lateral offset relative to one another are provided, each of which uses at least one transport flap for receiving an area of a single sheet to be supplied in order to permanently guarantee a parallel orientation of the transport flaps.

Further, it is advantageous in the second embodiment to provide a first actuating element, which can preferably circulate and which, in a first operating mode for the removal of the single sheet from the container, presses at least the rear edge of the transport flap opposite to the front edge against the transport belt and/or, in a second operating mode for feeding a single sheet into the container, creates a gap between the rear edge of the transport flap and the transport belt and/or this gap is increased. This guarantees that an area of a single sheet to be supplied is reliably fed into the transport flap or, respectively, that, when a single sheet is removed from the container, a transport flap projecting from the transport belt does not project into the transport path for the removal of the single sheet. In the first operating mode, the actuating element can clear a feeding and removal area in that the actuating element presses the rear edge of the transport flap against the transport belt and/or, in the second operating mode, the actuating element can open the transport flap in the input and output area such that a single sheet transported into the feeding and removal area is transported into the transport flap and, while being in the transport flap, is transported into a position in front of the first single sheet of the stack forming the front side of the stack contained in the container.

Further, it is advantageous to provide at least one pressure element, preferably at least one vane wheel, which pushes a supplied single sheet and/or at least a part of the other single sheets of the stack contained in the container into the container.

Further, it is advantageous in the second embodiment of the invention to provide at least one stripping element which is arranged such that the stripping element retains a single sheet which has been transported with the aid of the transport flap in front of the front side of the stack in a position in front of the front side of the stack contained in the container upon a further circulation of the transport belt in the feeding and removal area and, as a result thereof, pulls it out of the transport flap. As a result thereof, the single sheet can be easily positioned in front of the front side of the stack.

Further, in the second embodiment of the invention it is advantageous to provide at least one inclined deflector by means of which the front edge of a supplied note and/or the upper area of a supplied note is guided towards the stack. The inclined deflector is laterally offset with respect to the circulating transport belt, the inclined deflector preferably being spring-mounted. Further, it is advantageous if the inclined deflector also serves as a stripping element, the device then having a combined inclined deflector and stripping element.

In an alternative third embodiment of the invention the feeding device and the separating device have at least one combined stacking and separating wheel as a combined feeding and separating element. This stacking and separating wheel has chambers which at their chamber bottom form a stop for the single sheets to be supplied to the container. Further, the stacking and separating wheel comprises at least one separating element which can be moved out of the circumferential surface of the stacking and separating wheel. In a development of the stacking and separating wheel according to the third embodiment the stacking and separating wheel has two chambers which are preferably arranged at a distance of 180° to one another. By providing several chambers, a faster positioning of a chamber in the transport path of single sheets to be supplied is possible. It is particularly advantageous to provide three axially spaced stacking and separating wheels on one common stacking and separating wheel shaft. The stacking and separating wheels are preferably driven by the stacking and separating wheel shaft. As a result thereof, it can be guaranteed that the chambers are oriented in parallel such that a supplied single sheet is fed with one area each into one chamber each of each stacking and separating wheel. A coordination of several drive units is thus not required.

In a stacking mode for taking over the single sheets from a transport path and for storing the single sheets in the container, the at least one stacking and separating wheel is preferably positioned such that an area of the supplied single sheet can be fed into the chamber. A drive unit rotates the stacking and separating wheel parallel to a part of the feed motion of the single sheet, wherein the single sheet remains in the chamber and wherein, upon a rotation of the stacking and separating wheel, a control element actuates a clamping element associated with the chamber so that the clamping element holds the single sheet in the chamber via a clamping connection. Preferably, a cam disk serves as a control element.

In an advantageous development of the third embodiment further a separating mode is provided in which a control element moves the at least one separating element out of the circumferential surface of the stacking and separating wheel at least for a preset amount of time, a drive unit rotating the stacking and separating wheel so that the separating element moved out of the circumferential surface contacts the foremost single sheet of the stack contained in the container, which sheet forms the front-side stack surface. By the rotation of the stacking and separating wheel, the foremost single sheet is displaced and fed to at least one transport element for further transport of the single sheet. In this process, it is advantageous that a control element controls a separating lever such that the separating element is moved outwards, i.e. away from the axis of rotation of the separating and stacking wheel. This control element can in particular comprise a cam disk.

Further, it is particularly advantageous to provide a stripping element which stops a single sheet contained in the chamber of the stacking and separating wheel in its motion, a clamping connection established by the clamping element between the stacking and separating wheel and the single sheet being disconnected when the stripping element stops the movement of the single sheet. This disconnection is again controlled by the or a further control element which preferably comprises at least one cam disk. In this process, it is particularly advantageous when a drive unit continues to rotate the stacking and separating wheel after the stripping element has stopped the movement of the single sheet. As a result thereof, the supplied single sheet is easily pulled out of the chamber.

Further, it is advantageous in the third embodiment of the invention to provide at least one inclined deflector by which the front edge of a supplied single sheet is guided to the stack. The inclined deflector has a lateral offset with respect to the stacking and separating wheel, the inclined deflector preferably being spring-mounted. It is particularly advantageous to provide a combined inclined deflector and stripping element.

In the third embodiment of the invention it is further advantageous to provide a sensor arrangement, preferably a light barrier arrangement, for detecting a sheet edge of the single sheet to be supplied to the container with the aid of the stacking and separating wheel and that the drive unit starts the drive of the at least one stacking and separating wheel a preset time after the detection of the sheet edge by the sensor arrangement. In this process, it is particularly advantageous if the sensor arrangement detects the front edge of the single sheet since then there is only a small distance between the detection area of the sensor arrangement and the receiving chamber of the stacking and separating wheel, which chamber is positioned for feeding the single sheet.

A further aspect of the invention relates to a cash deposit and cash withdrawal device comprising one of the above-shown single sheet handling devices and a container, wherein the container can be removed from the cash deposit and cash withdrawal device with a single sheet which might be contained in the container or with several single sheets which might be contained in the container, and wherein the single sheet handling device with the driven feeding elements of the feeding device and the driven separating elements of the separating device remains in the cash deposit and withdrawal device. Here, it is advantageous when in the cash deposit and withdrawal device the container can be replaced by a similar container.

A third aspect of the invention relates to a system having at least one cash deposit machine and at least one cash withdrawal machine, in which the cash deposit machine has at least one feeding device with feeding elements for feeding single sheets sheet-by-sheet and for storing these single sheets in a stack of single sheets in a replaceable container. The cash withdrawal machine has at least one separating device with separating elements for the sheet-by-sheet removal of the single sheets of the stack from the same container. The container is removed from the cash deposit machine and inserted into the cash withdrawal machine. At least a part of the single sheets supplied to the container in the cash deposit machine is again removed from the container in the cash withdrawal machine. The feeding elements and the separating elements each time form no part of the container but preferably form a part of the cash deposit or, respectively, cash withdrawal machine. Hereby, it is advantageous when at least the cash deposit machine has an authenticity check unit for checking the authenticity of the deposited banknotes.

A fourth aspect of the invention relates to a circulating transport belt having a first elastically deformable material strip and having a second elastically deformable material strip. A first end of the first material strip is connected to the inside of the second material strip by a first strip-shaped connecting area extending transversely to the running direction of the transport belt. An area of the second material strip comprising the first end of the second material strip extends beyond the first connecting area and forms a transport flap for receiving an area of a single sheet between the transport flap and the first material strip. In the third aspect of the invention it is advantageous to connect a second end of the second material strip to the inside of the first material strip by a second strip-shaped connecting area extending transversely to the circulating direction of the transport belt. In this process, it is advantageous if an area of the first material strip comprising the second end of the first material strip extends beyond the second connecting area and forms a second transport flap for receiving an area of a single sheet between the transport flap and the second material strip. The transport flaps are preferably arranged at the outer circumference of the transport belt offset by 180°. The first and the second material strip preferably have the same dimensions.

Further, it is advantageous if the first and the second material strip have a perforation for engagement with a sprocket wheel. As a result thereof, a slip-free drive of the transport belt by the sprocket wheel is possible.

It is particularly advantageous if this perforation along the circumference of the transport belt extends approximately in the middle of the transport belt. As a result thereof, only one sprocket wheel or, respectively, one roller with sprockets has to be provided in order to drive the transport belt reliably without slip. The engagement of the sprockets of the sprocket wheel approximately in the middle of the transport belt guarantees that the transport belt is not distorted when driven. Further, the transport belt can be axially positioned by the sprocket wheel, as a result whereof a displacement of the transport belt in the direction of the shaft ends of a deflection roller, i.e. a drifting, is avoided.

The first and the second material strip are preferably foil strips, for example, polyethylene foil strips. The foil strips have a uniform material thickness which lies in the range between 0.001 mm and 0.5 mm. Such polyethylene foil strips and other suitable foil strips can be welded together in particular by a welding method, such as an ultrasonic welding, in order to, in particular, create the first and the second connecting area.

BRIEF DESCRIPTION OF THE DRAWINGS

Further features and advantages of the invention result from the following description which in connection with the enclosed drawings explains the invention in more detail with reference to embodiments thereof.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
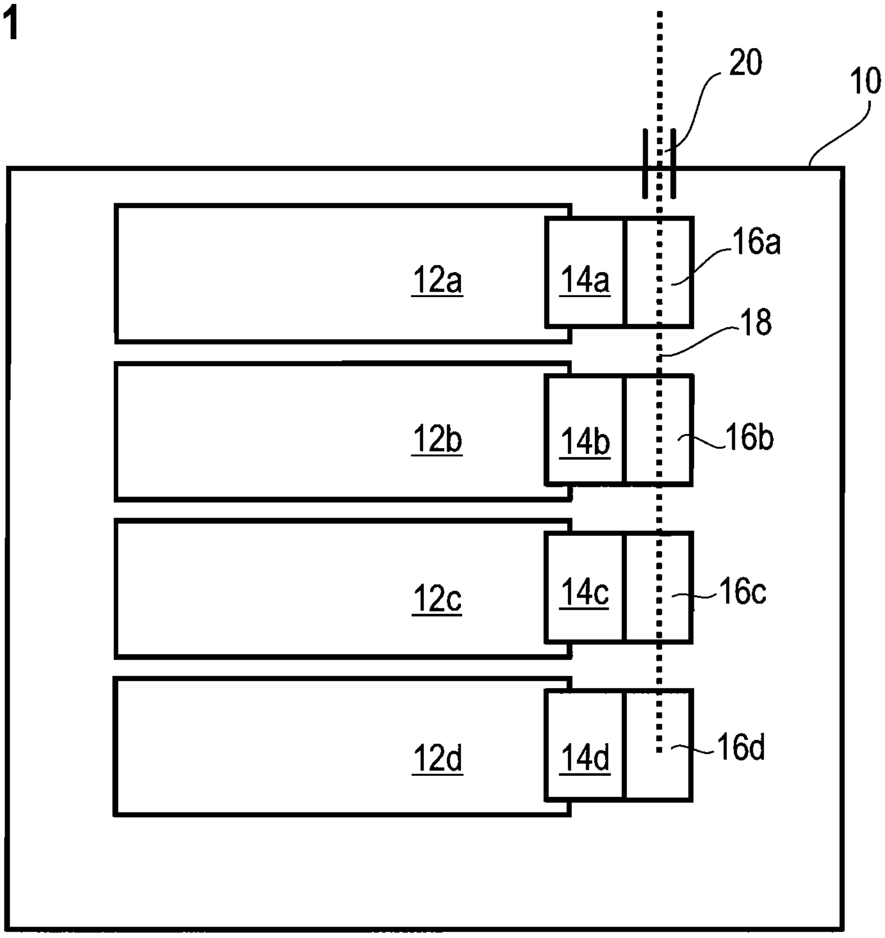
FIG. 1 shows a safe arranged in an automated teller machine and having four cassettes for storing banknotes and one separating and stacking module each assigned to each cassette.

In FIG. 1, a safe 10 arranged in an automated teller machine and having altogether four replaceable cassettes 12*a* to 12*d* stacked on top of one another is illustrated. Each cassette 12*a* to 12*d* has a separating and stacking module 14*a* to 14*d* assigned thereto, with the aid of which banknotes contained in the respective cassette 12*a* to 12*d* can be removed and, alternatively, banknotes can be supplied to the respective cassette 12*a* to 12*d* with the aid of the separating and stacking module. In the cassettes 12*a* to 12*d*, the banknotes are stored as a stack, the banknotes being arranged in the cassettes 12*a* to 12*d* standing on their longitudinal edges. With the aid of transport elements 16*a* to 16*d*, the banknotes can be supplied to the separating and stacking modules 14*a* to 14*d* as well as be removed from these separating and stacking modules 14*a* to 14*d*. With the aid of the transport elements 16*a* to 16*d*, which in particular comprise belts, rolls and/or sorting gates, a transport path 18 is formed via which the banknotes are transported from a transfer interface 20 via which the banknotes are supplied to the safe 10 or output from the safe 10 to a selected separating and stacking module 14*a* to 14*d*. Further, a banknote removed from one of the cassettes 12*a* to 12*d* with the aid of the separating and stacking module 14*a* to 14*d* assigned to this cassette can be supplied to the transport elements 16*a* to 16*d* and can be further transported along the transport path 18 via the transfer interface 20 to a control station of the automated teller machine which is arranged above the safe 10 and has at least one input and output compartment.

Usually, banknotes which are to be paid in are deposited in the input and output compartment as a wad and separated in the upper part of the automated teller machine so that they are supplied one after the other along the transport path 18 via the transfer interface 20 to the safe 10. Further, the banknotes removed from the cassettes 12*a* to 12*d* are transported individually one after the other along the transport path 18 via the transfer interface 20 out of the safe 10 and are then stacked to a stack or, respectively, wad with the aid of a known stacking device which is, for example, designed as a stacker wheel. This wad is then output via the input and output compartment. Further, the automated teller machine has a suitable control station and further elements such as a card reader and possibly security devices for the authentication of an operator.

Alternatively, the safe 10 illustrated in FIG. 1 and having the cassettes 12*a* to 12*d*, the separating and stacking modules 14*a* to 14*d* as well as the transport elements 16*a* to 16*d* can also be used in an automatic cash safe.

The banknotes are preferably transported along the transport path 18 at a transport speed of ≥1.2 m per second, preferably ≥1.4 m per second and removed from the cassettes 12*a* to 12*d* at a corresponding speed or, respectively, supplied to these cassettes 12*a* to 12*d* at a corresponding speed.

Figure 2:
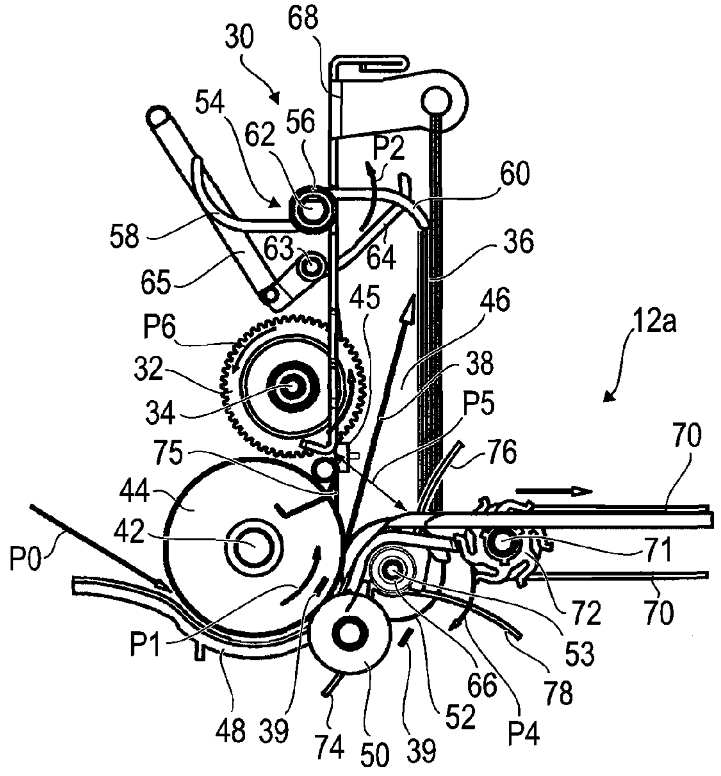
FIG. 2 shows a schematic illustration of the separating and stacking module according to a first embodiment of the invention, the feeding elements and separating elements of which are shown in a basic stacking position.

In FIG. 2, a separating and stacking module 30 according to a first embodiment of the invention is illustrated. In particular the separating and stacking module 30 according to FIG. 2 can be used as the separating and stacking module 14*a* to 14*d* according to FIG. 1. Elements having the same structure and/or the same function are identified with the same reference signs.

In addition to separating and feeding elements of the separating and stacking module 30 elements of the cassette 12*a* used for the stacking and separating functions are illustrated. As separating elements, the separating and stacking module 30 has three pull-off wheels 32 arranged next to one another, the wheels being spring-mounted on a pull-off wheel shaft 34 and connected to this shaft 34 in a rotationally fixed manner. In the side view shown in FIG. 2, only one of the pull-off wheels 32 is visible. Further, the pull-off wheel shaft 34 is spring-mounted at one end so that it can be horizontally displaced at this shaft end and is pressed towards the front side of the cassette 12*a* with the aid of the spring force and thus against the front side of a stack 36 of banknotes arranged in the cassette 12*a* when this stack 36 is arranged in a separating position. A first banknote 38 to be supplied in the direction of the arrow P0 is supplied into a feeding area 46 in front of the stack 36 contained in the cassette 12*a* with the aid of drive wheels 44 arranged on a main drive shaft 42.

Further, a guiding element 48 is provided which partially encloses the drive wheels 44 and which guides the movement of the banknote 38 around the drive wheels 44. Further, a pressure roller 50 is provided with the aid of which the banknote 38 is pressed against the drive wheels 44 for transport. Further, two stripping rollers 52 are arranged on a shaft 53, which in the present embodiment have a freewheeling mechanism so that they likewise rotate when the drive wheels 44 rotate in the direction of the illustrated arrow P1 even without a rotation of the shaft 53. When the drive wheels 44 are driven in a direction opposite to the arrow P1 illustrated in FIG. 2, the stripping rollers 52 do not rotate. Preferably, the stripping rollers 52 have a circumferential surface made of rubber or another material having a relatively high coefficient of friction so that whenever two banknotes enter the gap between the drive wheel 44 and the stripping roller 52, the banknote facing the stripping roller is stripped off from the banknote facing the drive wheel 44 and is not transported further up to the pressure roller 50. As a result thereof, it can be guaranteed that when banknotes are transported away from the cassette 12*a* only one banknote at a time is removed.

In addition, the separating and stacking module 30 has as a feeding element several vane wheels 54 arranged on a drive shaft 62, each of which having two vanes 58, 60 tangentially projecting from a hub 56 of the vane wheel 54. The vanes 58, 60 are connected to the drive shaft 62 in a rotationally fixed manner so that the vane wheels 54 can be driven with the aid of a drive unit via this shaft 62 in the direction of rotation of the illustrated arrow P2. The ends of the vanes 58, 60 are curved opposite to the direction of rotation so that they contact the front side of the stack 36 with their curved outer face upon a rotation in the direction of the arrow P2. In the present embodiment the stack 36 comprises several banknotes having a relatively small first height, of which one banknote forms the front side of the stack 36, and several banknotes having a higher second height, of which one banknote forms the rear side of the stack 36.

The vane wheel 54 is illustrated in FIG. 2 in a basic stacking position in which a horizontally oriented vane 60 of the vane wheel 54 presses against the front side of the stack 36 and pushes the banknotes of the stack 36 out of the feeding area 46 and into the cassette 12*a*. In this basic stacking position of the vane wheel 54, the banknote 38 is transported into the feeding area 46. During transport of the banknote 38 into the feeding area 46 in addition the pull-off wheel 32 is driven in the direction of the arrow P6, i.e. in the feeding direction of the banknote 38. When the front edge of this banknote 38 falls below a preset distance to the vane 60, the vane wheel 54 is rotated via the drive shaft 62 so that the front edge of the banknote 38 does not contact the vane 60.

The separating and stacking module 30 further comprises altogether four inclined deflectors 64 which in the present embodiment are pressed with their end facing the stack 36 against the front side of the stack 36 with the aid of a pre-stressed spring 65. By the inclined arrangement of the inclined deflectors 64, the upper area of the banknote 38 is moved towards the front side of the stack 36 upon a contact with the inclined deflector 64.

On the shaft 62, five further upper vane wheels 54 are arranged and connected therewith in a rotationally fixed manner so that the shaft 62 serves as a drive shaft for these altogether six vane wheels 54. A lower vane wheel visible in FIG. 2 is identified with the reference sign 66. Further, individual elements of the cassette 12*a* are shown in FIG. 2, such as a banknote retracting shutter 68 which is illustrated in the open state in FIG. 2 and which has been moved into this open position with the aid of drive elements arranged separately from the cassette 12*a*. Further, springs not illustrated in FIG. 2 are provided which exert a force on the note retracting shutter 68 in the direction of its closed position.

The separating and stacking module 30 has a pressure device 45 which contacts a banknote 38 positioned in the feeding area 46 in front of the front side of the stack 36 and presses this banknote 38 against the front side of the stack 36 at least at the contact points. The pressure device 45 is formed such that it contacts the banknote 38 in its lower half when the banknote is positioned in front of the front side of the stack 36. The pressure device 45 can comprise at least one armature of a pull/push magnet designed as a pressure pin or a pressure pin coupled to the armature.

Further, at the bottom of the banknote receiving area of the cassette 12*a* two cassette vane wheels 72 arranged on a drive shaft 71 are provided which together with belt pulleys for deflecting belts 70 arranged at the bottom of the banknote receiving area of the cassette 12*a* are connected to the drive shaft 71 in a rotationally fixed manner. Further, on this drive shaft 71*a* gear wheel (not illustrated) is arranged which is connected to this drive shaft 71 in a rotationally fixed manner and via which the drive shaft 71 can be driven by a drive unit arranged separately from the cassette 12*a* when a further gear wheel coupled to the drive unit is engaged with this gear wheel arranged on the drive shaft 71. These gear wheels are engaged when the cassette 12*a* has been inserted in receptacles provided in the safe 10 and has assumed an operating position for feeding and removing banknotes.

With the aid of the cassette vane wheels 72 and the belts 70 at least a part of the banknote stack 36 contained in the banknote receiving area of the cassette 12*a* is transported away from the feeding area 46 at least in the lower area of the banknotes of the stack 36 so that supplied banknotes 38 can be pushed into the banknote receiving area of the cassette 12*a* with the aid of the upper vane wheel 54, with the aid of the inclined deflectors 64 and/or with the aid of the note retracting shutter 68 during the closing operation. After feeding the banknote 38 into the feeding area 46, i.e. when its rear edge is no longer in the area between the drive wheel 44 and the pressure roller 50, the lower vane wheel 66 is rotated so that at least one vane 74, 76, 78 of the lower vane wheel 66 presses the rear edge and/or the lower area of the banknote 38 against the front side of the stack 36. This pressing of the lower area with the aid of the lower vane wheel 66 substantially takes place simultaneously with the movement of the banknote 38 towards the stack 36 caused by the inclined deflector 64.

Further, the separating and stacking module 30 comprises a light barrier arrangement 39 which detects the front edge of a supplied banknote 38 in the area between the drive wheel 44 so that, starting out from the point in time of the arrival of the front edge of the supplied banknote 38 and a preset delay time, the drive of the vane wheel 54 is started via the drive shaft 62. The light barrier arrangement 39 comprises a prism arrangement for a double deflection of a light beam emitted by a light source, the light source and a light sensor for detecting the light beam emitted by the light source being arranged on the same side of the transport path for feeding and removing a banknote 38. The prism arrangement is arranged on the opposite side of the transport path. As a result thereof, in particular a reliable detection is obtained since the light beam intersects the transport path of the banknotes twice. Further, a simple, compact arrangement of the light source and of the light sensor on only one side of the transport path is possible.

Further, the lower vane wheel 66 has been rotated further. Moreover, the separating and stacking module 30 comprises a stripping element 75 to strip off banknotes 38 which might adhere to the surface of the drive wheel 44 and to feed them into the feeding area 46. The stripping element 75 is preferably pressed against a stop by a spring force and is thus kept in the illustrated position.

Figure 3:
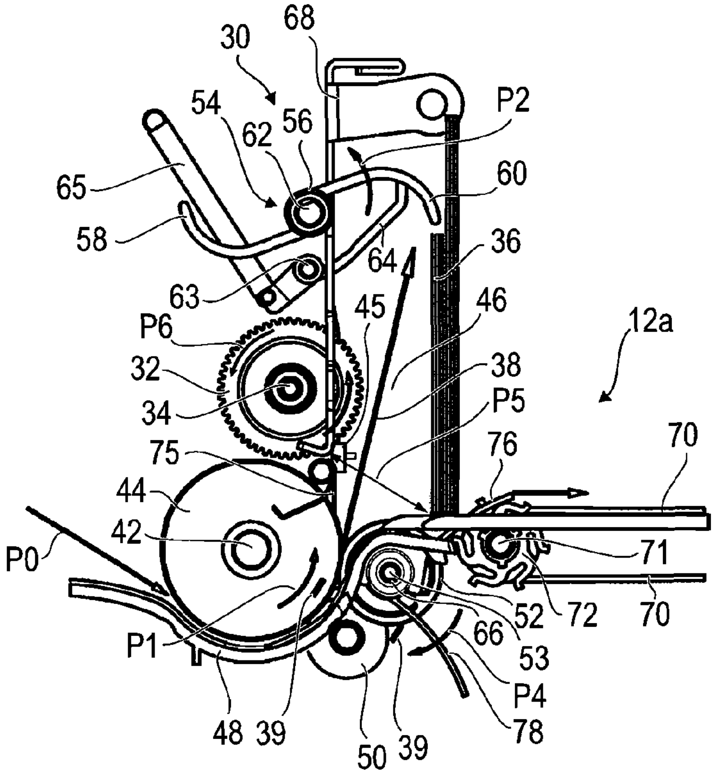
FIG. 3 shows a schematic illustration of the separating and stacking module according to FIG. 2, the feeding elements and a supplied banknote being illustrated in a second feeding position.

In FIG. 3, the separating and stacking module 30 shown in FIG. 2 is illustrated, the feeding elements 52, 54 and the banknote 38 transported into the feeding area 46 being illustrated in a second feeding position, which differs from the basic stacking position illustrated in FIG. 2.

In the feeding position shown in FIG. 3, the banknote 38 has been transported further into the feeding area 46 compared to the position shown in FIG. 2. As a result of the control of the drive of the vane wheel 54, already described in connection with FIG. 2, this vane wheel has been driven via the drive shaft 62 in the direction of the arrow P2 so that it now has the position illustrated in FIG. 3. As a result thereof, it is guaranteed that a distance between the front edge of the banknote 38 and the vane 60 is maintained so that the supplied banknote 38 does not contact the vane 60, and the feeding movement of the banknote 38 is not affected by a contact with the vane 60.

Further, the lower vane wheel 66 has been rotated further so that the vane 74 of the lower vane wheel 66 approaches the rear edge of the supplied banknote 38 and subsequently presses the rear edge or, respectively, the lower area of the supplied banknote 38 against the stack 36. The vanes 74, 76, 78 tangentially project from a hub of the lower vane wheel 66, preferably at 0°, 90° and 180°. The vanes 74, 76, 78 of the vane wheel 66 are made of an elastic material, preferably rubber and/or plastic material and are preferably curved in the direction of rotation of the lower vane wheel indicated by the arrow P4. As a result thereof, the vanes 74 to 78, upon a rotation of the lower vane wheel 66 in the direction of the arrow P4, press with a relatively high force against the lower area of the supplied banknote 38 and deform themselves thereafter in order to be pulled through between the front-side lower edge of the stack 36 and the hub of the lower vane wheel 66. The vanes 74 to 78 project from the hub of the vane wheel 66 such that, upon a rotation in the direction of the arrow P4, they have to be swiveled toward the hub only by a relatively small angle in order to rest against the circumferential surface of the hub at least in part.

Figure 4:
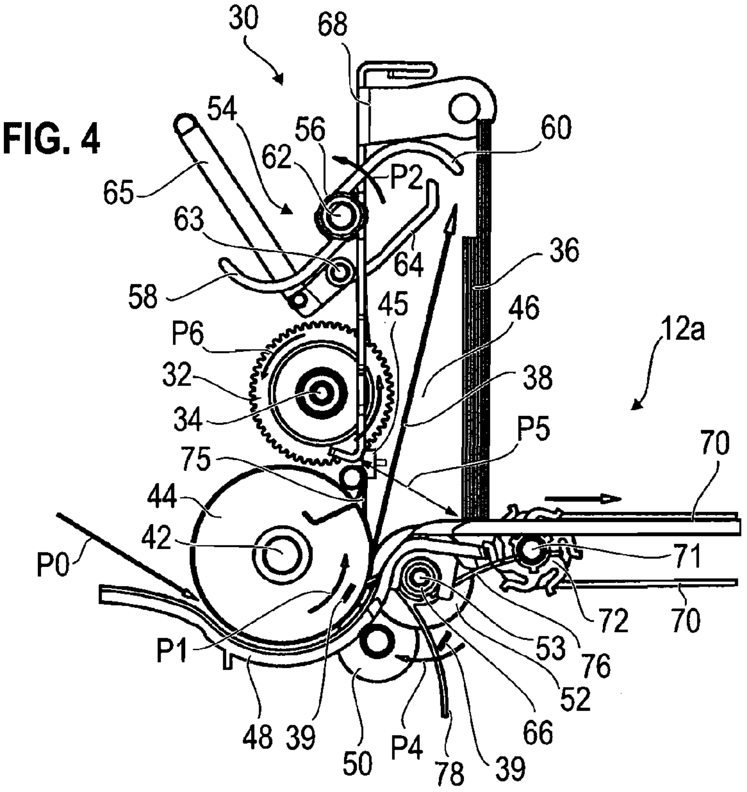
FIG. 4 shows a schematic illustration of the separating and stacking module according to FIGS. 2 and 3, the feeding elements and a supplied banknote being illustrated in a third feeding position.

In FIG. 4, a further schematic illustration of the separating and stacking module 30 according to FIGS. 2 and 3 is illustrated, the feeding elements 54, 66 as well as the supplied banknote 38 being illustrated in a third feeding position. In this third feeding position, the upper vane wheel 54 is further rotated in the direction of the arrow P2.

Figure 5:
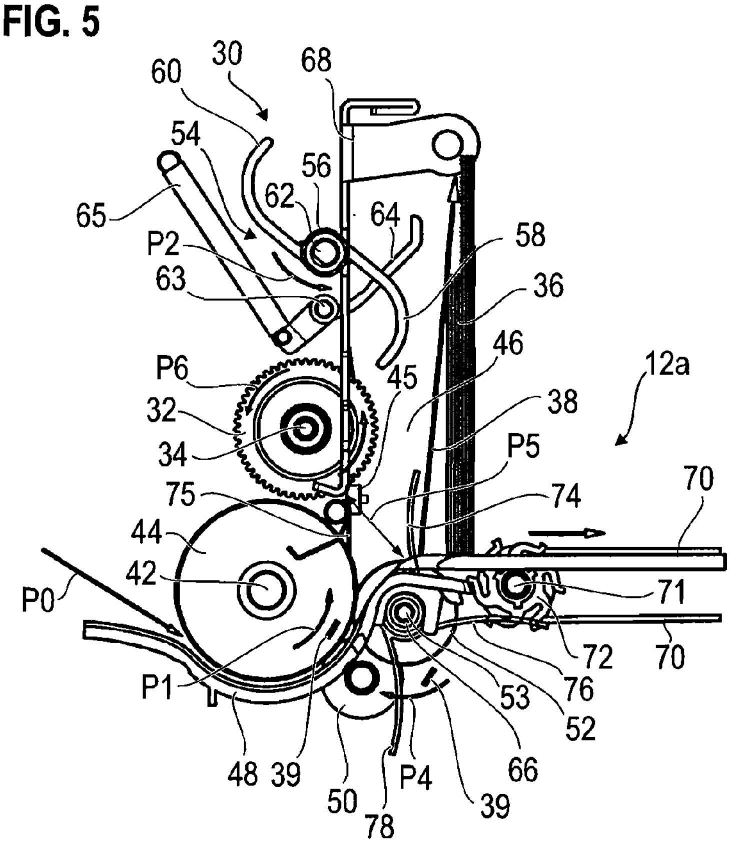
FIG. 5 shows a schematic illustration of the separating and stacking module according to FIGS. 2 to 4, the feeding elements and a supplied banknote being illustrated in a fourth feeding position.

In FIG. 5, a schematic illustration of the separating and stacking module 30 according to FIGS. 2 to 4 is shown, the feeding elements 54, 66 as well as the supplied banknote 38 being illustrated in a fourth feeding position. Compared to the third feeding position illustrated in FIG. 4, the upper vane wheel 54 has been rotated further in the direction of the arrow P2 so that the vane 58 is swung into the feeding area 46 and thereafter is rotated further up into the basic stacking position illustrated in FIG. 2 in which the front curved area of the vane 58 presses against the supplied banknote 38 and pushes the same together with other banknotes of the stack 36 into the banknote receiving area of the cassette 12*a*. In the lower area of the supplied banknote 38, the three vanes 74 to 78 are guided past the rear edge of the supplied banknote 38 until they are again arranged in the basic stacking position shown in FIG. 2. Further, the lower area of the banknote 38 is pressed against the front side of the stack 36 by the pressure device 45 as a result whereof a fluttering of the banknote 38 is reduced, which fluttering is in particular caused by the vanes 74 to 78 passing by.

The note retracting shutter 68 has a number of openings through which the upper vane wheel 54, the inclined deflector 64 and the pull-off wheel 32 are passed and contact a banknote 38 dependent on the operating mode of the separating and stacking module 30. For the further pull-off wheels 32, the further upper vane wheels 54 and the further inclined deflectors 64 further openings are provided in the note retracting shutter 68 so that these, too, can contact the banknote 38 through the note retracting shutter 68 in the same manner as already described for the feeding and separating elements 32, 54, 64. In the open position of the note retracting shutter 68, a feeding and removal opening is provided at least over a width of the widest banknote 38 which can be supplied, which opening is characterized by the arrow P5. Via this feeding and removal opening, a banknote 38 to be supplied reaches the feeding area 46. In the same manner, a banknote 38 to be removed from the cassette 12*a* is transported through the feeding and removal opening to the drive wheels 44 and is transported with the aid of the drive wheels 44, which are then driven in the opposite direction of the arrow P1, further to the transport elements 16*a*.

Figure 6:
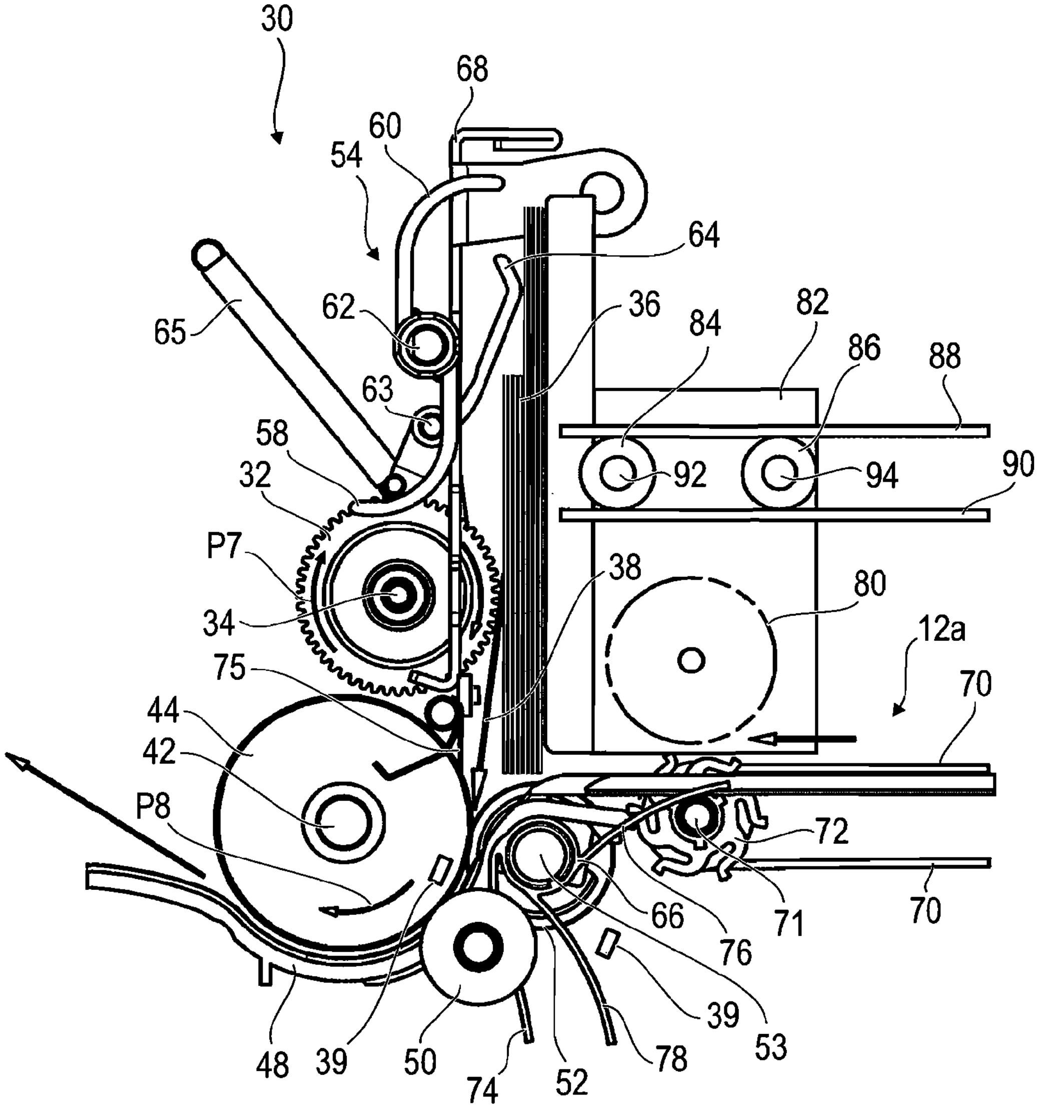
FIG. 6 shows a schematic illustration of the separating and stacking module according to FIGS. 2 to 5, the feeding elements and the separating elements being illustrated in a separating position for pulling off a banknote from the stack contained in the container.

In FIG. 6, a further schematic illustration of the separating and stacking module 30 according to FIGS. 2 to 5 is shown, the feeding elements and the separating elements as well as the banknote stack 36 arranged in the cassette 12*a* being illustrated in a separating position for the pull-off of a banknote 38 from the banknote stack 36 contained in the cassette 12*a*. The vanes 58, 60 of the upper vane wheel 54 have been rotated via the drive shaft 62 into a basic stacking position illustrated in FIG. 6 and remain in this basic stacking position during the entire separating operation for the removal and the transport of a banknote 38 out of the cassette 12*a*.

With the aid of a displacement carriage 82 driven by an electric motor 80 the stack 36 is moved into a separating position towards the pull-off wheel 32 so that the front side of the stack 36 or, respectively, the banknote 38 forming the front side of the stack 36 is pressed against the circumferential surface of the pull-off wheel 32 as well as against the surface of the further pull-off wheels 32 arranged parallel to the pull-off wheel 32. By moving the stack 36 towards the pull-off wheel 32, the inclined deflector 64 is swiveled about the axis of rotation 63, as a result whereof the spring 65 generating the pressure force of the inclined deflector 64 is biased or is further biased. For the removal of the banknote 38 forming the front side of the stack 36 the pull-off wheel 32 is rotated with the aid of a drive unit in the direction of the arrow P7, which direction is opposite to the direction of rotation of the pull-off wheel 32 in FIGS. 2 to 5 indicated by the arrow P6. By this rotation of the pull-off wheel 32, the foremost banknote 38 of the stack 36 is moved or transported downwards past the stripping rollers 52 and into the area between the drive wheels 44 and the pressure roller 50. The surfaces of the drive wheels 44 and of the pull-off wheels 32 preferably have a relatively high coefficient of friction. Preferably, the surfaces of the pull-off wheels 32 and of the drive wheels 44 are made of rubber or another material having a similar coefficient of friction. In addition, the surface of the pull-off wheel 32 is structured by transverse grooves. By means of these transverse grooves a higher adherence between the surface of the pull-off wheel 32 and the banknote 38 to be moved downwards can be created.

For the removal or further transport of a banknote 38 moved downwards with the aid of the pull-off wheels 32, the drive wheels 44 are driven in the direction of the arrow P8. The lower vane wheel 66 is positioned in a basic separating position such that its vanes 74 to 78 do not project into the transport path for the removal and further transport of the banknote 38.

The displacement carriage 82 has axles 84, 86 which each extend from the displacement carriage 82 up to the side walls of the cassette 12*a* laterally bounding the stack 36, guiding wheels 92, 93 which engage in guiding rails 88, 90 being provided at the end of the axles. The guiding rails 80, 90 are formed in or at the side walls.

Figure 7:
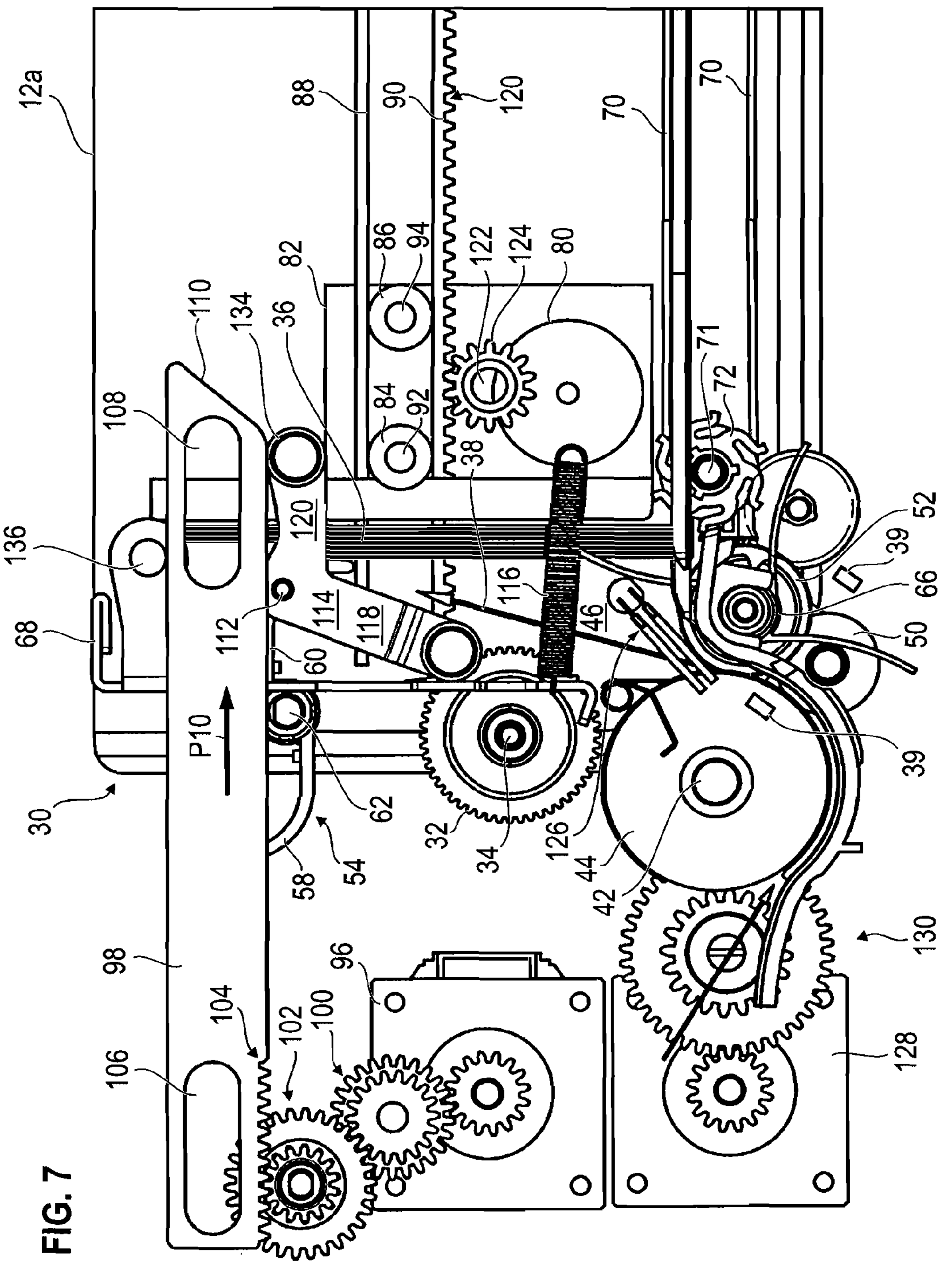
FIG. 7 shows an arrangement with the separating and stacking module according to FIGS. 2 to 6, with further elements of the cassette for storing the banknotes and with a drive for actuating a note retracting shutter, the note retracting shutter being illustrated in an open position.

In FIG. 7, an arrangement with the separating and stacking module 30 according to FIGS. 2 to 6 with further elements of the cassette 12*a* for storing the banknotes and with a drive for actuating the note retracting shutter 68 is illustrated, the note retracting shutter 68 being shown in an open position in the illustration according to FIG. 7.

A drive unit 96 displaces a sliding element 98 via gear stages 100, 102 in the direction of the arrow P10. The gear stages 100, 102 each time create a gear reduction. The driven gear wheel of the gear stage 102 engages with a gear rack 104 formed on the sliding element 98 for displacing the sliding element 98. The sliding element 98 further has oblong holes 106, 108 through which non-illustrated guiding bolts project, the displacement area of the sliding element 98 being restricted by these guiding bolts and the oblong holes 106, 108. The sliding element 98 further has an inclination 110. In FIG. 7, the sliding element 98 is illustrated in a position in which by means of the already mentioned restriction of the displacement area no further displacement in the direction of the arrow P10 is possible. With the aid of the sliding element 98 a lever 114 pivotable about the axis of rotation 112 has been pivoted. By pivoting the lever 114, the note retracting shutter 68 has been moved away from the front side of the stack 36, as a result whereof a feeding and separating opening P5 already explained in connection with FIGS. 2 to 5 is opened. By pivoting the lever 114 into the position shown in FIG. 7, a spring 116 provided for the retraction of the note retracting shutter 68 is stressed, which spring exerts a restoring force on the note retracting shutter 68. This restoring force is transmitted at least in part from the note retracting shutter 68 onto the lever arm 118. By means of this restoring force, the second lever arm 120 is pressed from below against the sliding element 98 in the present embodiment. The inclination 110 of the sliding element 18 is formed as a wedge-shaped inclination, as a result whereof the sliding element 98 is also referred to as wedge slider. In the following, the closing of the note retracting shutter 68 is still explained in more detail in connection with FIG. 8.

In FIG. 7, further a drive shaft 122 driven via the motor 80 for displacement of the displacement carriage 82 as well as a gear wheel 124 connected to the shaft 122 in a rotationally fixed manner at one end of the drive shaft 112 are illustrated. The gear wheel 124 engages with a gear rack 120 formed on the lower guiding rail 90 and stationarily connected to the cassette 12*a*. Alternatively to the illustrated arrangement, the gear wheel 124 for engagement with a gear rack formed on the cassette 12*a* can be combined with one of the guiding wheels 92, 94 or can replace these.

Moreover, in the arrangement shown in FIG. 7, a further sensor arrangement 126 is provided additionally to the light barrier arrangement 39 already mentioned further above. The sensor arrangement is provided for monitoring the feeding area 46 and is designed as a transverse light barrier in the present embodiment. With the aid of the transverse light barrier 126, banknotes 38 can be detected when they are in the feeding area 46.

Further, a drive unit 128 as well as a gear stage 130 are shown for driving the drive shaft 42 on which the drive wheel 44 is arranged. In the present embodiment, the drive units 128, 96, 80 are formed as electric motors, preferably as stepper motors or as DC motors, wherein also a part of the drive units can be designed as stepper motors and another part as DC motors.

Figure 8:
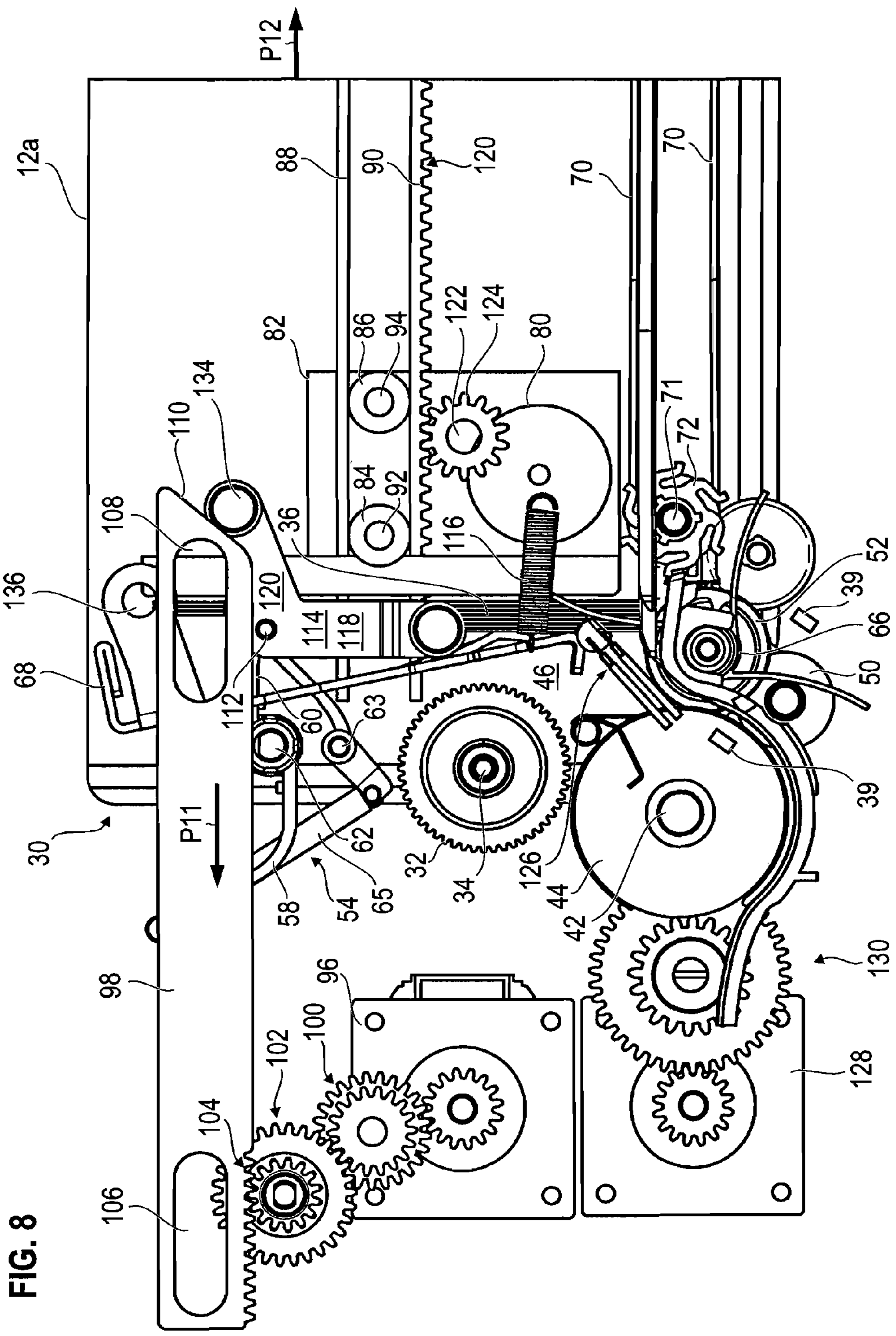
FIG. 8 shows the arrangement according to FIG. 7 with a closed note retracting shutter.

In FIG. 8, the arrangement according to FIG. 7 with a closed note retracting shutter 68 is shown. For closing the note retracting shutter 68, the sliding element 98 has been moved with the aid of the drive unit 96 and the gear stages 100, 102 in the direction of the arrow P11. As a result thereof, the lever 114 has been pivoted via the force introduced by the spring 116 into the note retracting shutter 68, after a rotatable guiding roll 134 arranged at the end of the lever arm 120 has been guided upwards along the inclination 110 during the displacement in the direction of the arrow P11. As a result thereof, the lever arm 118, too, is pivoted about the axis of rotation 112 in counter-clockwise direction so that the note retracting shutter 68 is rotated about an axis of rotation 136 and the removal and feeding opening P5 is closed at least so far that the removal of a banknote of the stack 36 is not possible or only with high efforts.

Figure 9:
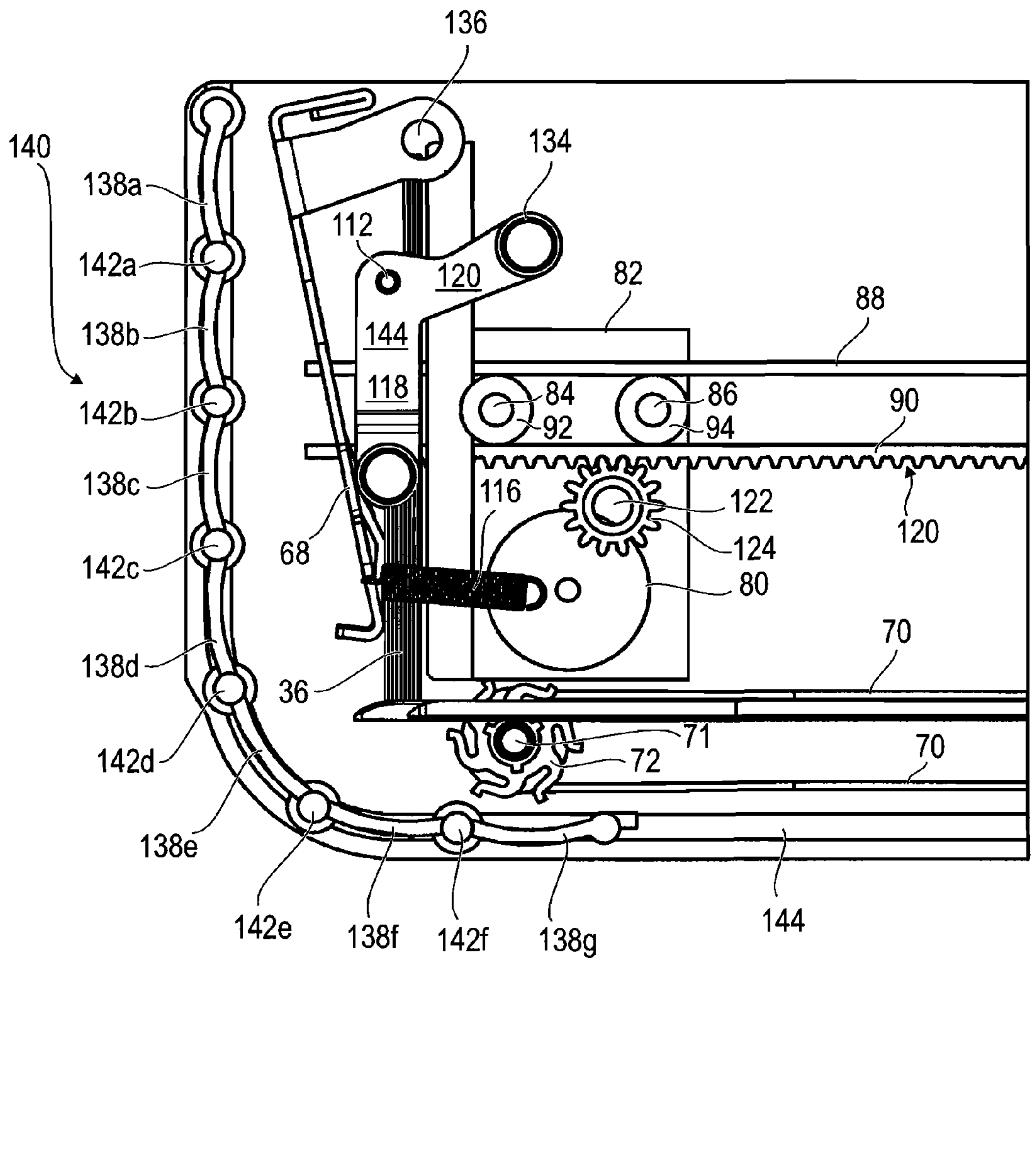
FIG. 9 shows a portion of the cassette for storing the banknotes after separation of the cassette from the separating and stacking module according to FIGS. 2 to 8.

In FIG. 9, a portion of the cassette 12*a* for storing banknotes after the separation of the cassette 12*a* from the separating and stacking module 30 is illustrated. For separation from the feeding and separating elements of the stacking and separating module 30 the cassette 12*a* has been moved in the direction of the arrow P12 (see FIG. 8) by pulling the cassette 12*a* out of an opening of the safe 10. The note retracting shutter 68 has previously been pivoted into its closed inactive position by an active drive with the aid of the drive unit 96 by a corresponding movement of the sliding element 98. Unless the note retracting shutter 68 has been arranged in the inactive position, the cassette 12*a* is locked against removal.

Alternatively, the pivoting of the note retracting shutter 68 takes place upon movement of the cassette 12*a* in the direction of the arrow P12 automatically via the spring force of the spring 116 since also upon a movement of the cassette 12*a* in the direction of the arrow P12 the guiding roll 134 of the lever arm 120 is guided along the inclination 110 of the sliding element 98 so that the lever 114 is pivoted by the spring force of the spring 116 and the note retracting shutter 68 is closed. Further, the cassette 12*a* has several interconnected lamellae 138*a* to 138*g* for closing the front side 140 of the cassette 12*a*. The lamellae 138*a* to 138*g* are connected to the respective adjacent lamellae such or, respectively, are formed in the connecting area such that a relative pivoting of the lamellae 138*a* to 138*g* about the axes of rotation 142*a* to 142*e* is possible within a limited angular range so that the lamellae 138*a* to 138*g* which are guided laterally in guiding rails 144 are guided along a curved track defined by the guiding rails. The lamellae 138*a* to 138*g* are shifted into an area underneath the banknote receiving area of the cassette 12*a* when the inserted cassette 12*a* is in an operating position. In the operating position, the feeding and separating elements can contact a banknote 38 arranged at the front side of the stack 36 through the openings in the note retracting shutter 68. In the closed state, the lamellae 138*a* to 138*g* cover both the substantially vertical front side 140 of the cassette 12*a* as well as an area underneath the note retracting shutter starting out from the front side 140 so that the entire feeding and removal area is completely covered by the lamellae 138*a* to 138*g* when the cassette 12*a* is removed from the safe 10.

The moving of the lamellae 138*a* to 138*g* into the closed position shown in FIG. 9 as well as the moving of the lamellae 138*a* to 138*g* into an open position preferably takes place via engagement elements when the cassette 12*a* is moved into the safe 10 or, respectively, out of the safe 10. Upon insertion, then preferably at least one engagement element stationarily arranged in the safe 10 engages with at least one engagement opening of at least one lamella 138*a* to 138*g*. By the engagement of the engagement element with the engagement opening the lamellae 138*a* to 138*g* are opened like a roller shutter or blinds when the cassette 12*a* is pushed further into the safe 10, i.e. in a direction opposite to the arrow P12, so that the front side 140 of the cassette 12*a* as well as an area at the underside of the cassette 12*a* is opened starting out from the front side 140 of the cassette 12*a*. This lower area preferably extends up to the front side of the banknote stack 38 so that in particular the vanes 74 to 78 of the lower vane wheel 66 can contact the banknote stack 36 as described.

By the at least one engagement element which projects into the engagement opening, the lamellae 138*a* to 138*g* are again moved into the closed position shown in FIG. 9 when the cassette 12*a* is moved in the direction of the arrow P12, in which closed position no access to the note retracting shutter 68 or the banknote stack 36 contained in the cassette 12*a* is possible. The lamella 138*g* is at least in part covered by a bottom plate of the cassette 12*a* so that the cassette 12*a* is completely closed in the closed position by moving the lamellae 138*a* to 138*g*. Thus, in this closed position there are no openings via which banknotes or parts of banknotes could be removed.

Figure 10:
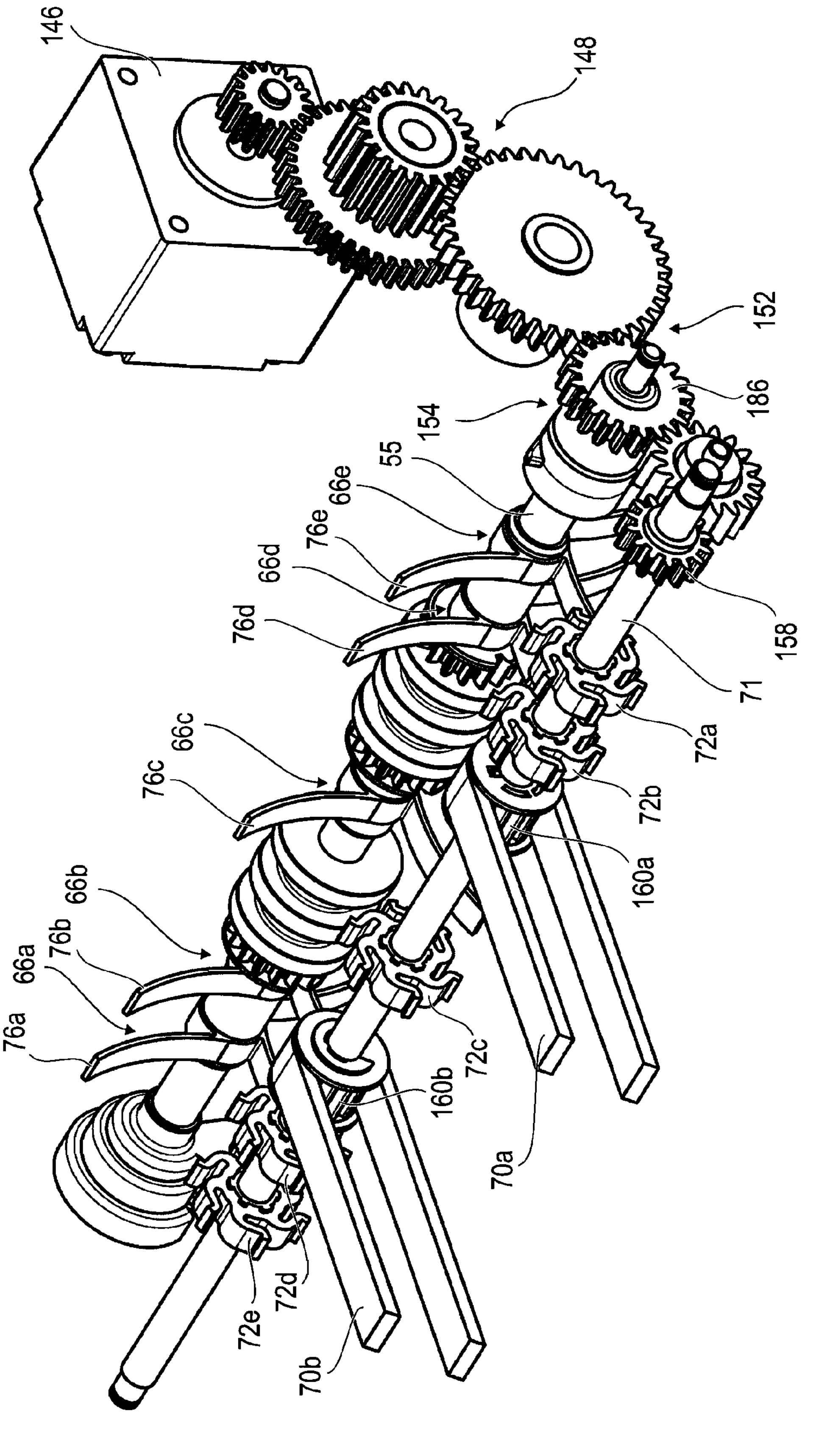
FIG. 10 shows a three-dimensional illustration of the drive elements for driving vane wheels arranged in the cassette near the front side.

In FIG. 10, a three-dimensional view of the drive elements for driving cassette vane wheels 72 arranged in the cassette 12*a* near the front side 140 as well as the shaft 53 with the lower vane wheels 66 arranged thereon and the stripping rollers 52 arranged thereon is shown. By means of an electric motor 146, the drive shaft 71 is driven via several gear stages 148 to 154, on which a gear wheel 158, two toothed belt pulleys 160*a*, 160*b* as well as several cassette vane wheels 72*a* to 72*e* are arranged in a rotationally fixed manner. Via the belt pulleys 160*a*, 160*b* the bottom belts 70*a*, 70*b* designed as toothed belts are guided and deflected. As already described, the belts 70*a*, 70*b* contact the underside of the banknotes arranged upright on the belts 70*a*, 70*b*, which banknotes are contained in the stack 36 in the cassette 12*a*, or contact at least a part of these banknotes. In the preceding figures, only the vane wheel 72*e* is illustrated and referenced as a vane wheel 72 and the belt 70*b* is illustrated and referenced as a belt 70. In the description, identical elements which are provided several times in one specific arrangement are identified with the reference sign itself if they are illustrated only once in the respective Figure, and are identified with an additional consecutive small letter each if the element occurs several times within one Figure.

Only the shaft 71 and the elements 158, 160*a*, 160*b*, 72*a* to 72*e* arranged thereon form part of the cassette 12*a*. The other elements of the gear stages 148, 150, 152, 154 as well as the electric motor 146 are arranged separately from the cassette 12*a*. When the cassette 12*a* is in an operating or working position inserted in the safe 10, a gear wheel of the gear stage 154 engages with the gear wheel 158 arranged on the shaft 71 of the cassette 12*a* so that the shaft 71 is driven and rotated when the driven shaft of the motor 146 is rotated.

Figure 11:
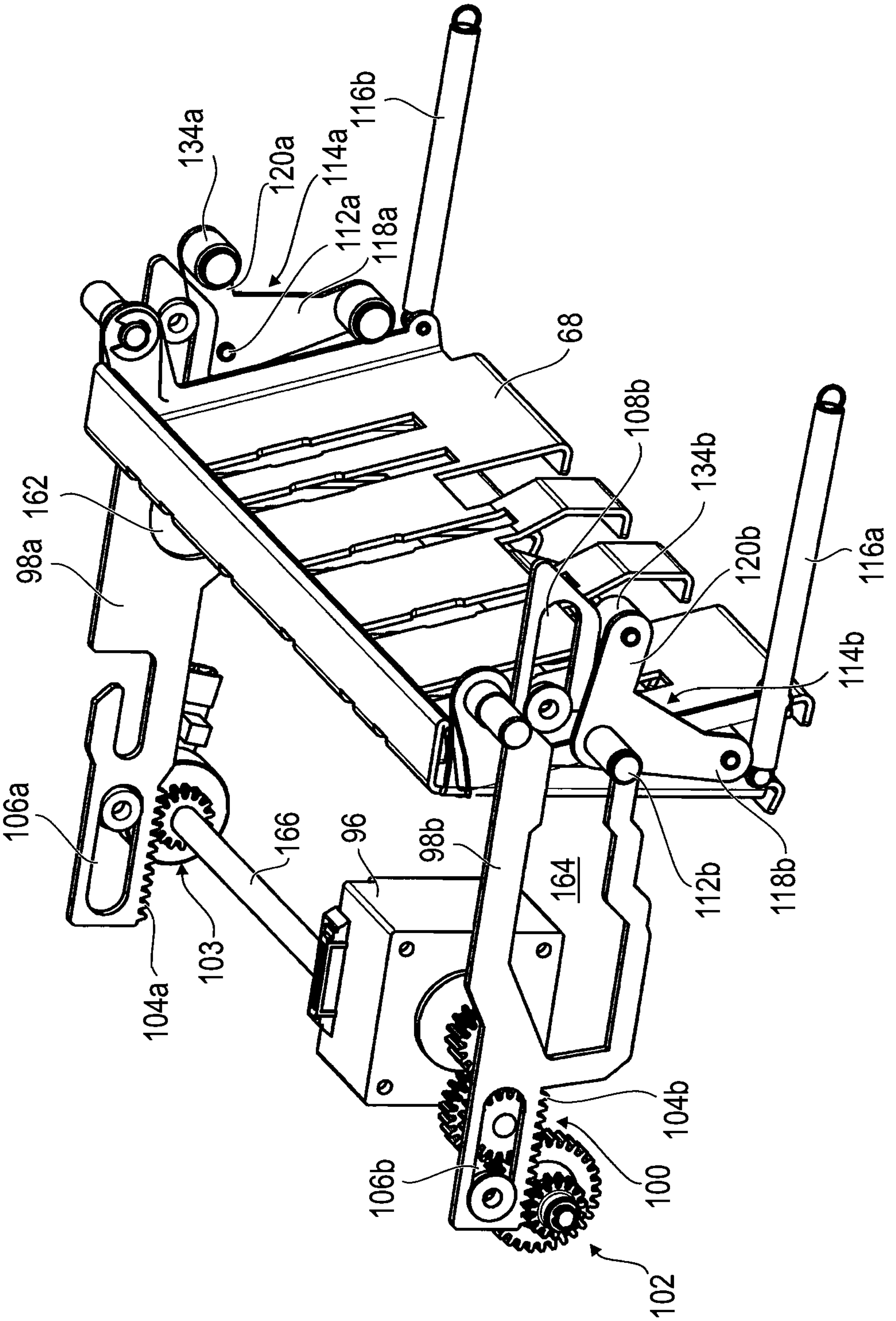
FIG. 11 shows a three-dimensional illustration of the drive elements for driving the note retracting shutter.

In FIG. 11, a three-dimensional illustration of the drive elements for driving the note retracting shutter 68 is illustrated. As already explained in connection with FIG. 7, the note retracting shutter 68 is driven via an electric motor 96 which displaces the sliding elements 98*a*, 98*b* in parallel via gear stages 100, 102 and a gear rack 104*a*, 104*b* formed on the sliding elements 98*a*, 98*b*. The rotary movement initiated by the motor 96 is transmitted via a shaft 166 and a gear wheel 103 arranged at the other end of the shaft 166, which gear wheel 103 engages with the gear rack 104*a*. As a result thereof, the driving rotary motion is converted into a linear motion by which the sliding elements 98*a*, 98*b* are displaced in parallel. In addition to the oblong holes 106*a*, 108*a* for guiding the movement of the sliding element 98*a*, the sliding element 98*a* has an opening 162 through which further elements of the separating and stacking module 30 can be passed. Further, in addition to the oblong holes 106*b*, 108*b*, the sliding element 98*b* has a further opening 164 through which further elements of the separating and stacking module 30 can be passed. The lever arms 118*a*, 118*b* contact the note retracting shutter 68 at opposite sides so that this note retracting shutter 68 is opened or, respectively, closed simultaneously via the ends of the lever arms 118*a*, 118*b* when the sliding elements 98*a*, 98*b* are displaced in parallel.

Figure 12:
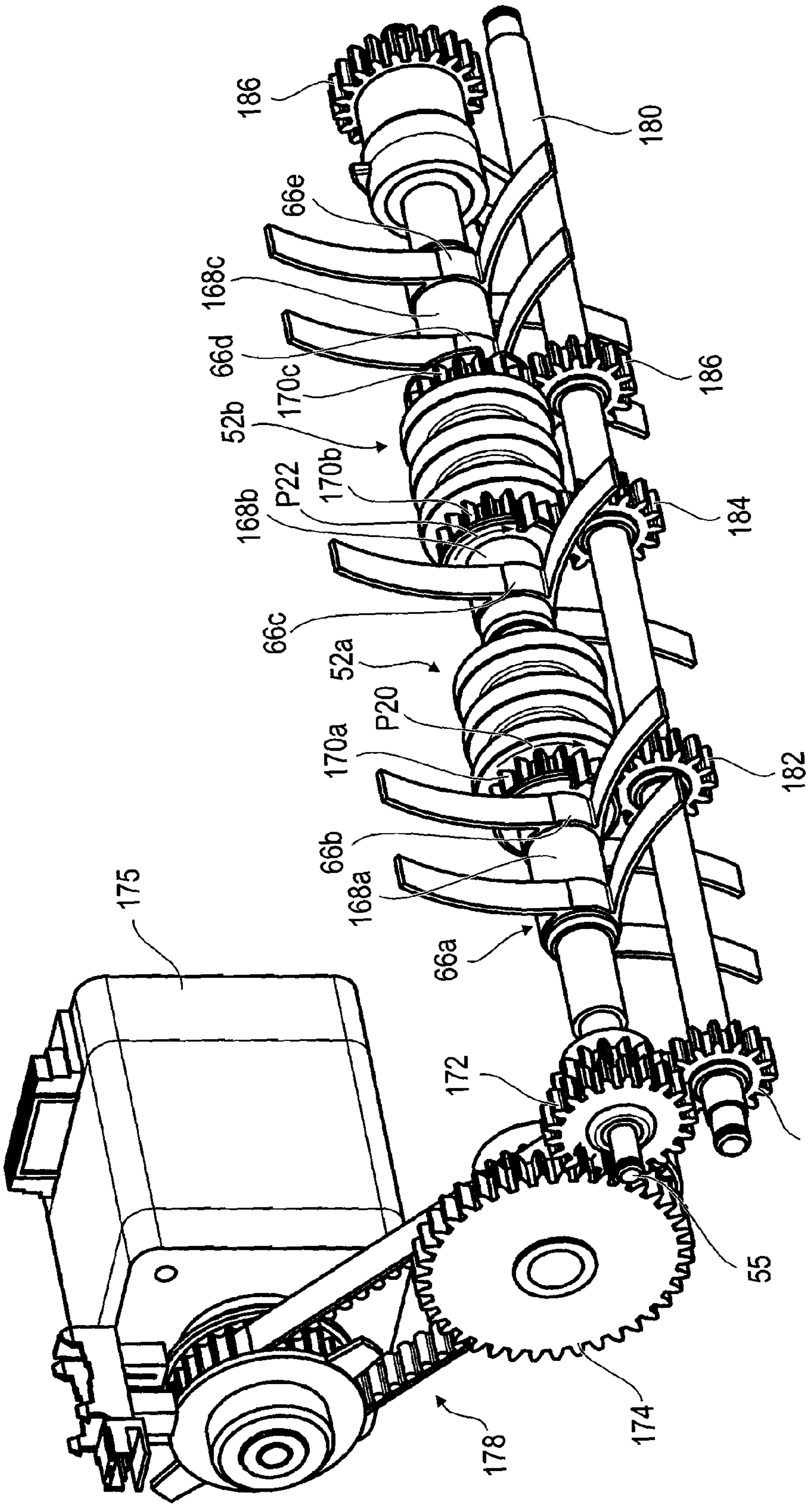
FIG. 12 shows a three-dimensional illustration of a lower vane wheel shaft arranged separately from the cassette as well as of transmission elements for driving the vane wheel shaft.

In FIG. 12, a three-dimensional illustration of a lower vane wheel shaft 55 as well as of transmission elements for driving this vane wheel shaft 55 is shown. In addition to the lower vane wheels 66*a* to 66*e*, two stripping rollers 52*a*, 52*b* are arranged on the shaft 55. The lower vane wheels 66*a* and 66*b* are arranged on a sleeve 168*a* and connected to this sleeve 168*a* in a rotationally fixed manner, the sleeve 168*a* being pushed over the shaft 55 and being freely rotatable with respect to the shaft 55. Further, a gear wheel 170*a* is connected to this sleeve 168*a* in a rotationally fixed manner so that the sleeve 168*a* can be driven via the gear wheel 170*a* independent of the shaft 55. At one end of the shaft 55, a double gear wheel 172 is arranged so as to be freely rotatable on the shaft. Together with further gear wheels 174, 176, as well as together with a belt drive 178, this double gear wheel 172 serves for gear reduction of the output speed of a drive unit 175. The rotary motion is transmitted from the gear wheel 176 arranged on a drive shaft 180 in a rotationally fixed manner to the drive shaft 180, and from this drive shaft 180 via further gear wheels 182, 184, 186 to the gear wheels 170*a*, 170*b*, 170*c* connected to the sleeves 168*a*, 168*b*, 168*c* in a rotationally fixed manner.

A further gear wheel 186 is arranged on the end of the shaft 55 opposite to the gear wheel 172, which gear wheel 186 is connected to the shaft 55 via a freewheeling mechanism so that a rotary motion of the stripping rollers 52*a*, 52*b* is possible in the direction of the arrows P20, P22 when the shaft 55 is not driven via the gear wheel 186 in the direction of the arrows P20, P22. For preventing a double pull-off, i.e. for preventing the simultaneous removal of two banknotes from the container 12*a*, the stripping rollers 52*a*, 52*b* are likewise driven in the direction of rotation of the arrows P20, P22 via the shaft 55 and the gear wheel 186. In other embodiments, the gear wheel 186 can be connected to the shaft 55 in a rotationally fixed manner, as a result whereof the freewheeling mechanism can be dispensed with. Then, the stripping rollers 52*a*, 52*b* are to be driven by a drive unit via the gear wheel 186 and the shaft 55 in the direction of the arrows P20, P22 when a banknote 38 is fed into the feeding area 46.

Figure 13:
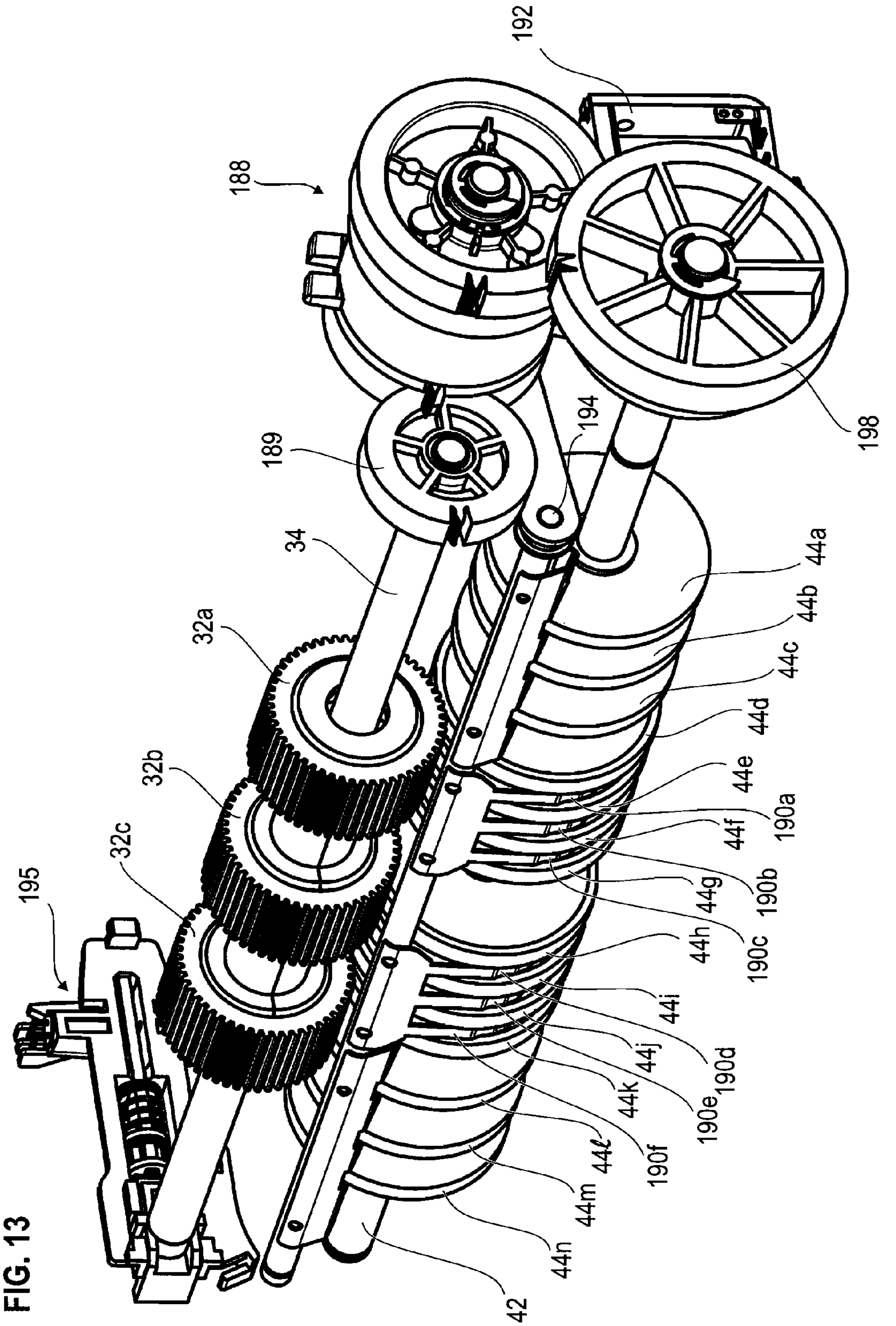
FIG. 13 shows a three-dimensional illustration of separating elements for the removal of a banknote from the cassette and for the further transport of the removed banknote.

In FIG. 13, a three-dimensional illustration of separating elements for the removal of a banknote 38 from the cassette 12*a* and for the further transport of the removed banknote 38 is illustrated. The already mentioned three pull-off wheels 32*a*, 32*b*, 32*c* which are connected with the drive shaft 34 in a rotationally fixed manner and which are spring-mounted on this shaft 34 are driven for pulling off the banknote 38 arranged at the front side of the stack 36. The shaft 34 is connected via a magnetic coupling 188 to a non-illustrated drive unit, wherein by means of the magnetic coupling 188 the connection to the drive unit can be established or interrupted as required. This possibility of interrupting via the coupling 188 is in particular useful when the drive unit for driving the shaft 34 drives further elements of the separating and stacking module 30 and/or further transport elements 16*a* to 16*d*, and the pull-off wheels 32*a* to 32*c* shall not necessarily rotate whenever the other elements are driven. On the main drive shaft 42, the drive wheels 44*a* to 44*n* are arranged. Between the drive wheels 44*d*, 44*e*, 44*f*, 44*g* as well as between the drive wheels 44*h*, 44*i*, 44*j*, 44*k* one retaining element 190*a* to 190*f* each is arranged. The retaining elements 190*a* to 190*f* project like fingers from a shaft 194 to which they are connected in a rotationally fixed manner. With the aid of a pivot arrangement for rotating the shaft 194 by only a few angular degrees, the retaining elements 190*a* to 190*f* can be moved out of the spaces between the drive wheels 44*d* to 44*g* as well as 44*h* to 44*k* with their ends remote from the shaft 194 so that they come out of the enveloping circumferential surface of these drive wheels 44*b* to 44*k* and are pressed against the surface of the stripping rollers 52*a*, 52*b*. The banknotes present between the stripping rollers 52*a*, 52*b* and the retaining elements 190*a* to 190*f* are thus pressed against the stripping rollers 52*a*, 52*b* by the retaining elements 190*a* to 190*f* for preventing a double pull-off. The pivot arrangement comprises a pull magnet 192 as a drive unit.

The drive shaft 34 is driven via the magnetic coupling 188 and the gear wheel 189 arranged on one end of the shaft 34.

The opposite end of the shaft 34 is pressed in the direction of the note stack 36 with the aid of a pressure device 195. The pressure device 195 further comprises a pressure sensor which detects at least a position of the end of the drive shaft 34 held in the pressure device 195. By the spring-mounting of the pull-off wheels 32*a* to 32*c* which are preferably arranged on a common sleeve 196, the sleeve 196 being spring-mounted on the drive shaft 34, the pull-off wheels 32*a* to 32*c* can be pressed against the front side of the stack 36 oriented in parallel and with a desired preset pressure force so that the banknotes 38 to be removed from the cassette 12*a* are not pulled off in an inclined manner. The pull-off wheels 32*a* to 32*c* are arranged on the sleeve 196 in a rotationally fixed manner, the sleeve 196 being connected to the drive shaft 134 in a rotationally fixed manner. By the spring-mounting of the sleeve 196 on the drive shaft 34, however, a common pivoting of the pull-off wheels 32*a* to 32*c* is possible so that these orient in parallel relative to the front side of the stack 36 when the pull-off wheels 32*a* to 32*c* are pressed against this front side and thus enable a parallel pull-off of the banknote 38 present at the front side of the stack 36.

The drive shaft 42 is driven via the gear wheel 198 arranged at one end of the drive shaft 42 via drive elements of a central distribution module arranged in the safe 10, which module drives further transport elements 16*a* to 16*d* of the transport path 18. This gear wheel 198 is designed as a double gear wheel and drives the drive side of the magnetic coupling 188. As a result thereof, no separate drive for driving the drive wheels 44 and the pull-off wheels 32 in the separating and stacking module 30 is required.

By the separating and stacking module 30 according to the first embodiment of the invention a module separation between the cassette 12*a* and the feeding and separating elements takes place. As a result thereof, a simply constructed, cost-efficient cassette 12*a* can be used, the feeding and separating elements being arranged in the safe 10 or, respectively, in the automated teller machine and remaining in the safe 10 or, respectively, the automated teller machine when the cassette 12*a* is removed. The cassette 12*a* can be used in a first automated teller machine for the deposit and withdrawal of banknotes (cash recycling), and in the case of a new configuration of the same automated teller machine or in the case of a use of this cassette 12*a* in another automated teller machine it can be used as a mere withdrawal cassette 12*a*. It is advantageous to arrange the cassette 12*a* such that the front side of a banknote stack 36 contained in the cassette 12*a* is arranged vertically, i.e. that the stacking direction or, respectively, the stacking depth runs horizontally. The separating and stacking module 30 and the cassette 12*a* can however also be arranged such that the stacking direction or, respectively, the stacking depth extends vertically, the front side of the stack 36 at which the banknotes can be pulled off from the stack 36 and further banknotes can be supplied to the stack 36, then being arranged horizontally at the upper side of the stack 36.

The upper two-vaned vane wheels 54 with rigid vanes 58, 60 are formed and arranged such that the enveloping circle of the vanes 58, 60 ends at the top approximately with the highest allowable note height and, in the horizontal basic stacking position, also supports a stack 36 formed of the smallest allowable banknotes 38 or, respectively, pushes it further into the cassette 12*a*. During a feeding operation for feeding a banknote 38, one vane change-over each takes place, i.e. before feeding the banknote 38 the first vane 60 contacts the front side of the stack 36 and after feeding the banknote 38 the second vane 58 contacts the front side of the stack 36. In this process, a dynamic triggering of the vane change-over takes place dependent on the detection of the banknote front edge of the banknote 38 to be supplied by the light barrier arrangement 39, the vane change-over time being selected such that a just supplied banknote 38 is moved towards the stack 36 or, respectively, is hit and pushed by the outer curvature of the curved vane end towards the stack 36. The vane change-over time is preferably set dependent on the size of the supplied banknote 38, i.e. is varied size-dependent. The inclined deflectors 64 guide a supplied banknote 38 away from the center of the vane 60, or respectively, 58 of the vane wheel 54 and towards the front side of the stack 36. The vanes 74, 76, 78 of the lower vane wheel are tangentially connected to a hub of the vane wheel 66, the front area of the vanes 74, 76, 78 each having a curvature. The curvature is formed such that in the direction of rotation of the vane wheel 54 the vane tips are ahead of the remaining part of the vanes 58, 60 when a banknote 38 is supplied.

The main drive shaft 42 with the drive wheels 44 is continuously driven via an electric motor for driving the transport elements of the transport path 18, wherein the drive shaft 34 with the pull-off wheels 32 arranged thereon can be selectively coupled or decoupled with the drive of the drive wheels 44 via the magnetic coupling 188. The continuous drive of the drive wheels 44 as well as the selective drive of the pull-off wheels 32 takes place via a central drive for the transport elements 16*a* to 16*d* arranged in the safe 10, which central drive has a high torque reserve so that banknotes which are difficult to separate, e.g. adhering banknotes which are hot of the press or notes with polymer foil, can likewise be separated with the aid of the pull-off wheels 32 and can be transported with the aid of the drive wheels 44. In this process, the pull-off wheels 32 are driven via the activated magnetic coupling 188 until the banknote has reached the detection area of the light barrier arrangement 75 arranged in the area of the drive wheels 44. This has the advantage that the entire operation for the pull-off and the further transport of the banknote 38 does not fall out of step in the case of delays in the pull-off or the further transport, for example as a consequence of adhering banknotes, as this might occur in the case of rigidly mechanically coupled separating drives. Rather, upon arrival of a sheet edge of the banknote 38 to be removed, the transport is simply continued so that the control for the transport of the banknote 38 takes place in an event-driven manner dependent on the event "arrival of the sheet edge of the pulled-off banknote 38 in the detection area of the light barrier arrangement".

For a trouble-free feeding of a banknote into the cassette 12*a*, at least in the first embodiment of the invention the following conditions are preferably met:

1. In front of the front side of the banknote stack 36 a free feeding area (free space) 46 for the banknote 38 to be supplied has to be created against the stack pressure of the stack 36 and should be kept free from the stack pressure of the stack 36.
2. The rear edge of a supplied banknote 38 should be supplied to the stack 36 as soon as it has left the contact area between drive wheel 44 and pressure roller 50 or, respectively, between drive wheel 44 and stripping roller 52.

The stack pressure already mentioned is determined in particular by the stack thickness, the condition and the properties of the banknotes arranged in the stack 36, and the position of the displacement carriage 82. Almost over the entire time period during which the banknote 38 to be supplied is transported into the feeding area 46, the stack 36 is pushed out of the feeding area 46 with the aid of the upper vane wheels 54. For this, several vane wheels 54 are arranged on the drive shaft 62 so as to be distributed over the maximum allowable note width, which drive shaft is arranged horizontally in the first embodiment of the invention. The drive shaft 62 with the vane wheels 54 is preferably driven with the aid of a stepper motor, the drive shaft 62 being rotated by 180° every time a banknote 38 is supplied. As already mentioned, the vane wheels 54 are driven such that the front edge of a supplied banknote 38 does not contact the vane 58, 60 projecting into the feeding area 46 but that there is rather a minimum distance between the front edge of the supplied banknote 38 and the vane 58, 60 by means of a suitable control of the stepper motor for driving the drive shaft 62. The vanes 58, 60 have a relatively small width. In the present embodiment they have a width of 6 mm. In the breaks between the feeding of two banknotes, the vane wheels 54 are in the basic stacking position in which the vane 60 projecting into the feeding area 46 contacts the note stack 36 below the lowest allowable note height. Preferably, in the present embodiment the lowest allowable note height is 58 mm.

Further, the pressure element 45 already described in connection with FIG. 1 is activated in the feeding position shown in FIG. 5 so that it contacts the supplied banknote 38 in the lower half and presses it against the front side of the stack 36 already contained in the cassette 12*a*. The pressure element 45 comprises in particular a push magnet, the armature of which is moved upon activation of the push magnet such that an end of the armature or a further element connected to an end of the armature presses against the face or back of the banknote 38 facing the pressure element 45 and moves the banknote 38 towards the front side of the already existing stack 36 at least in the contact area and presses it against this front side of the existing stack 36. As a result thereof, in particular a so-called fluttering of the lower area of the supplied banknote 38 during or after contacting the lower edge or the lower area of the supplied banknote 38 as a consequence of the contact with the vanes 72 to 76 of the lower vane wheel 66 is avoided.

The circulation time of the upper vane wheel 54 given a rotation by 180° is preferably preset such that the supplied banknote 38 is pushed by the second vane 58 to the front side of the stack 36 and is pressed against this stack as soon as the supplied banknote 38 has left the contact area between the drive wheel 44 and the pressure roller 50. The inclined deflectors 64 in particular cause that relatively large banknotes which are arranged as a stack 36 in the cassette 12*a* do not bend above the vane 60 pressing against the front side of the stack 36 in the basic stacking position and project into the area above the vane 60 which is in the basic stacking position. Without these inclined deflectors 64 the banknote arranged at the front side or several banknotes of the stack 36 could be pulled upwards by the vane 60 when the vane wheel 54 rotates. When a banknote 38 is supplied, the lower vane wheel 66 is preferably rotated together with the drive wheels 44, wherein the lower vane wheels 66, as already described, can be driven or rotated independent of the counter-rotation shaft 55. When the banknote 38 is transported into the feeding area 46, the flexible vanes 74 to 78 of the lower vane wheels 66 are elastically deformed and wound around the hub of the respective vane wheel 66 so that the wound vanes 74 to 78 are arranged in a spiral-shaped manner. As soon as the rear edge of the banknote 38 leaves the contact area between the drive wheel 44 and the pressure roller 50 or, respectively, between the drive wheel 44 and the stripping rollers 52*a*, 52*b*, subsequently the first vane 74 to 78 engaging under the banknote rear edge hits against the lower area of the banknote 38 and presses this lower area upwards and against the stack 36.

The lower vane wheels 66 are likewise driven by a separate stepper motor which, via a freewheeling mechanism, drives the shaft 55 with the stripping rollers 52*a*, 52*b* arranged thereon so that the stripping rollers 52*a*, 52*b* are likewise driven in feeding direction of the banknote 38 when a banknote 38 is supplied, and thus at least do not impede the feeding of the banknote 38. As already mentioned, the lower vane wheels 66 each have three vanes 74 to 78, the base points of which are not uniformly distributed about the circumference and in the present embodiment leave a gap of 180°. For separating, i.e. removing, a banknote 38 from the cassette 12*a*, the lower vane wheel 66 is then oriented such that no vane 74 to 78 projects into the transport path for the transport of the pulled-off banknote 38. These positions of the vanes 74 to 78 of the lower vane wheel 66 are illustrated in FIG. 6.

The vanes 74 to 78 are, as explained, not arranged centrally on the hub of the lower vane wheel 66 but project tangentially in a lateral direction. As a result thereof, the vanes 74 to 78 can perform the described elastic deformation while the material is only subject to relatively low stress. In particular, the base zone of each of the vanes 74 to 78 connected to the hub of the vane wheel 66 is not angled as much as in the case of a central connection of the vanes 74 to 78 to the hub when the vanes 74 to 78 are placed against the hub upon rotation of the vane wheel 66.

In its inactive position illustrated in FIG. 8, the note retracting shutter 68 is preferably locked on the cassette housing with the aid of locking elements in order to guarantee during the transport of the cassette 12*a* that the note retracting shutter 68 remains in the inactive position. The movement of the note retracting shutter 68 is controlled via slotted links which are provided in or at the outer walls of the cassette 12*a*. Guiding elements connected to the note retracting shutter 68 are engaged with the slotted links, these guiding elements preferably being locked with the aid of the locking elements. As a result thereof, the note retracting shutter 68 has to remain in the locked state in this inactive position as long as the locking elements are engaged with the guiding elements.

With the aid of the drive of the note retracting shutter 68 already described in connection with FIGS. 7, 8 and 11, the note retracting shutter is then pivoted into the substantially vertical position illustrated in FIG. 7 in which it uncovers the feeding and removal opening P5.

In the following the procedure for feeding a banknote is to be briefly summarized once again. After insertion of the cassette 12*a* and after opening of the note retracting shutter 68, the displacement carriage 82 is displaced in the direction of the separating and stacking module 30 synchronously to the bottom belt 70. As a result thereof, the displacement carriage 82 presses the banknotes contained in the note receiving area of the cassette 12*a* in the form of a stack 36 against the pull-off wheels 32. The pull-off wheel shaft 34 is, as already explained, spring-mounted on one side, wherein with the aid of a sensor arrangement the deflection of the non-driven shaft end of the drive shaft 34 is detected analogously and/or digitally. With the aid of the detected deflection, a pressure optimization during separation i.e. during pull-off of the banknotes, can be performed.

After the displacement carriage 82 has pressed the banknote stack 36 contained in the cassette 12*a* with a preset maximum pressure against the pull-off wheels 32, the direction of motion of the displacement carriage 82 is reversed and a preset retraction distance is covered. Owing to different note qualities, in particular in the case of the note stack 36 having relatively many banknotes the required stacking space varies so that given a constant retraction distance of the displacement carriage 82 a varying pressing force is exerted from the notes onto the feeding and separating elements of the separating and stacking module 30. In a first step, the displacement carriage 82 is moved away by a first distance from the separating and stacking module 30. Subsequently, an indirect stack pressure detection is performed, wherein the upper vane wheel 54 is to be rotated from the basic separating position into the basic stacking position. Parallel to this rotary motion of the upper vane wheel 54, the displacement carriage 82 is moved further away from the separating and stacking module 30, wherein at the same time the bottom belts 70 are driven such that they transport the banknotes standing on the belts 70 away from the separating and stacking module 30. This is continued until the vanes 58, 60 of the upper vane wheel 54 have reached the basic stacking position or, respectively, until the sensor arrangement 126 no longer detects a banknote in the detection area.

During the described positioning operation of the displacement carriage 82, the upper vane wheel 54 is driven with the aid of the stepper motor at a reduced stepper motor current and a frequency which is reduced compared to the normal drive frequency. The allowable note pressure can thus be determined by the torque of the stepper motor. Indeed, stepper motors are basically unsuitable for torque regulations since a stepper motor skips steps when a threshold torque is exceeded, the torque becoming zero when steps are skipped. The torque is only build up again after four further steps. In order to prevent a backward movement, a freewheeling mechanism is arranged on the drive shaft 62. During the setting operation, a pulsating control signal for controlling the stepper motor is used which, with every pulse, rises up to the value valid for the chosen low frequency. This is repeated until the basic feeding position or, respectively, basic stacking position of the vane wheel 54 is reached, in which the non-curved area of the vanes 58, 60 is oriented substantially horizontally.

Alternatively, a DC collector motor or a brushless DC motor can be used instead of the stepper motor. Owing to feasible torque regulations, such motors are better suitable for setting the stack pressure and thus are better suitable for positioning the displacement carriage 82. However, then a position detection and regulation for detecting the angular position of the drive shaft 62 or, respectively, of the upper vane wheel 54 are required. Such a position regulation is relatively complex.

After setting the stack pressure of the note stack 36 at the vanes 58, 60 of the upper vane wheel 54, a positioning control is performed in the lower area of the banknotes arranged as a stack 36. For this, a sensor arrangement 126 designed as a transverse light barrier is provided which is arranged at the boundary of the maximum required feeding area 46 in the so-called stack base zone and thus monitors the area in front of the front side of the stack 36. In the case of continuously rotating lower vane wheels 66, the bottom belts 70 and the vane wheels 72 arranged in the cassette 12*a* are likewise driven for the transport of the note stack 36 from the feeding area 46 into the note receiving area of the cassette 12*a* until the light barrier arrangement 126 no longer detects a banknote in its detection area. The feeding of banknotes 38 then takes place with continuously rotating drive wheels 44 and continuously rotating lower vane wheels 66. The pull-off wheels 32 are also at least temporarily rotated via the magnetic coupling 188, in particular in order to prevent that the front edge of the supplied banknote 38 gets stuck on the circumferential surface of the pull-off wheels 32.

During each transaction, up to 200 banknotes 38 can be supplied to the cassette 12*a*. Per supplied banknote 38, the displacement carriage 82 is moved synchronously with the bottom belts 70 by a preset retraction distance away from the separating and stacking module 30, i.e. moved backwards in the cassette 12*a*. If this preset retraction distance is insufficient, a banknote 38, after having been supplied, will remain at least in part in the detection area of the monitoring light barrier arrangement 126 and will be detected by it since this banknote 38 could not be pressed sufficiently far into the banknote receiving area. The preset retraction distance is in particular not sufficient when used banknotes 38 have a resulting greater note thickness in the stack due to their deformation. The preset retraction distance of the displacement carriage 82 is thus not sufficient in order to provide sufficient stacking space for the supplied banknotes. If the light barrier arrangement 126 detects a banknote in the detection area, the displacement carriage 82 is moved away from the separating and stacking module 30 by an additional retraction distance.

Further, an intermediate compression is provided since in the case of a too long retraction movement of the displacement carriage 82 that has been preset or in the case of uneven banknotes a relatively poor filling level would be reached in the cassette 12*a*. For this, prior to a further transaction, an intermediate compression operation is provided when more than 150 banknotes, at maximum 200 banknotes, have been supplied. The operation corresponds to the already described operation for setting the stack pressure after feeding the cassette 12*a* or, respectively, prior to positioning the upper vane wheel 54 in the basic stacking position. By means of this intermediate compression, the air gaps created during the retraction of the displacement carriage 82 by a preset generous increment are at least partially removed from the stack 36 in that the entire stack 36 is compressed.

After a separation in which the non-curved areas of the vanes 58, 60 of the upper vane wheel 54 are oriented substantially vertically, the vane wheel 54 is again rotated into a basic stacking position in which the non-curved areas of the vanes 58, 60 of the upper vane wheel 54 are oriented substantially horizontally. In this basic stacking position, all banknotes of the stack 36 are arranged in the cassette 12*a* so that the cassette 12*a* can be removed from the safe 10 as soon as the note retracting shutter 68 has been pivoted inward. As already mentioned, the note retracting shutter 68 is pivoted into the inactive position with the aid of the drive for the note retracting shutter 68 illustrated in FIG. 11. If the cassette 12*a* shall be removed without any further preparation, in particular in the de-energized state of the automated teller machine, then the note retracting shutter 68 always has to be pivoted into the inactive position if no feeding or removal operation is currently performed.

Figure 14:
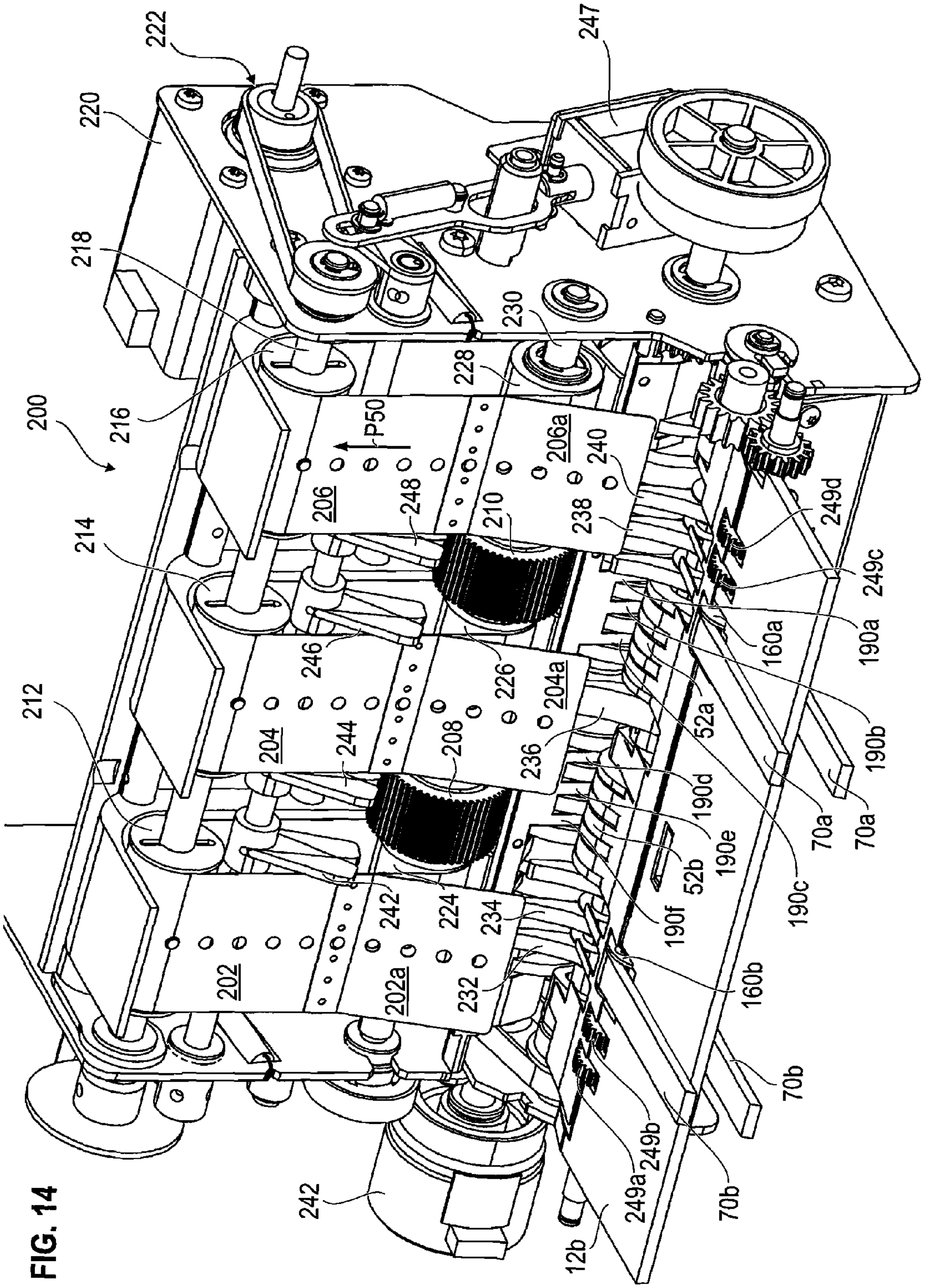
FIG. 14 shows a three-dimensional illustration of a separating and stacking module according to a second embodiment of the invention with three transport belts arranged next to one another, each with a transport flap for feeding banknotes and with a pull-off wheel for separating banknotes.

In FIG. 14, a three-dimensional illustration of a separating and stacking module 200 according to a second embodiment of the invention with three transport belts 202 to 206 arranged next to one another each time with transport flaps 202*a* to 206*a* is illustrated. With the aid of the transport flaps 202*a* to 206*a*, banknotes are supplied to the cassette 12*a*. Further, the separating and stacking module 200 has two pull-off wheels 208, 210, with the aid of which the banknotes contained in the cassette 12*b* in the form of a stack 36 are individually removed from the cassette 12*b*, i.e. the banknotes are separated.

The endless transport belts 202 to 206 are guided over upper deflection rollers 212 to 216 which have lateral guides of the type of a belt pulley for the lateral guidance of the endless transport belts 202 to 206. The deflection rollers 212 to 216 are connected to a drive shaft 218 in a rotationally fixed manner, which shaft can be driven via an electric motor 220. The shaft 218 is driven via a belt drive 222. Further, for each transport belt 202 to 206 one lower deflection roller 224 to 228 each is provided, which are arranged on a drive shaft 230 for driving the pull-off wheels 208, 210 such that they rotate freely and are kept in their axial position on the drive shaft 230 via suitable axial stop elements. The endless transport belts 202 to 206 as well as the transport flaps 202*a* to 206*a* have a perforation with several holes equally spaced to one another along the circumference of the endless transport belt 202 to 206. The upper deflection rollers 212 to 216 have projecting sprockets which are complementary to the perforation of the transport belts 202 to 206, which sprockets engage with the perforation so that both a further lateral guidance as well as a slip-free drive of the transport belts 202 to 206 is provided.

The transport belts 202 to 206 are driven in the direction of the arrow P50. With the aid of engagement elements which are each preferably designed as a one-vaned vane wheel 232 to 240, a gap can be created or increased between the circulating transport belt 202 to 206 and the downwardly open transport flaps 202*a* to 206*a* so that the transport belts 202 to 206 assume a basic feeding position.

In the same manner as described in the first embodiment of the invention, the feeding of a banknote 38 takes place via the drive wheels 44. By opening the transport flaps 202*a* to 206*a* with the aid of the vanes 232 to 240, a feeding area between the circulating transport belt 202 to 206 and the banknote stack 36 resting against the outside of the transport flaps 202*a* to 206*a* is created. A banknote 38 to be supplied is transported into this feeding area. As a result thereof, an area of this banknote 38 each is inserted into the transport flaps 202*a* to 206*a* or, respectively, guided between the transport flaps 202*a* to 206*a* and the transport belts 202 to 206. After areas of the supplied banknote 38 are positioned in the transport flaps 202*a* to 206*a*, the transport belts 202 to 206 are driven in the direction of the arrow P50 substantially at the same circulation speed as the speed at which the supplied banknote 38 has been conveyed into the transport flaps 202*a* to 206*a* with the aid of the drive wheels 44. Further, non-illustrated stripping elements are provided which prevent the banknote which is arranged with areas thereof in the transport flaps 202*a* to 206*a* from a further circulation with the transport belts 202 to 206, and as a result thereof, pulls the banknote out of the transport flaps 202*a* to 206*a* when the transport belts 202 to 206 are driven further. These stripping elements are arranged such that the banknote 38 pulled out of the transport flaps 202*a* to 206*a* is positioned opposite to the front side of the stack 36 already contained in the cassette 12*a*. Further, pressure elements 242 to 248 are provided which, via a pull magnet, come out of the areas between the transport belts 202 to 206 and which, in this process, press the banknote 38 positioned opposite to the front side of the stack 36 already contained in the cassette 12*a* against the front side of the stack 36 so that the supplied banknote 38 forms the new front side of the stack 36.

The lower area of a supplied banknote 38 is additionally pressed against the banknote stack 36 by the vane wheels 232 to 240. Further, in FIG. 14 individual elements of the cassette 12*b*, such as the transport belts 70*a*, 70*b* and the transport rolls 249*a* to 249*d* are illustrated. The stripping elements 52*a*, 52*b* as well as the retaining elements 190*a* to 190*f* already explained in connection with FIG. 13 and the first embodiment of the invention are likewise illustrated in their inactive position according to the first embodiment and the second embodiment of the invention. The separating and stacking module 200 illustrated in FIG. 14 further has a magnetic coupling 242 via which the main drive shaft 42 with the drive wheels 44 can be selectively driven.

Figure 15:
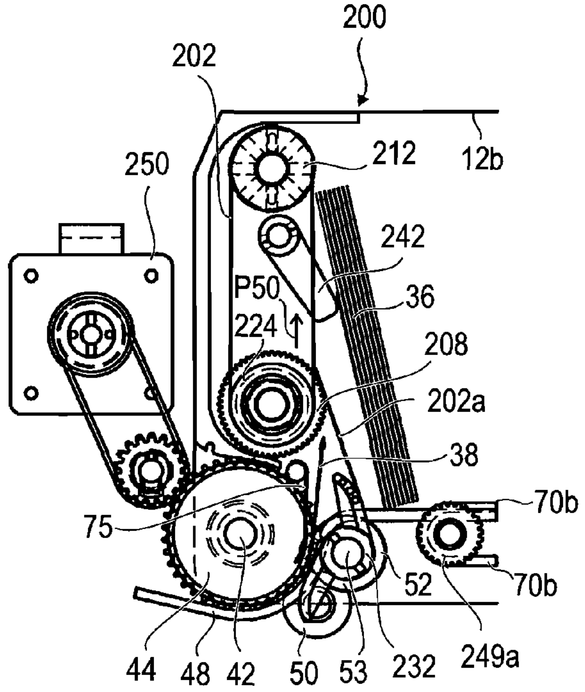
FIG. 15 shows a simplified side view of the separating and stacking module according to FIG. 14, the feeding and separating elements being illustrated in a first position for feeding a banknote.

In FIG. 15, a simplified side view of the separating and stacking module 200 according to FIG. 14 is shown, the feeding and separating elements being illustrated in a first position for feeding a banknote 38. A lower vane wheel 232 engages with the transport flap 202*a*, after the transport belt 202 has been moved in the opposite direction of the arrow P50 into a basic feeding position. The vane wheel 232 has two projecting rigid vanes. By the engagement of one vane of the vane wheel 232 with the transport flap 202*a*, the latter is opened further so that a supplied banknote 38 is fed into the area between the endless circulating transport belt 202 and the transport flap 202*a* provided at the outer circumferential surface. Further, the separating and stacking module 200 comprises a stepper motor 250 as a drive unit which drives the drive shaft 53 for driving the vane wheels 232 via a belt drive 251 and the magnetic coupling 242. Further, in contrast to the cassette 12*a* of the first embodiment, the cassette 12*b* shown in connection with the second embodiment has no vane wheels arranged in the cassette 12*a* but the already mentioned transport rolls 249*a* to 249*d* with a profiled circumferential surface. The profile of the transport rolls 249*a* to 249*d* has transverse ribs by which a positive connection is established with the banknotes being in contact with the wheels 249*a* to 249*d* with their lower edge. As a result thereof, the banknotes can be reliably transported in the direction of the stack 36 or, respectively, into the cassette 12*b*. In FIG. 15, the pressure element 242 is illustrated in a simplified manner in the form of a pivotable lever. Both, the pivotable levers 242 to 248 serving as pressure elements as well as the profiled transport rolls 249*a* to 249*d* can also be used in the first embodiment of the invention, whereas, in the same manner, the vane wheels of the first embodiment which are arranged in the cassette 12*a* as well as the pressure element shown in FIG. 8 and described in this connection can be used in the second embodiment of the invention.

Figure 16:
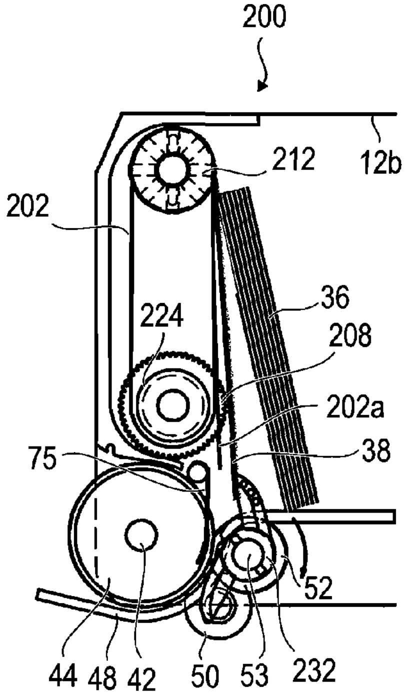
FIG. 16 shows the side view of the separating and stacking module according to FIG. 15, the feeding and separating elements being illustrated in a second position during feeding of a banknote.

In FIG. 16, the side view of the separating and stacking module 200 according to FIG. 15 is illustrated, the feeding and separating elements being illustrated in a second position for feeding a banknote 38. In the case of a further circulation P50 of the endless transport belt 202, the banknote 38 arranged with areas in the transport flaps 202*a* to 206*a* has been pulled out of these transport flaps 202*a* to 206*a*, the banknote 38 and the entire stack 36 having been pushed away from the transport belt 202 with the aid of the pressure elements 242 to 248. While the banknote stack 36 is pushed away from the transport belt 202, the endless transport belt 202 is driven in the opposite direction of the arrow P50, wherein, parallel thereto, the lower vane wheel 232 is further driven and rotated. In this process, a vane of the vane wheel 232 presses the lower area of the banknote 38 against the banknote stack 36.

Figure 17:
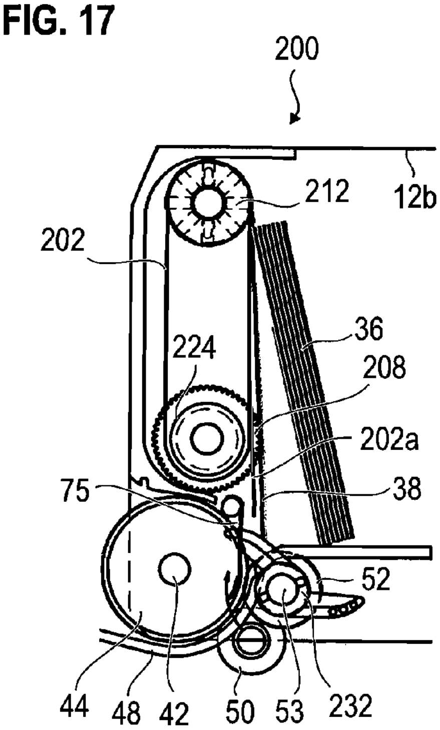
FIG. 17 shows the side view of the separating and stacking module according to FIGS. 15 and 16, the feeding and separating elements being illustrated in a third position during feeding of a banknote.

In FIG. 17, the side view of the separating and stacking module 200 according to FIGS. 15 and 16 is shown, the feeding and separating elements being illustrated in a third position for feeding the banknote 38. In this position it can be seen that a vane of the lower vane wheel 232 simultaneously encloses the rear edge of the supplied banknote 38 and also engages in the transport flap 202*a*.

Figure 18:
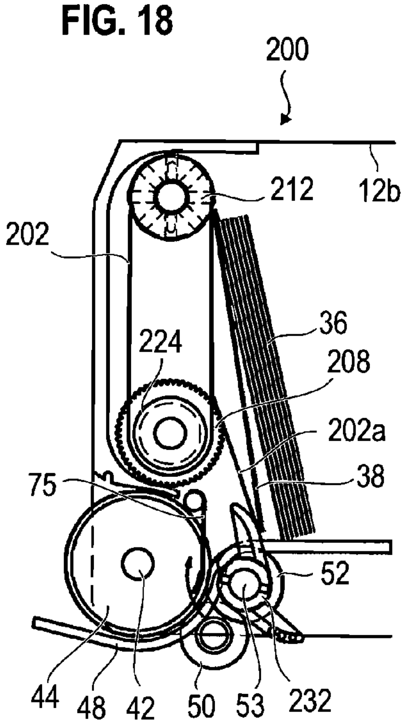
FIG. 18 shows the side view of the separating and stacking module according to FIGS. 15 to 17, the feeding and separating elements being illustrated in a fourth position during feeding of a banknote.

In FIG. 18, the side view of the separating and stacking module according to FIGS. 15 to 17 is shown, the feeding and separating elements being illustrated in a fourth position in which the lower area of the supplied banknote 38 has been moved towards the stack with the aid of the lower vane wheel 232 and, at the same time, the transport flap 202*a* has been opened for feeding a further banknote.

Figure 19:
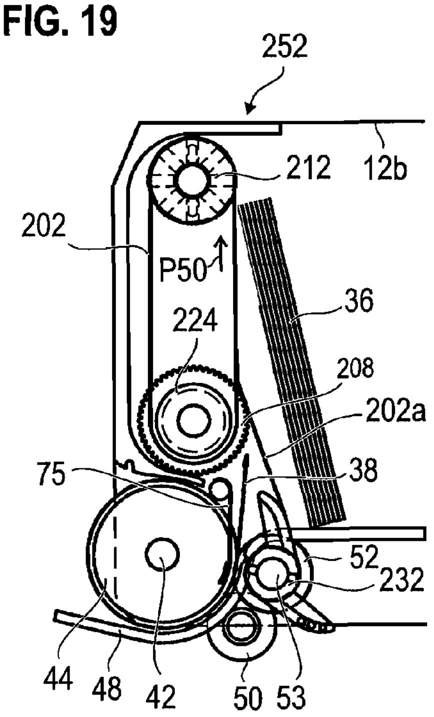
FIG. 19 shows a simplified side view of a separating and stacking module for stacking and separating banknotes, which module is alternative to the separating and stacking module according to FIGS. 14 to 18, the feeding and separating elements being illustrated in a first position during feeding of a banknote.

In FIG. 19, a simplified side view of a separating and stacking module 252 for stacking and separating banknotes is shown which is alternative to the separating and stacking module 200 according to FIGS. 14 to 18. The feeding and separating elements are illustrated in a first position for feeding a banknote. The separating and stacking module 252 differs from the separating and stacking module 200 according to FIGS. 14 to 18 in the design of the lower vane wheel 232, the two vanes of the lower vane wheel 232 each having an angular distance of 141° and 219° in the separating and stacking modules 200, 252. In the separating and stacking module 200, the vane wheel 232 is rotated such that when a banknote 38 is supplied the vanes are arranged such that they face the banknote 38 with their smaller angular distance of 141°. In the separating and stacking module 252 the lower vane wheel 232 is rotated such that the vanes of the vane wheel 232 face the supplied banknote 38 with their large angular distance of 219°. In FIG. 19, the transport flap 202*a* is opened for a banknote 38 to be supplied in the same manner as explained in connection with FIG. 15.

Figure 20:
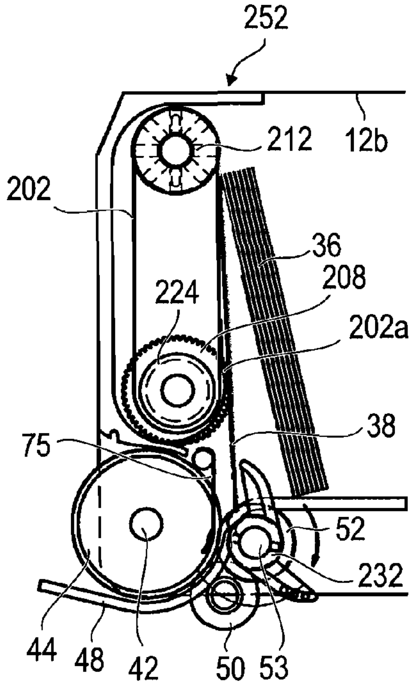
FIG. 20 shows the side view of the separating and stacking module according to FIG. 19, the feeding and separating elements being illustrated in a second position during feeding of a banknote.
Figure 21:
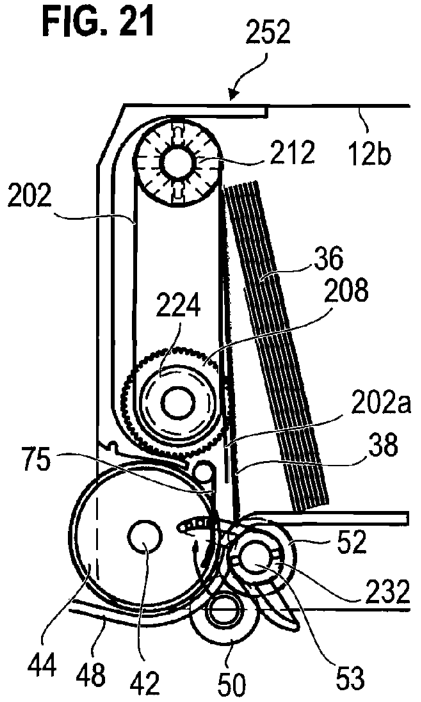
FIG. 21 shows the side view of the separating and stacking module according to FIGS. 19 and 20, the feeding and separating elements being illustrated in a third position during feeding of a banknote.
Figure 22:
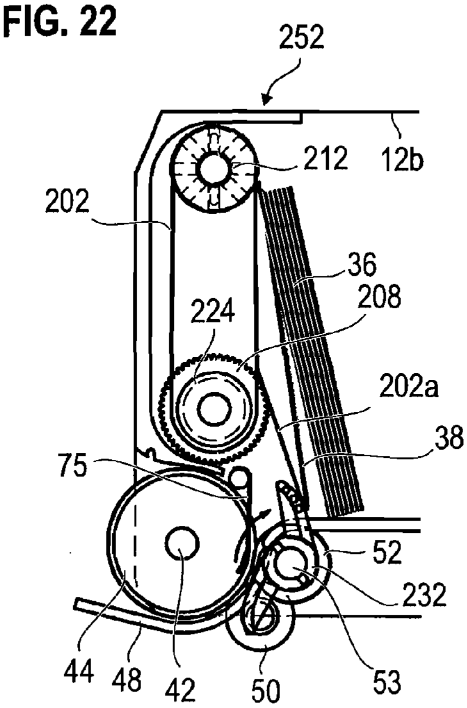
FIG. 22 shows the side view of the separating and stacking module according to FIGS. 19 to 21, the feeding and separating elements being illustrated in a fourth position during feeding of a banknote.

In FIG. 20, the side view of the separating and stacking module 252 according to FIG. 19 is shown, the feeding and separating elements being illustrated in a second position for feeding the banknote 38. The lower vane wheel is simultaneously rotated opposite to the direction P50 when the transport belt 202 is driven so that the lower vane of the vane wheel 232 in FIG. 16 encloses the rear edge of the supplied banknote 38 and at the same time engages into the transport flap 202*a*, as shown in FIG. 21. As a result thereof, the vane presses the lower area of the supplied banknote 38 towards the stack 36 and at the same time opens the transport flap 202*a*, as shown in FIG. 22.

Figure 23:
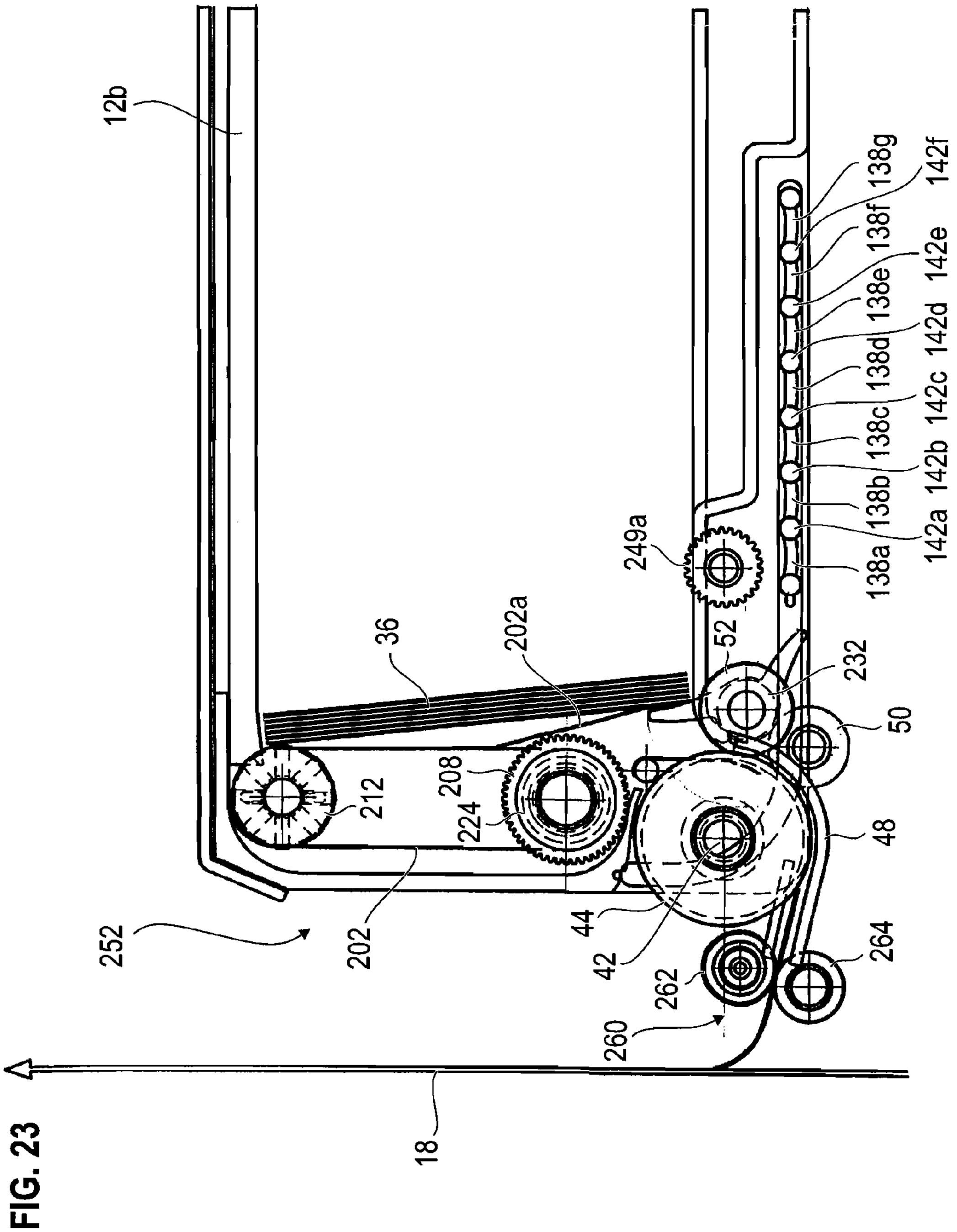
FIG. 23 shows a banknote cassette which is arranged in the safe according to FIG. 1 and having a separating and stacking module for feeding and removing banknotes according to FIGS. 15 to 18.

In FIG. 23, a banknote cassette 12*b* arranged in the safe 10 according to FIG. 1 and having a separating and stacking module 200 according to the second embodiment of the invention for feeding and removing banknotes is illustrated. Further, a section of the transport path 18 as well as a transport roller pair 260 with a drive roller 262 and a pressure roller 264 are illustrated. With the aid of the transport roller pair 260, a transport path for banknotes is formed between the separating and stacking module 200 and the transport path 18. The transport elements of the transport path 18 as well as sorting gates arranged in this transport path are not illustrated in FIG. 23. In the illustration according to FIG. 23, the separating and stacking module 200 is already in the basic stacking position in which a banknote to be supplied to the cassette 12*b* can be transported into the gap between the opened transport flap 202*a* and the endless transport belt 202 with the aid of the drive wheel 44. The displacement carriage 82 arranged in the cassette 12*b* is not illustrated in FIG. 23.

The transport belts 202 to 206 with the transport flaps 202*a* to 206*a* are also referred to as scaled belts since the transport flaps 202*a* to 206*a* rest like scales on the respective transport belt 202 to 206. Preferably, both the endless transport belts 202 to 206 as well as the transport flaps 202*a* to 206*a* are made of a polyester foil having a uniform thickness in the range between 0.1 to 0.75 mm, preferably in the range between 0.2 to 0.35 mm. A thickness of 0.25 mm has proven to be advantageous. The separating and stacking module 200 according to the second embodiment of the invention is also particularly suitable for a vertical cassette arrangement, i.e. an arrangement of the cassette in such a way that the front side of the stack 36 is arranged in a horizontal plane preferably at the top of the stack.

A particular advantage of the separating and stacking module 200, 252 with the transport belts 202 to 206 is that a banknote 38 to be supplied is protected in the transport flaps 202*a* to 206*a* when it is transported in front of the front side of the stack 36. The banknote 38 is covered in the front note section by the relatively wide transport flaps 202*a* to 206*a* and has no direct contact with the front side of the stack 36 in the area of the transport flaps 202*a* to 206*a*. As a result thereof, the supplied banknote 38 cannot get caught in projecting areas of used banknotes. Compared to other embodiments, also lower demands on the stiffness of the banknotes to be supplied with respect to a bending are made. By means of the transport belts 202 to 206 a flat and low-mass design of the feeding elements is possible. Further, by means of the transport belt 202 deflected over two deflection rollers with the transport flaps 202*a* to 206*a* a linear guidance of the banknote is achieved. The endless transport belt 202 with the at least one transport flap 202*a*, preferably with two transport flaps each, can be made of two punched foils which are welded to one another at at least two connecting points, preferably by one welded joint each, to form the endless transport belt 202 with the transport flap 202*a*. As a welding process, in particular an ultrasonic welding process is suitable.

In the embodiments according to FIGS. 14 to 23, the removal of a banknote from the cassette 12*b* takes place in the same manner as described for the first embodiment in connection with FIGS. 2 to 13.

Figure 24:
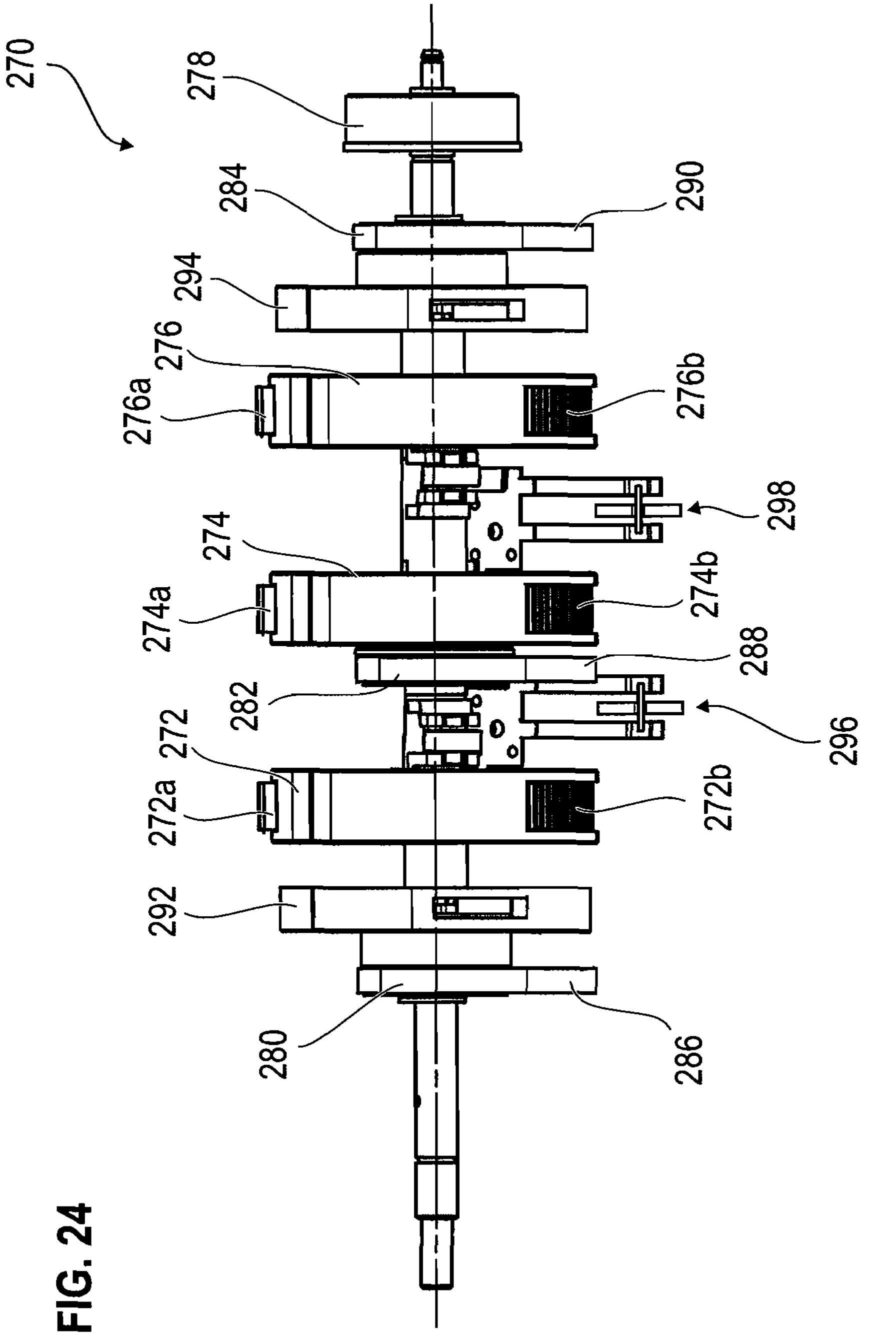
FIG. 24 shows a top view of a stacking and separating wheel shaft of a separating and stacking module of a third embodiment of the invention with altogether three combined stacking and separating wheels

In FIG. 24, a top view of a stacking and separating wheel shaft 270 of a separating and stacking module of a third embodiment of the invention with altogether three stacking and separating wheels 272 to 276 arranged on this shaft is illustrated. The stacking wheel shaft 270 is driven by an electric motor, the shaft 270 being driven via a toothed belt pulley 278 connected to the shaft 270 in a rotationally fixed manner. Further, altogether three toothed belt pulleys 280 to 284 are connected to the stacking and separating wheel shaft 270 in a rotationally fixed manner, via which toothed belt pulleys cam disks can be driven with the aid of toothed belts 286 to 290, which cam disks are mounted in a freely rotatable manner on a shaft arranged parallel to the stacking and separating shaft 270.

In addition to the separating and stacking wheels 272 to 276 two additional stacking wheels 292, 294 are provided which have no pull-off elements and thus have no separating function. The separating and stacking wheels 272 to 276 each have two pull-off elements 272*a*, 272*b*, 274*a*, 274*b*, 276*a*, 276*b* which can be moved out of the circumferential surface of the separating and stacking wheels 272 to 276. The outer surfaces of these pull-off elements 272*a* to 276*b* are each profiled with transverse grooves and have a relatively high coefficient of friction so that banknotes can be moved or, respectively, pulled-off with the aid of the pull-off elements 272*a* to 276*b* already with a relatively small pressing force. For example, at least the surface of the pull-off elements 272*a* to 276*b* is made of a rubber material.

Further, the stacking and separating wheel shaft 270 has control levers 296, 298 whose end remote from the stacking and separating wheel shaft 270 serves to control the movement of the retaining or, respectively, pressure elements 190. Further, via the control levers 296, 298 clamping elements arranged in the stacking and separating wheels 272 to 276 can be controlled via a cam disk arranged on the already mentioned parallel shaft and/or via cam disks arranged in the stacking and separating wheels. The belt drives 280 to 290 for driving the cam disks, of which the belt pulleys 280 to 284 arranged on the stacking and separating wheel shaft 270 and the toothed belts 286 to 290 are illustrated in FIG. 24, have a transmission ratio with respect to the belt pulleys coupled to the cam disks. In the present embodiment the separating and stacking wheels 272 to 270 each have two stacking chambers, a gear transmission ratio of 1 to 2 being provided so that the cam disks have twice the speed of rotation as the stacking and separating wheel shaft 270.

Figure 25:
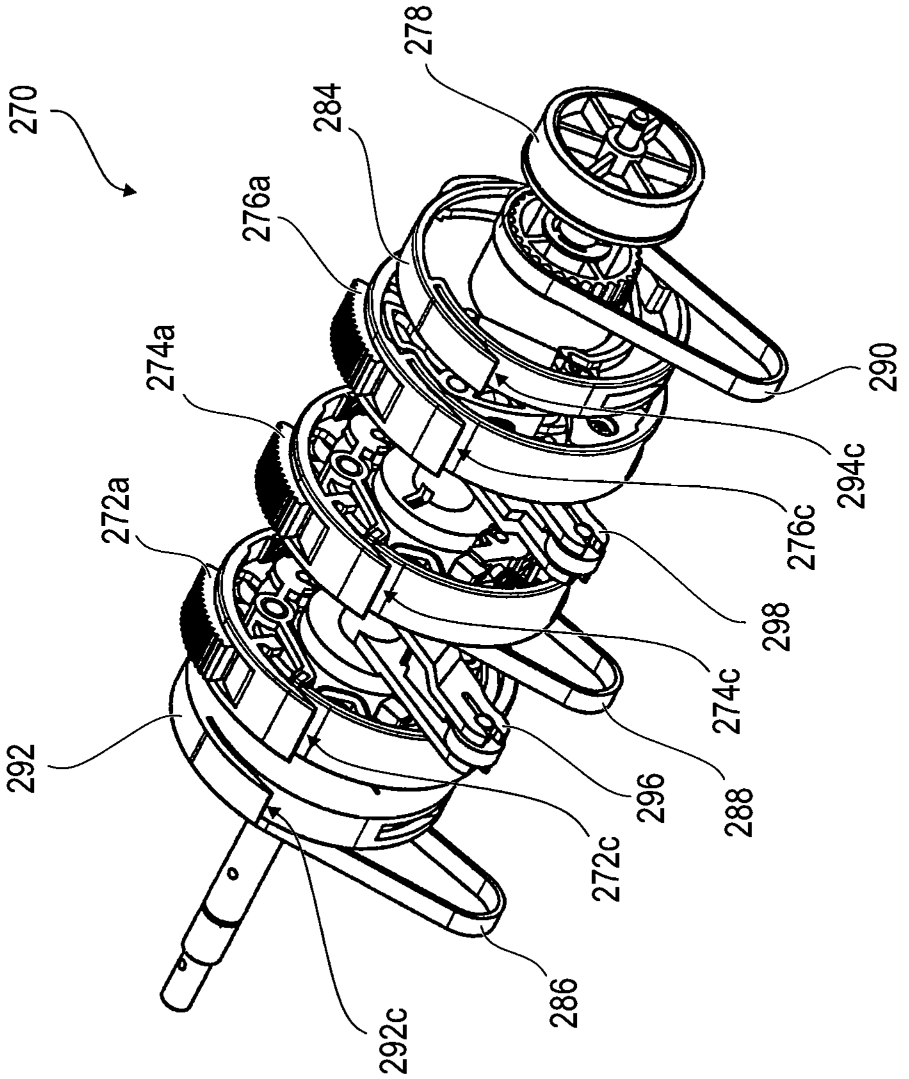
FIG. 25 shows a perspective illustration of the separating and stacking wheel shaft with the separating and stacking wheels according to FIG. 24.

FIG. 25 shows a perspective illustration of the separating and stacking wheel shaft 270 according to FIG. 24. In the illustration according to FIG. 25, each time one chamber 272*c* to 276*c* of the separating and stacking wheels 272 to 276 and one chamber of the stacking wheels 292 and 294 for receiving an area of a banknote to be supplied are illustrated. The visible chamber of the separating and stacking wheel 272 is identified with the reference sign 272*c*, the visible chamber of the separating and stacking wheels 274 is identified with the reference sign 274*c*, and the chamber of the separating and stacking wheel 276 is identified with the reference sign 276*c*. The visible chamber of the stacking wheel 292 is identified with the reference sign 292*c* and the visible chamber of the stacking wheel 294 is identified with the reference sign 294*c*.

Figure 26:
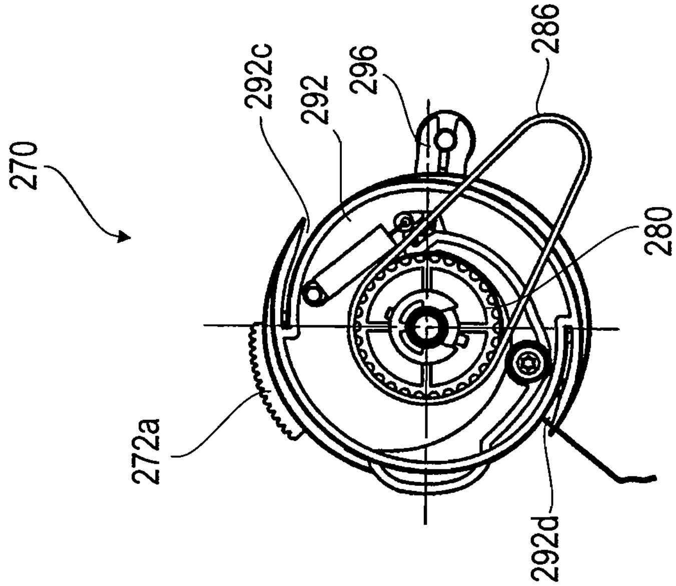
FIG. 26 shows a side view of the stacking and separating wheel shaft according to FIG. 25.

In FIG. 26, a side view of the stacking and separating wheel shaft 270 according to FIGS. 24 and 25 is shown, in which also the second chamber 292*d* of the stacking wheel 292 is visible.

Figure 27:
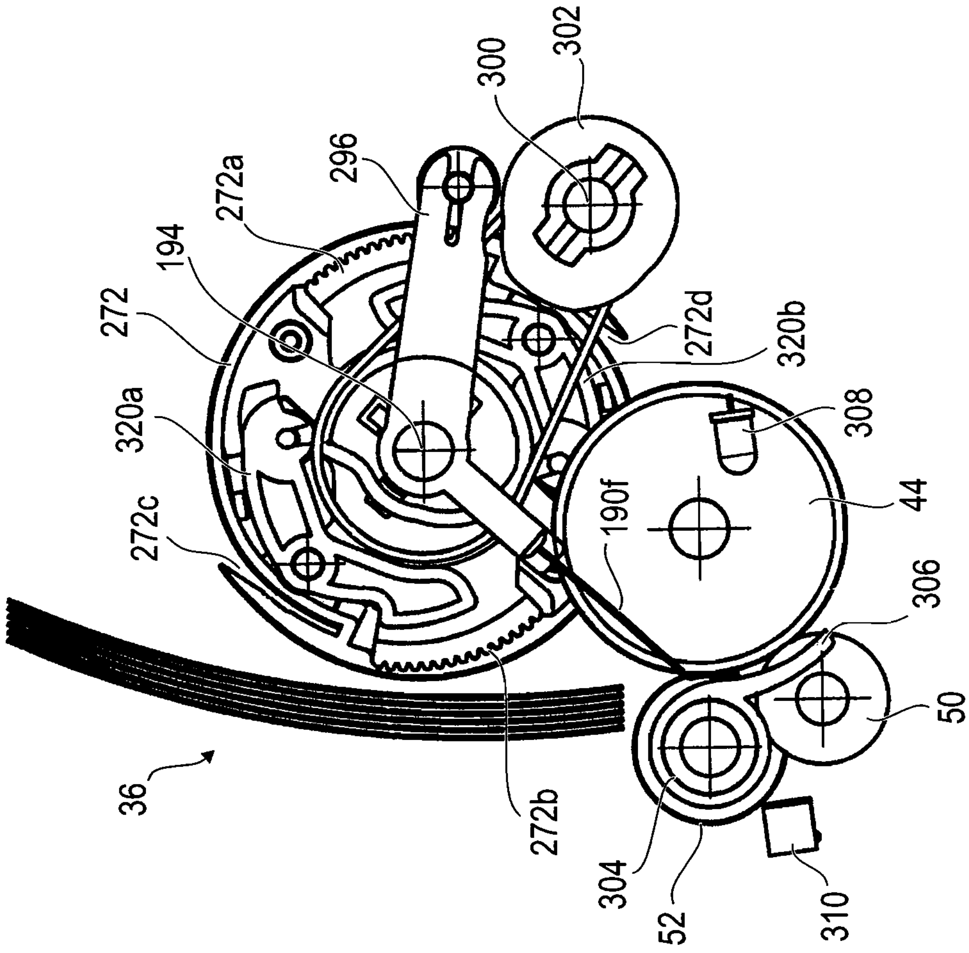
FIG. 27 shows a schematic illustration of an arrangement of elements of a stacking and separating wheel and further elements of the separating and stacking module of the third embodiment of the invention in a start position for the removal of a banknote from the container.

FIG. 27 shows the side view of the separating and stacking wheel 272 with the chambers 272*c* and 272*d* for receiving banknotes. Further, the axis of rotation 300 of the cam disk 302 running parallel to the separating and stacking wheel shaft 270 is illustrated. The cam disk 302 is scanned by the lever 296, wherein, dependent on the running of the cam disk 302 over the lever 296, at least one of the two pull-off elements 272*a*, 272*b* can be moved out of the circumferential surface of the separating and stacking wheel 270 in order to contact the banknote arranged in the cassette 12*c* at a front side of the stack 36.

In FIG. 27, a start position (basic separating position) for separating the banknotes contained in the cassette 12*c* and arranged in a stack 36 is illustrated. In a separating mode, a vane wheel 304 having one vane 306 is rotated such that the vane 306 does not project into the transport path for the transport of the banknotes moved downwards from the front side of the stack 36 with the aid of the pull-off elements 272*a*, 272*b*. By the rotation of the separating and stacking wheel 272, the banknote arranged at a front side of the stack 36 is moved downwards into a transport gap between the drive wheel 44 and the pressure roller 50. Further, the arrangement illustrated in FIG. 27, has stripping rollers 52 which are not rotated when a banknote is transported away or, alternatively, which are rotated in the direction opposite to the transport direction of the banknote when a banknote is transported away so that in the case of a double pull-off the second banknote moved downwards behind the banknote contacted by the stripping element 272*a*, 272*b* does not reach into the transport gap between the drive wheel 44 and the pressure roller 50. Further, the arrangement has a sensor arrangement for detecting the front edge of a banknote 38 to be removed. In addition, the sensor arrangement can detect the rear edge of the banknote 38 which is transported away. The sensor arrangement comprises in particular a light source 308 and a receiver 310 which, together with a non-illustrated evaluation unit, form a light barrier sensor arrangement. During feeding of banknotes, the vane wheel 304 is rotated such that the vane 304 projects into the transport path for the removal of banknotes so that in particular the supplied banknotes cannot reach into this transport gap.

Figure 28:
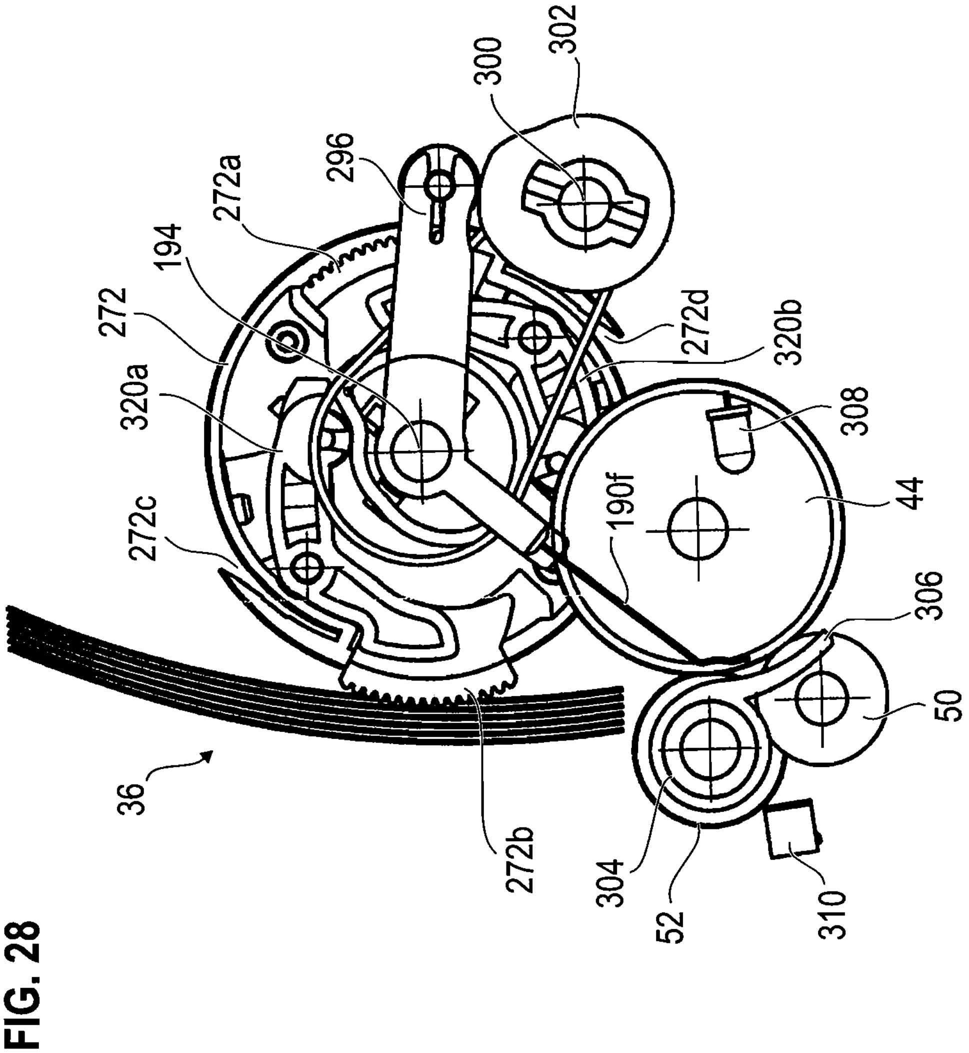
FIG. 28 shows the arrangement according to FIG. 27, a pull-off element being activated.

In FIG. 28, the arrangement according to FIG. 27 with the outwardly pivoted pull-off element 272*b* is illustrated, the pull-off element 272*b*, in the moved-out state, contacting the surface of the banknote 38 arranged at the front side of the stack 36 and, upon a further rotation of the separating and stacking wheel 272, moves the banknote 38 downwards into the transport gap between the stripping element 52 and the drive wheel 44 or, respectively, between the pressure roller 50 and the drive wheel 44. As an alternative to the illustrated belt drive of the cam disk 302, the cam disk 304 can also be driven via an electric motor, preferably a stepper motor, possibly together with further cam disks.

Figure 29:
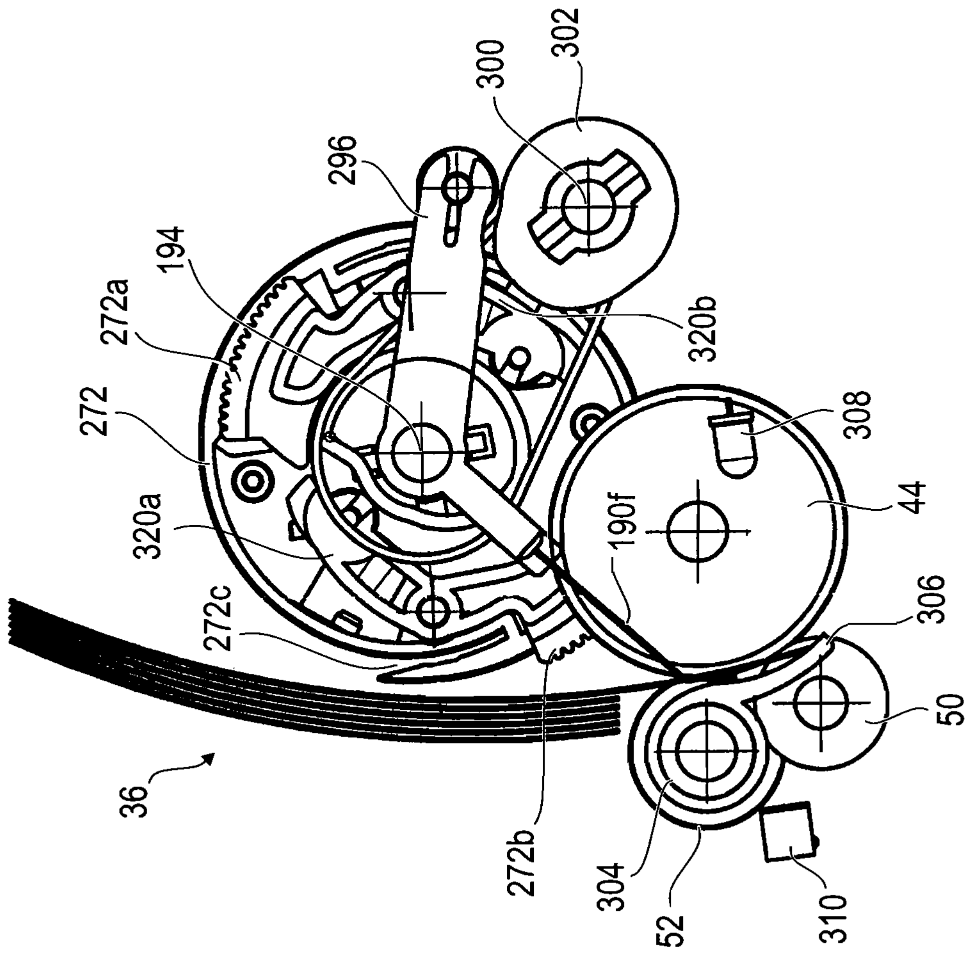
FIG. 29 shows the arrangement according to FIGS. 27 and 28, the feeding and separating elements being illustrated during the further transport of a pulled-off banknote.

In FIG. 29, the arrangement according to FIGS. 27 and 28 is illustrated, the feeding and separating elements being illustrated in a position in which the banknote 38 arranged at the front side of the stack 36 has already been moved into the transport gap between the drive wheel 44 and the pressure roller 50. As a result thereof, the banknote 38 interrupts the light beam between the light source 308 and the receiver 310 so that the light barrier arrangement detects the removed banknote 38.

Figure 30:
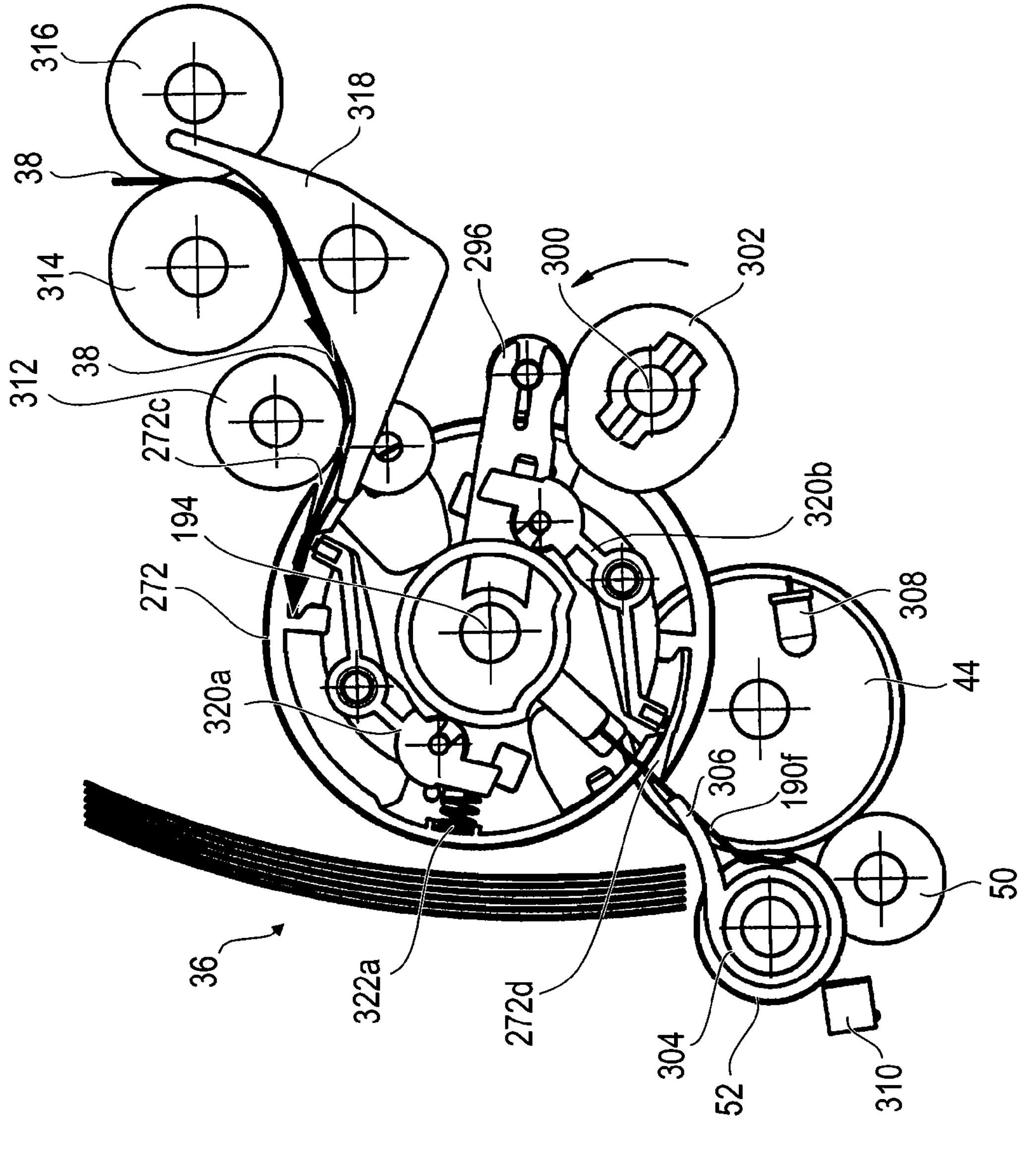
FIG. 30 shows the arrangement according to FIGS. 27 to 29, the feeding and separating elements being illustrated in a start position for feeding a banknote.

In FIG. 30, the arrangement according to FIGS. 24 to 29 is illustrated, the feeding and separating elements being illustrated in an operating mode for feeding banknotes into the cassette 12*c*. In the cassette 12*c*, a banknote stack 36 is already present. The vane wheel 304 with the vane 306 is rotated such that the banknotes of the stack 36 as well as further supplied banknotes 38 cannot reach into the area between the drive wheel 44 and the stripping element 52 or, respectively, between the drive wheel 44 and the pressure roller 50. A banknote 38 to be supplied is fed to the arrangement from the transport path 18 via transport elements 312, 314, 316 and a sorting gate 318, the sorting gate 318 moreover serving as a guiding element. The supplied banknote 38 is transported into the chamber 272*c* with sections of its front area. The separating and stacking wheel 272 is illustrated in FIG. 30 in a start position for feeding banknotes into the cassette 12*c*.

Figure 31:
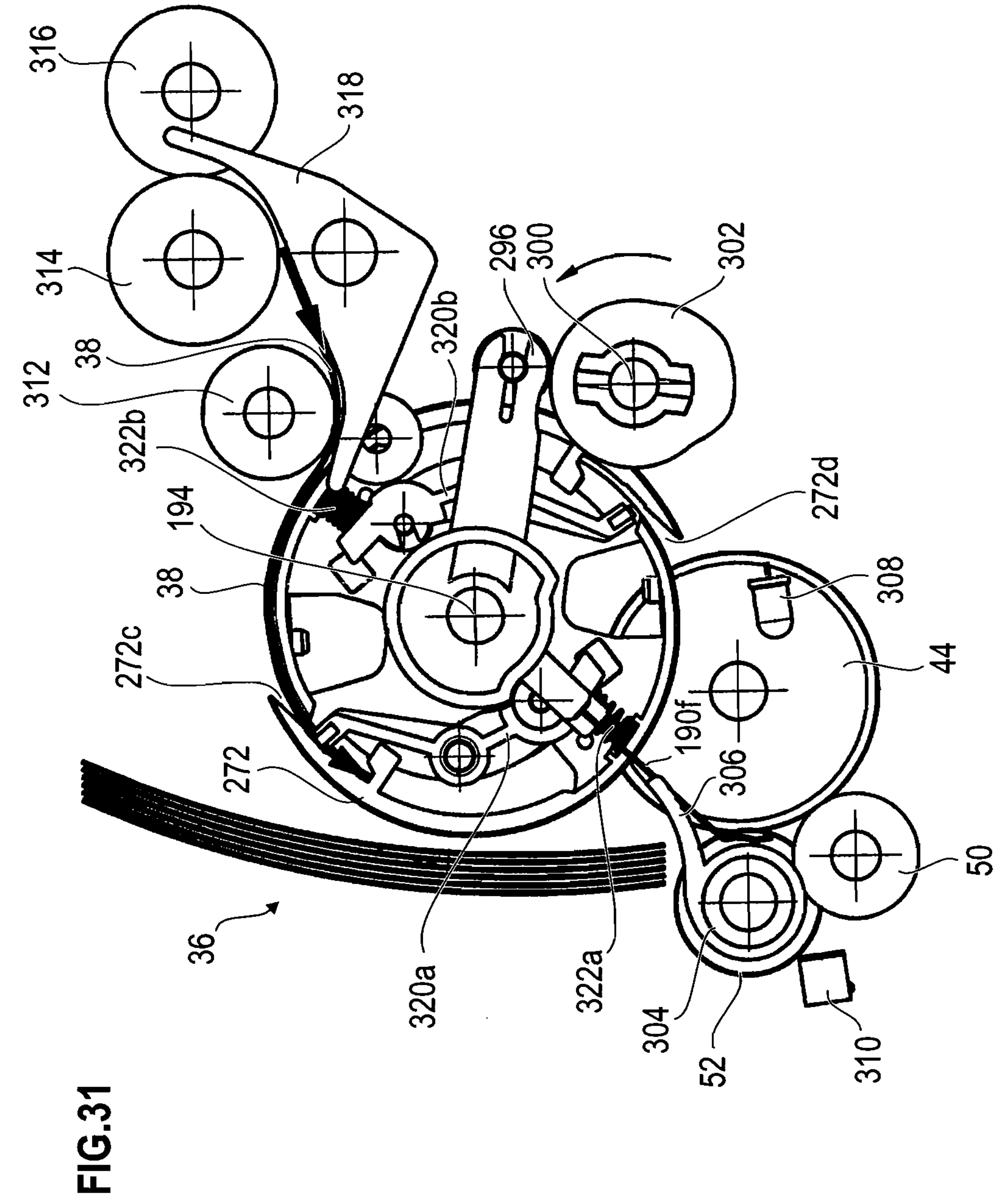
FIG. 31 shows the arrangement according to FIGS. 27 to 30, the feeding and separating elements being illustrated in a second feeding position.

In FIG. 31, the arrangement according to FIGS. 27 to 30 is shown, the feeding and separating elements being illustrated in a second feeding position. A non-illustrated clamping element controlled via a further cam disk and a further lever 320*a* presses the banknote 38 in the chamber 272*c* from the inside against the chamber outer side so that the banknote 38 is clamped within the chamber 272*c*.

The operation is controlled such that a rotation of the separating and stacking wheel 272 is started at the latest when the front edge of the supplied banknote 38 has reached the chamber bottom or, respectively, the front side of the chamber 272*c* which forms a stop for the banknote 38 in transport direction. After the front edge of the banknote 38 has reached the front side of the chamber 272*c* or immediately thereafter, the clamping of the banknote 38 in the chamber 272*c* takes place in a manner controlled via the cam disk and controlled via the lever 320*a*. In this process, the lever 320*a* is pressed against the spring force of a spring 322*a* against the outer side of the chamber 272*c*.

Figure 32:
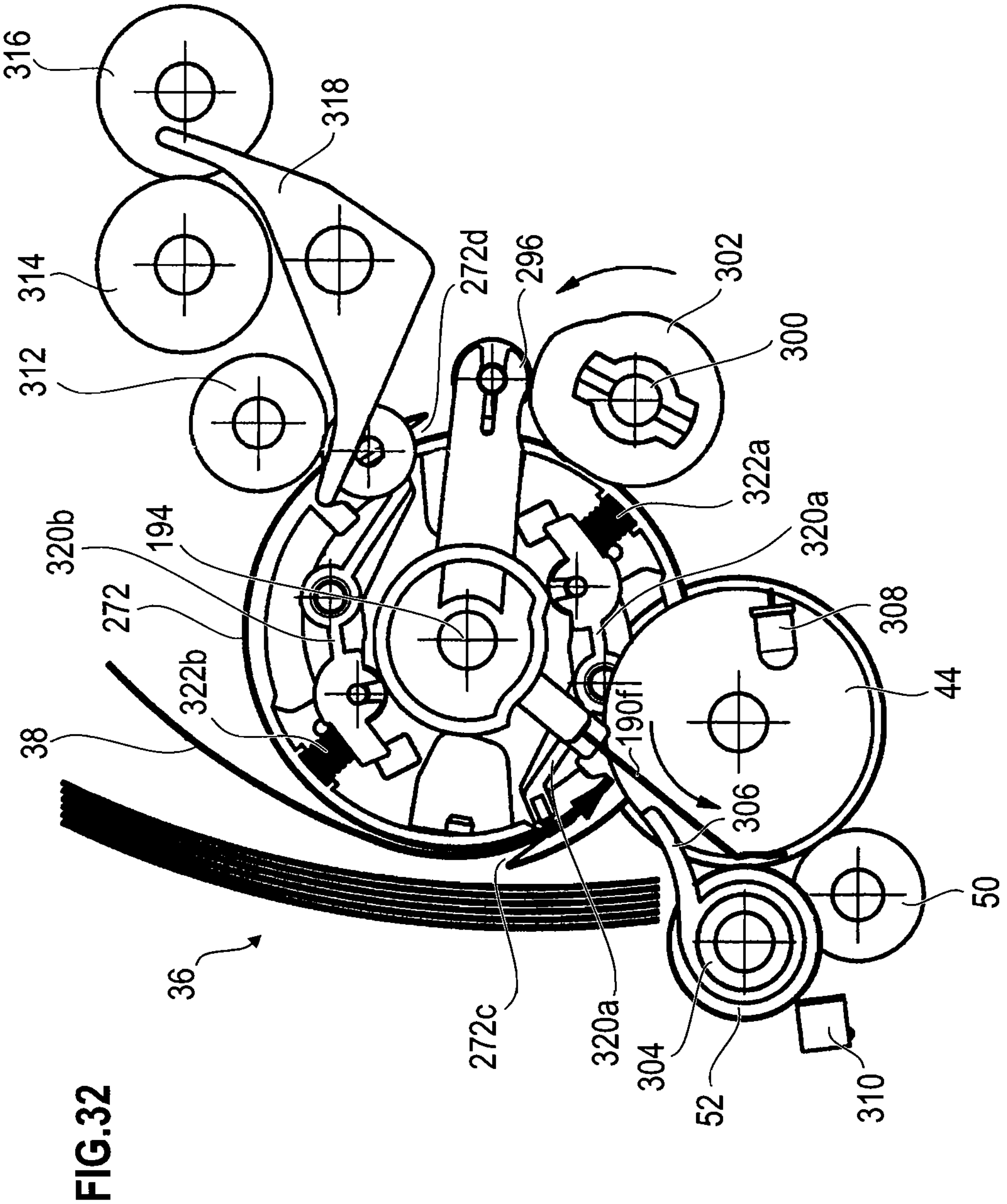
FIG. 32 shows the arrangement according to FIGS. 27 to 31, the feeding and separating elements being illustrated in a third feeding position.

In FIG. 32, the arrangement according to FIGS. 27 to 31 is shown, the feeding and separating elements being illustrated in a third feeding position in which the separating and stacking wheel 272 is rotated further relative to the second feeding position illustrated in FIG. 31. In this feeding position, the area of the banknote 38 clamped within the chamber 272*c* is still arranged in the chamber 272*c*. In the position illustrated in FIG. 32, the clamping lever 322*a* is released via the cam disk so that the area of the banknote 38 is indeed still in the chamber 272*c* but is no longer clamped. Further, the rear area of the banknote 38 is no longer engaged with the transport elements 312 to 318, as a result whereof the banknote 38 is lifted from the circumferential surface of the separating and stacking wheel 272 due to its stiffness and thus straightens up towards the front side of the stack 36. When the separating and stacking wheel 272 is rotated further, the front edge of the supplied banknote 38 abuts several stripping elements 324 which are arranged between the drive wheels 44 and stop the movement of the banknote 38. At the same time, the separating and stacking wheel 272 is rotated further so that the front area of the banknote 38 is no longer arranged in the chamber 272*c* when the separating and stacking wheel 272 is rotated further. As a result thereof, the supplied banknote 38 is no longer engaged with the separating and stacking wheel 272. Due to the stiffness of the supplied banknote 38, the same straightens up so that it is arranged directly in front of the front side of the stack 36 already contained in the cassette 12*c* and forms the new front side of the stack.

Figure 33:
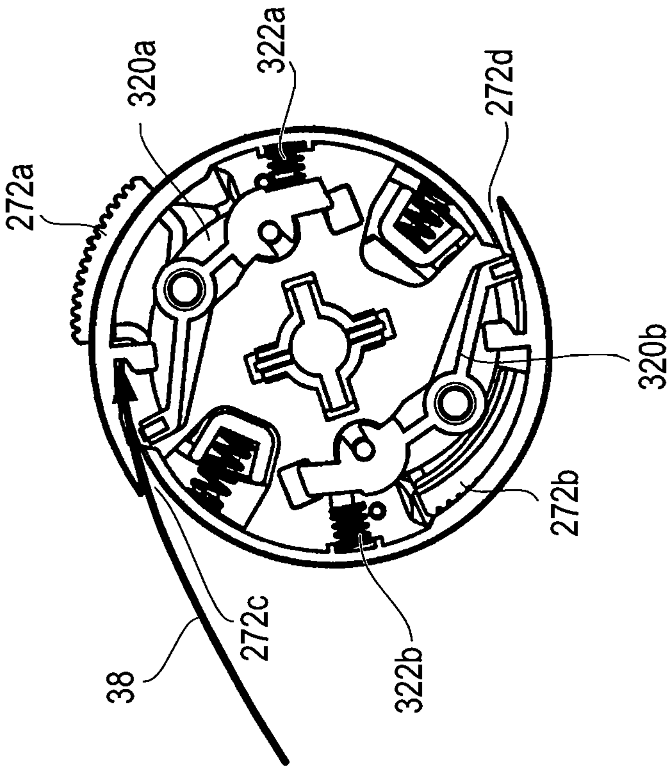
FIG. 33 shows a side view of the stacking and separating wheel according to the third embodiment of the invention.
Figure 35:
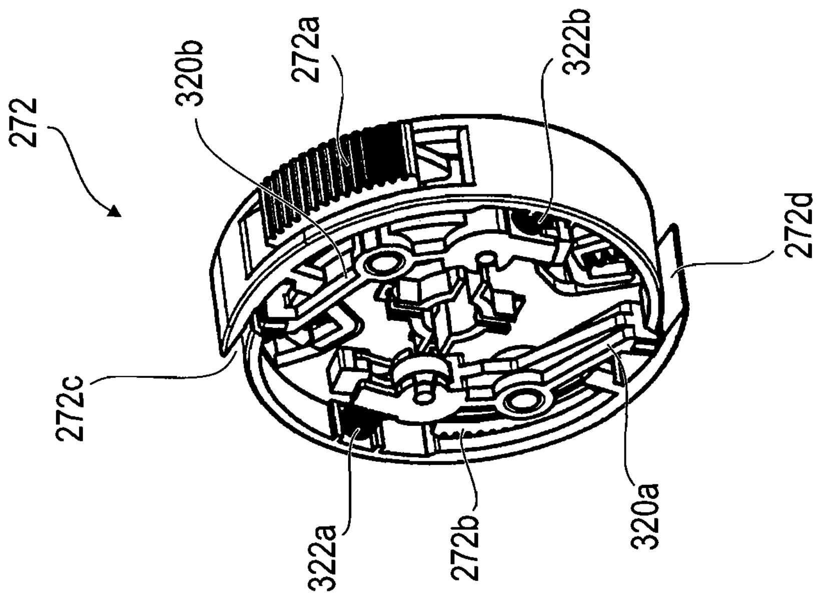
FIG. 35 shows a perspective illustration of the stacking and separating wheel according to FIGS. 33 and 34.
Figure 34:
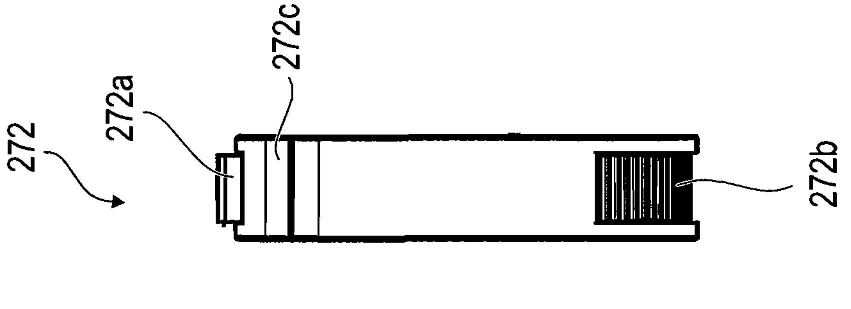
FIG. 34 shows the stacking and separating wheel according to FIG. 33 in a further side view.
Figure 36:
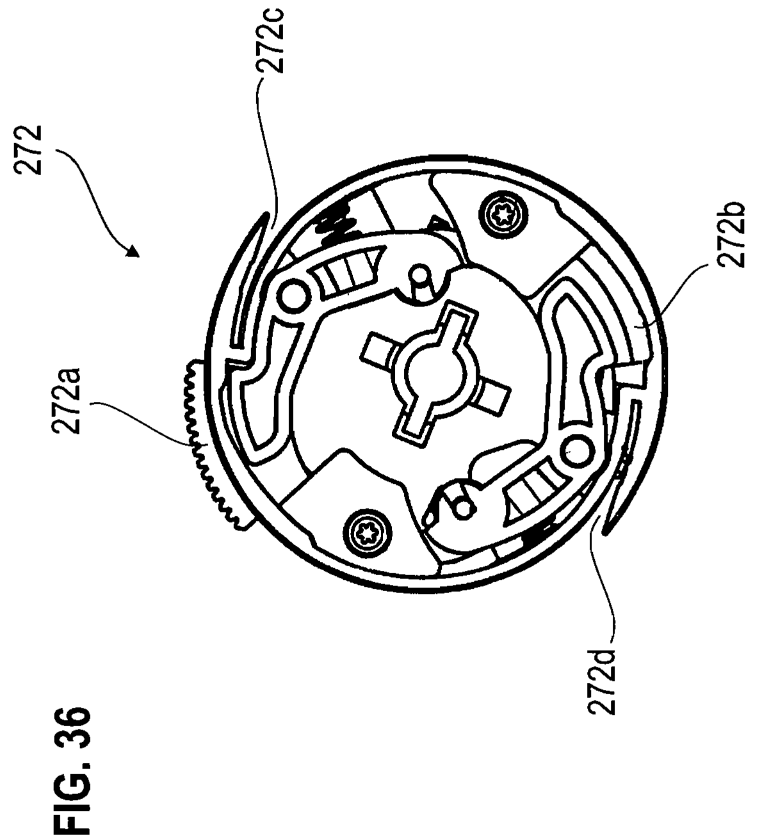
FIG. 36 shows the stacking and separating wheel according to FIGS. 33 to 35 in a further side view.

In FIG. 33, a side view of the stacking and separating wheel 272 according to the third embodiment of the invention without inner cam disk is illustrated. The non-illustrated cam disk controls or, respectively, guides the movement of the clamping levers 320*a*, 320*b*, the springs 322*a*, 322*b* pressing the lever ends against the cam disk. In FIG. 34, the stacking and separating wheel 272 according to FIG. 33 is illustrated in a further side view and in a perspective illustration in FIG. 35. FIG. 36 shows a further side view of the stacking and separating wheel 272, the side of the stacking and separating wheel 272 opposite to the side illustrated in FIG. 33 being shown without the second cam disk. With the aid of this second cam disk, the movement of the stripping elements 272*a*, 272*b* out of the circumferential surface of the stacking and separating wheel 272 is controlled via one lever each assigned to the respective stripping element 272*a*, 272*b*. Springs are provided which press the end of the levers which is not connected to the stripping elements against the cam disk. The stripping elements are moved out of the circumferential surface of the stacking and separating wheel 272 with the aid of the spring force of these springs dependent on the curve of the cam disk.

Figure 37:
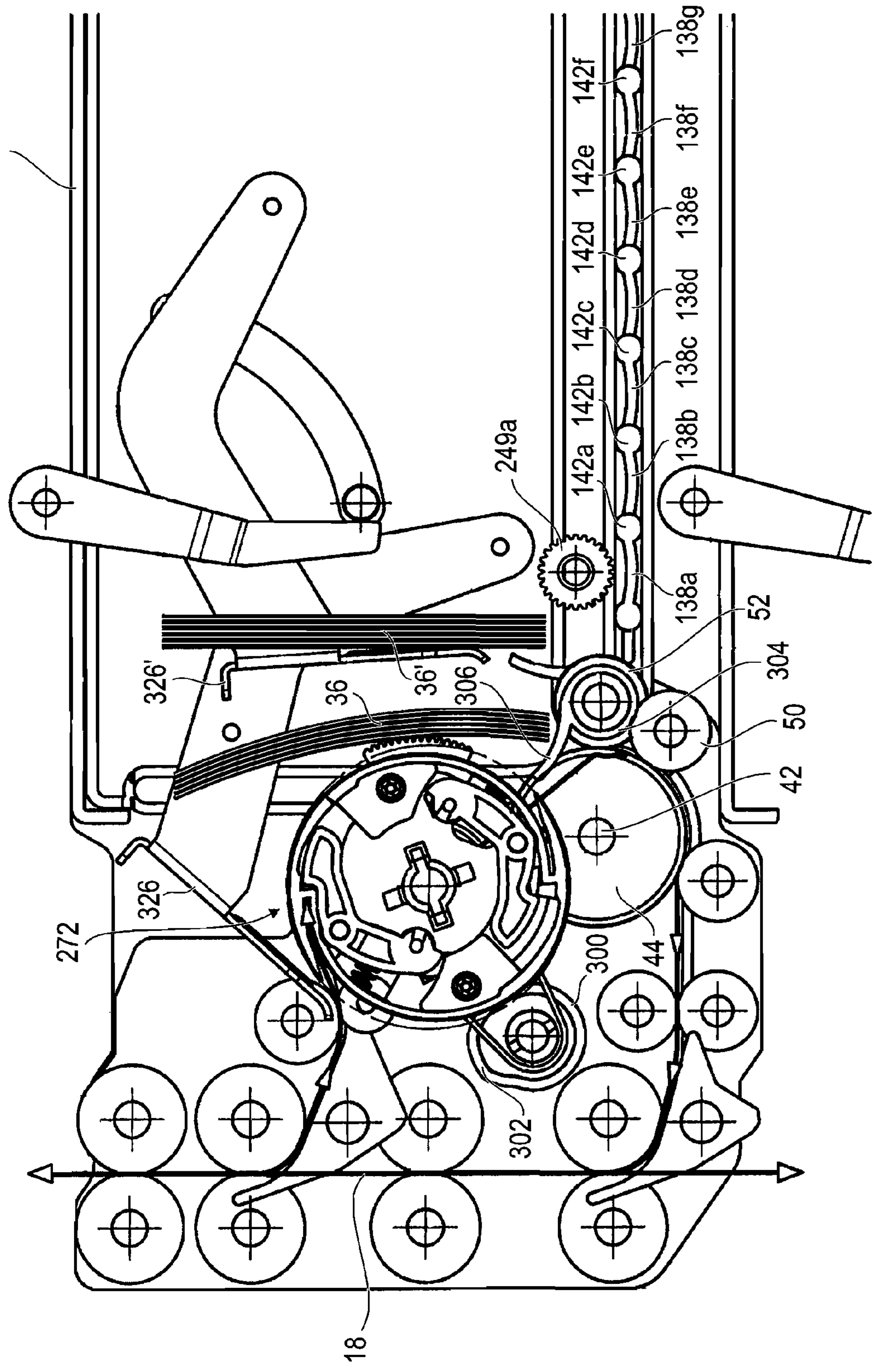
FIG. 37 shows an arrangement of the cassette in an automated teller machine with feeding and separating elements of the third embodiment of the invention.

In FIG. 37, a side view of the cassette 12*c* together with a note retracting shutter 326 similar to the note retracting shutter 68 is illustrated which, compared to the note retracting shutter 68, has cut-outs adapted to the stacking and separating wheels 272 to 278. In addition, further transport elements for providing a transport path 18 are illustrated. In contrast to the described first and second embodiments of the invention, two sorting gates are to be arranged in the transport path 18 for the separating and stacking module according to the third embodiment of the invention since the banknotes 38 to be supplied to the separating and stacking module are supplied to the stacking and separating wheels 272 to 276 in the upper area and removed banknotes are to be transported away from the stacking and separating wheels 272 to 276 in the lower area. The note retracting shutter 326 and the banknote stack 36 are illustrated in FIG. 37 in their stacking and separating position as well as in an inactive position, the note retracting shutter being identified with the reference sign 326' in the inactive position and the banknote stack being identified with the reference sign 36'.

Figure 38:
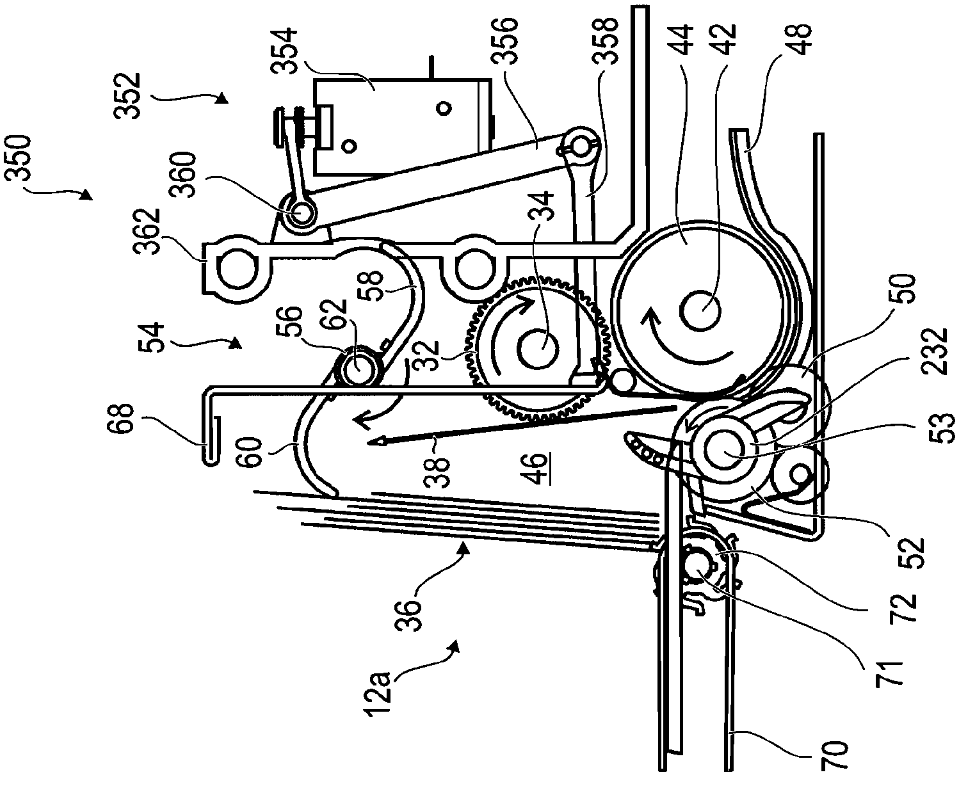
FIG. 38 shows a side view of a separating and stacking module according to a fourth embodiment of the invention, in which feeding elements and separating elements are illustrated in a first feeding position.

In FIG. 38, a side view of a separating and stacking module 350 according to a fourth embodiment is illustrated, which can be used alternatively to the separating and stacking modules 30, 200, 252, 270 of the first three embodiments of the invention as a separating and stacking module 14*a* to 14*d* according to FIG. 1. The separating and stacking module 350 is engaged with the cassette 12*a* in the same manner as explained in connection with the first embodiment of the invention according to FIGS. 2 to 13. Further, the function and the structure of the vane wheels 54, the note retracting shutter 68, the drive wheel 44, and the stripping wheel 52 correspond to the first embodiment of the invention.

In contrast to the first embodiment of the invention according to FIGS. 2 to 13, a lower vane wheel 232 according to the second embodiment of the invention according to FIGS. 15 to 23 is provided in the fourth embodiment. Further, instead of the pressure device 45 a pressure device 352 is provided. The pressure device 352 comprises a pull magnet drive 354 which is coupled via a lever 356 to a pressure push rod 358. The movement of the pull magnet drive 354 is deflected about a stationary axis of rotation 360. Further, the movement of the push rod 358 is preferably restricted or guided via further non-illustrated guiding elements. The axis of rotation 360 is preferably formed via a housing frame projecting from a housing frame 362 arranged to the side of the separating and stacking module 350, which housing frame projects through a complementary opening provided in the lever 356 and thus forms an axis of deflection or, respectively, axis of rotation 360.

In the feeding position illustrated in FIG. 38, the banknote 38 is transported into the feeding area 46, the vane wheel 54 already being moved out of its basic stacking position in order to provide the supplied banknote 38 also with sufficient space at the top and to not impede the movement of the banknote 38 during feeding into the feeding area 46, in particular to not form a height stop.

Figure 39:
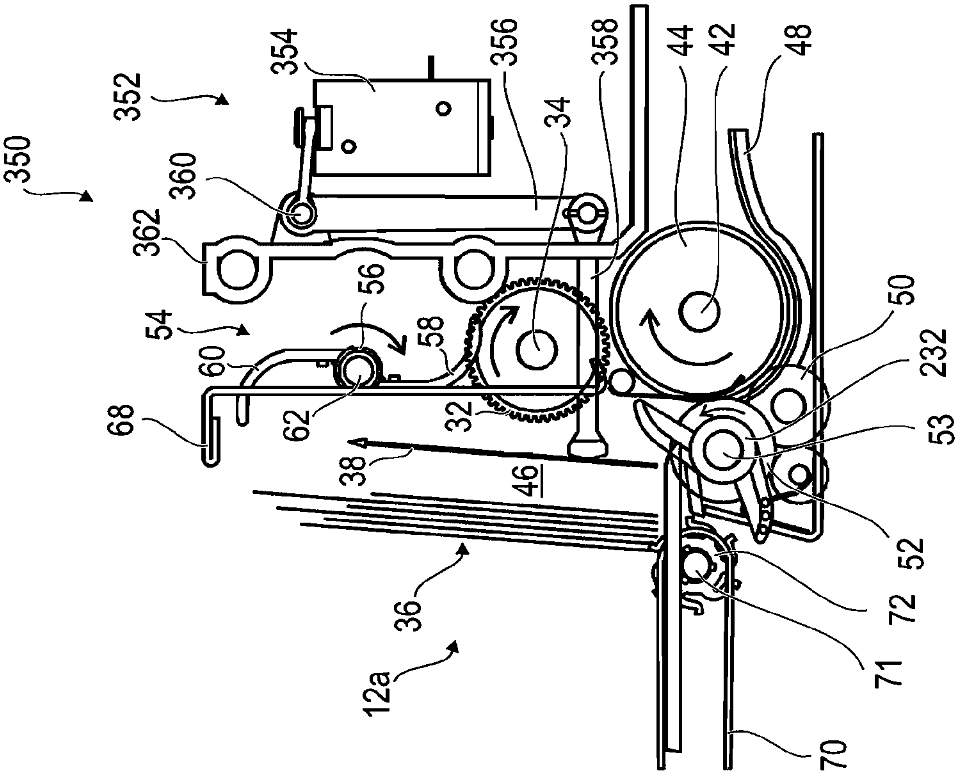
FIG. 39 shows the separating and stacking module according to FIG. 38, the feeding elements being illustrated in a second feeding position.

In the feeding position shown in FIG. 39, the upper vane wheel 54 has been rotated further. In the position of the vane wheel 54 shown in FIG. 39, the already explained vane change-over of the vane wheel 54 is performed. Further, the lower vane wheel 232 has been rotated. Moreover, the pull magnet drive 354 has been activated so that the pressure push rod 358 contacts the supplied banknote 38 in its lower half and presses it in the direction of the front side of the stack 36.

Figure 40:
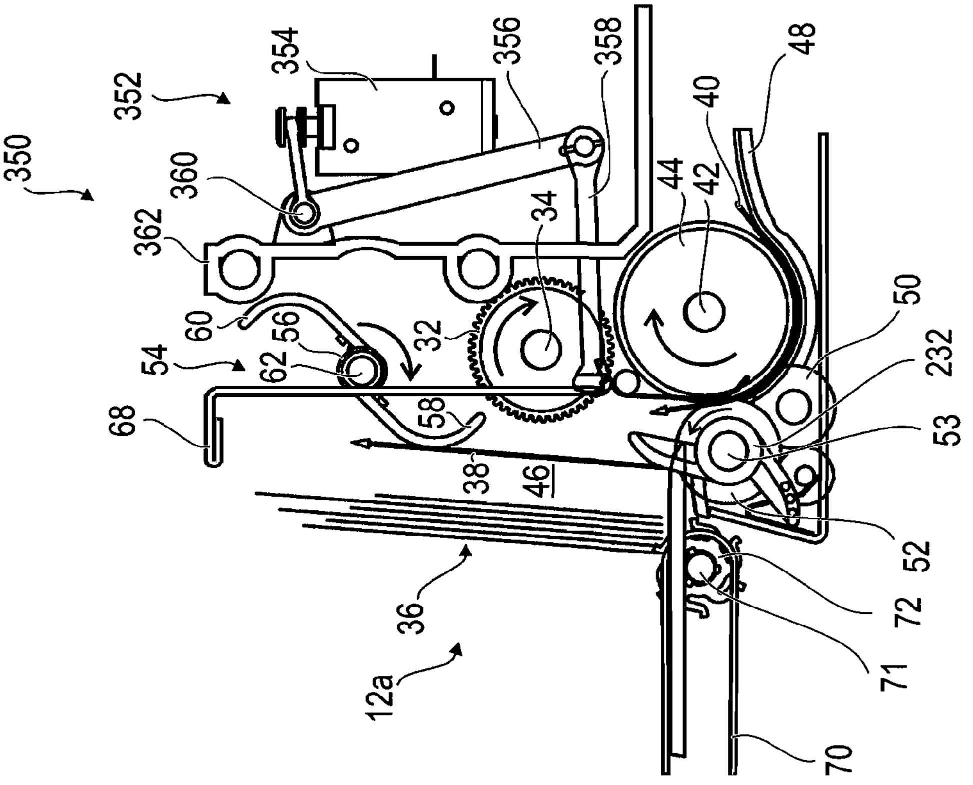
FIG. 40 shows the separating and stacking module according to FIGS. 38 and 39, the feeding and separating elements being illustrated in a third feeding position.

In FIG. 40, a further subsequent feeding position during feeding of the banknote 38 into the cassette 12*a* is shown. The lower vane wheel 232 and the upper vane wheel 54 have been rotated further, as a result whereof the second vane 58 contacts the upper half of the supplied banknote 38 with the outside of the curved area of the vane 58 and moves the banknote 38, by the further movement of the vane wheel 54 up into its basic stacking position, further in the direction of the stack 36 and presses it against the front side of the stack 36. In the same manner, the lower vane wheel 232 is rotated further and contacts the supplied banknote 38 in its lower half, preferably at its lower edge and presses the lower area of the supplied banknote 38 against the front side of the stack 36 already contained in the cassette 12*a*. Further, it is shown in FIG. 40 that already in this feeding position a further banknote 40 is transported into the feeding area 46. By pressing the banknote 38 against the front side of the stack 36, the banknote 38 subsequently forms the front side of the stack 36. The further operation during feeding of the banknote 40 corresponds to the operation described with respect to the feeding of the banknote 38.

Figure 41:
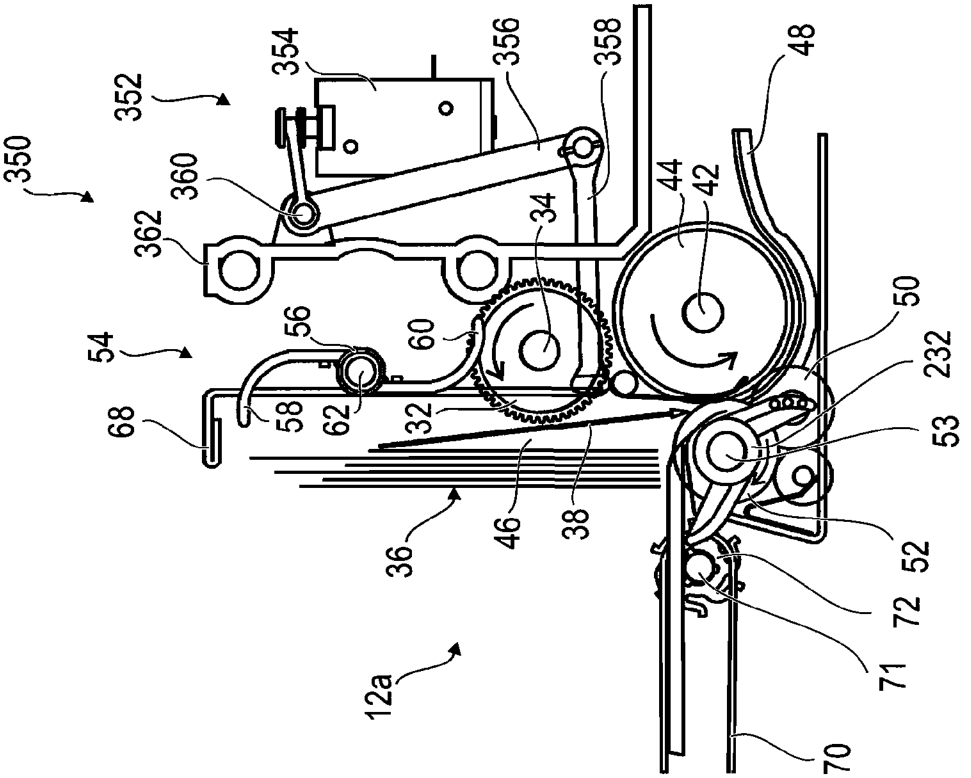
FIG. 41 shows the separating and stacking module according to FIGS. 38 to 40, the feeding and separating elements being illustrated in a separating position.

In FIG. 41, the separating and stacking module 350 according to FIGS. 38 to 40 is shown, the separating and stacking elements being illustrated in a separating position. The upper vane wheel 54 has been rotated into the basic stacking position already described in connection with the first embodiment. Further, the stack 36 contained in the cassette 12*a* has been moved towards the pull-off wheel 32 so that the face of the banknote 38 forming the front side of the stack 36 is pressed against the circumferential surface of the pull-off wheel 32. By a rotation of the pull-off wheel 32, the banknote 38 is moved downwards into the gap between the drive wheel 44 and the stripping roller 52 as well as between the drive wheel 44 and the pressure roller 50. By a respective rotation of the drive wheel 44, the banknote 38 separated in this way is transported further to the transport path 18. The note retracting shutter 68 is illustrated in an open position in the views illustrated in FIGS. 38 to 41 and can be actuated in the same manner as described in connection with the first two embodiments in connection with FIGS. 2 to 37.

The individual elements described in connection with one of the four embodiments can alternatively or additionally also be used in the respective other embodiments as well as can be added either individually or in combination to the following claims as restrictive features.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A single sheet handling device for the input and the output of rectangular single sheets respectively into and out of a container, comprising:

a feeding device including feeding elements for the sheet-by-sheet feeding of single sheets and for storing these single sheets in a stack of single sheets in the container; and a separating device which comprises separating elements for the sheet-by-sheet removal of single sheets of the stack from the container;

wherein:

the feeding elements and the separating elements are arranged separately from the container;

at the bottom of the container at least one circulating belt is arranged which is driven with the aid of a drive unit arranged separately from the container, the single sheets contained in the container standing with their horizontal edges on the at least one belt and being transported away from a feeding and removal opening of the container when the belt moves, or, respectively, being transported towards the feeding and removal opening of the container when the belt moves in the opposite direction;

at least one actively driven boundary device is provided, which is movable in a stacking direction and in a direction opposite to the stacking direction, and restricts the stacking space in the single sheet receiving area in the container;

the actively driven boundary device and the circulating belt are independently driven; and the boundary device is arranged in the container and includes a displacement carriage, with the aid of the boundary device the single sheets of the stack are held in a position in which they are arranged as a stack standing on their horizontal edges.

2. The device according to claim 1, wherein the feeding elements position a single sheet to be supplied to the container in front of the stack surface formed by a front side of the stack.

3. The device according to claim 1, wherein at least a part of the feeding elements and at least a part of the separating elements are formed and arranged such that, at least in a feeding or, respectively, separating mode of the single sheet handling device, they contact at least one single sheet contained in a single sheet receiving area of the container through at least one opening of a front-side boundary wall of the single sheet receiving area.

4. The device according to claim 1, wherein the single sheet handling device has at least one active drive for changing the position of a front-side boundary wall of the container formed as a shutter, the active drive causing the movement of the shutter into at least one of a feeding and removal position in which at least one of a feeding and removal opening for feeding and/or removing the single sheets is uncovered.

5. The device according to claim 4, wherein the active drive moves the shutter into an inactive position before or during the separation of the container from the feeding and separating elements before or during a removal operation for removing the container from an automated teller machine, the shutter being arranged in the inactive position such that the feeding and/or removal opening is closed, the shutter preferably pressing at least a part of the single sheets of the stack into the single sheet receiving area of the container.

6. The device according to claim 4, wherein the active drive moves the shutter from at least one of the feeding and separating position into the inactive position and from the inactive position into the at least one of the feeding and separating position at least when a change of the operating mode from the feeding mode into the separating mode or a change of the operating mode from the separating mode into the feeding mode takes place.

7. The device according to claim 6, wherein the single sheet handling device has engagement elements for actuating the shutter upon a contact of the container with the single sheet handling device, and in that the drive actively drives the shutter upon a movement into the at least one of the feeding and separating position via the engagement elements against a spring force for at least one of moving and holding the shutter in the inactive position.

8. The device according to claim 1, wherein at least one separating element has at least one separating wheel.

9. The device according to claim 1, wherein the feeding elements comprise at least one displacement element which displaces a supplied single sheet positioned in front of the front side of the stack at least in a contact area with the displacement element towards the front side of the stack.

10. The device according to claim 1, wherein the drive unit arranged separately from the container is driven.

11. The device according to claim 1, wherein the single sheets are arranged one after the other, standing on their longitudinal edges as a stack in the container.

12. The device according to claim 1, wherein the feeding device has at least one at least one-vaned vane wheel as a feeding element, and in that the feeding device comprises at least one drive unit for driving the at least one vane wheel, the drive unit rotating the vane wheel during feeding of a further single sheet such that the vane presses against the front side of a stack of single sheets contained in a single sheet receiving area of the container and pushes at least a part of these single sheets at least temporarily into the single sheet receiving area of the container and creates a free feeding area for positioning further single sheets in front of the front side of the stack.

13. The device according to claim 12, wherein at least two vane wheels are provided which are arranged in a rotationally fixed manner on a shaft which can be rotatably driven with the aid of the drive unit of the feeding device, the vanes of the two vane wheels being oriented identically, and, upon a rotation, each of the vanes of each vane wheel pressing against the front side of the stack contained in the container.

14. The device according to claim 12, wherein a sensor arrangement for detecting a sheet edge of a single sheet to be supplied to the container with the aid of the feeding device is provided, and in that the drive unit of the feeding device starts the drive of the at least one vane wheel a preset time after the detection of the sheet edge of the single sheet by the sensor arrangement.

15. The device according to claim 12, wherein the enveloping circle of the vane of the vane wheel is selected such and in that the vane wheel is arranged such that the apex of the enveloping circle is arranged approximately at the same height as the front edge of the largest possible single sheet which can be supplied to the container when said largest possible single sheet is arranged in the single sheet receiving area of the container.

16. The device according to claim 12, wherein the vane of the at least one vane wheel pushes the stack into the single sheet receiving area of the container at least when the vane is vertically oriented.

17. A single sheet handling device for the input and the output of rectangular single sheets respectively into and out of a container, comprising:

a feeding device including feeding elements for the sheet-by-sheet feeding of single sheets and for storing these single sheets in a stack of single sheets in the container; and a separating device which comprises separating elements for the sheet-by-sheet removal of single sheets of the stack from the container;

wherein:

the feeding elements and the separating elements are arranged separately from the container;

at the bottom of the container at least one circulating belt is arranged which is driven with the aid of a drive unit arranged separately from the container, the single sheets contained in the container standing with their horizontal edges on the at least one belt and being transported away from a feeding and removal opening of the container when the belt moves, or, respectively, being transported towards the feeding and removal opening of the container when the belt moves in the opposite direction; and at least two vane wheels with elastic vanes each or at least two rolls with a profiled circumferential surface each are provided which are arranged in a rotationally fixed manner on a common shaft that is arranged underneath a single sheet receiving area in the container and which, upon rotation of the shaft, move the undersides of a part of the single sheets away from a feeding and removal opening of the container at least during feeding of a single sheet.

18. A single sheet handling device for the input and the output of rectangular single sheets respectively into and out of a container, comprising:

a feeding device including feeding elements for the sheet-by-sheet feeding of single sheets and for storing these single sheets in a stack of single sheets in the container; and a separating device which comprises separating elements for the sheet-by-sheet removal of single sheets of the stack from the container;

wherein:

the feeding elements and the separating elements are arranged separately from the container;

at the bottom of the container at least one circulating belt is arranged which is driven with the aid of a drive unit arranged separately from the container, the single sheets contained in the container standing with their horizontal edges on the at least one belt and being transported away from a feeding and removal opening of the container when the belt moves, or, respectively, being transported towards the feeding and removal opening of the container when the belt moves in the opposite direction;

the feeding device has at least one at least one-vaned vane wheel as a feeding element, and in that the feeding device comprises at least one drive unit for driving the at least one vane wheel, the drive unit rotating the vane wheel during feeding of a further single sheet such that the vane presses against the front side of a stack of single sheets contained in a single sheet receiving area of the container and pushes at least a part of these single sheets at least temporarily into the single sheet receiving area of the container and creates a free feeding area for positioning further single sheets in front of the front side of the stack; and a control unit controls the drive unit such that the vane of the vane wheel has a distance to the front edge of a supplied single sheet during feeding and in that the supplied single sheet does not contact the vane during feeding into a feeding area in front of the front side of the stack.

* * * * *